United States Patent
Takayama

(10) Patent No.: US 8,155,320 B2
(45) Date of Patent: Apr. 10, 2012

(54) DATA STORAGE DEVICE, MANAGEMENT SERVER, INTEGRATED CIRCUIT, DATA UPDATE SYSTEM, HOME ELECTRIC APPARATUSES, DATA UPDATE METHOD, ENCRYPTION METHOD, AND ENCRYPTION/DECRYPTION KEY GENERATION METHOD

(75) Inventor: Hisashi Takayama, Tokyo (JP)

(73) Assignee: Panasonic Corporation, Osaka (JP)

( * ) Notice: Subject to any disclaimer, the term of this patent is extended or adjusted under 35 U.S.C. 154(b) by 629 days.

(21) Appl. No.: 12/303,420

(22) PCT Filed: Jun. 5, 2007

(86) PCT No.: PCT/JP2007/061383
§ 371 (c)(1),
(2), (4) Date: Dec. 4, 2008

(87) PCT Pub. No.: WO2007/142240
PCT Pub. Date: Dec. 13, 2007

(65) Prior Publication Data
US 2009/0172419 A1 Jul. 2, 2009

(30) Foreign Application Priority Data
Jun. 8, 2006 (JP) .................. 2006-160284
Jun. 1, 2007 (JP) .................. 2007-146869

(51) Int. Cl.
*H04L 9/00* (2006.01)
(52) U.S. Cl. .................. 380/277; 713/189; 713/191

(58) Field of Classification Search .................. 705/51, 705/54, 59; 713/191; 717/168–173; 380/277
See application file for complete search history.

(56) References Cited

U.S. PATENT DOCUMENTS

| 7,313,704 | B2 | 12/2007 | Kashiwada |
| 2006/0005046 | A1* | 1/2006 | Hars .................. 713/191 |
| 2008/0222368 | A1* | 9/2008 | Gehrmann .................. 711/152 |

FOREIGN PATENT DOCUMENTS

| JP | 2001-320357 A | 11/2001 |
| JP | 2002-290396 A | 10/2002 |
| WO | 02/057904 | 7/2002 |

OTHER PUBLICATIONS

English language Abstract of JP 2001-320357 A.
English language Abstract of JP 2002-290396 A.
U.S. Appl. No. 12/096,454 to Takekawa et al., which was filed on Jun. 6, 2008.

* cited by examiner

*Primary Examiner* — Gilberto Barron, Jr.
*Assistant Examiner* — Malcolm Cribbs
(74) *Attorney, Agent, or Firm* — Greenblum & Bernstein, P.L.C.

(57) ABSTRACT

Provided is a data storage device capable of safely and effectively updating software of a home electric apparatus. In the home electric apparatus (100) in which currently used data is to be updated to new data, a reception unit (140) receives encrypted new data and a serial number of data to be updated. A key generation unit (112) generates a key by executing a predetermined irreversible calculation on the unique information correlated to the currently used data by a number of times based on the serial number of the data to be updated. An update unit (113) decrypts the new data by using the key.

19 Claims, 33 Drawing Sheets

| APPARATUS SOFTWARE VERSION SERIAL NUMBER | DATA INSTALLED IN APPARATUS | | |
|---|---|---|---|
| | CONTROL CODE | Ca | Cb |
| 1 | P1 | X(1,A) | Y(M−1,B) |
| 2 | P2 | X(2,A) | Y(M−2,B) |
| ⋮ | ⋮ | ⋮ | ⋮ |
| n | Pn | X(n,A) | Y(M−n,B) |
| n+1 | Pn+1 | X(n+1,A) | Y(M−n−1,B) |
| ⋮ | ⋮ | ⋮ | ⋮ |
| M−2 | $P_{M-2}$ | X(M−2,A) | Y(2,B) |
| M−1 | $P_{M-1}$ | X(M−1,A) | Y(1,B) |

FIG.3

| APPARATUS SOFTWARE VERSION SERIAL NUMBER | DATA INSTALLED IN APPARATUS | | |
|---|---|---|---|
| | CONTROL CODE | Ca | Cb |
| ⋮ | ⋮ | ⋮ | ⋮ |
| n−i−1 | Pn−i−1 | X(n−i−1,A) | Y(M−n+i+1,B) |
| n−i | Pn−i | X(n−i,A) | Y(M−n+i,B) |
| ⋮ | ⋮ | ⋮ | ⋮ |
| n | Pn | X(n,A) | Y(M−n,B) |
| ⋮ | ⋮ | ⋮ | ⋮ |
| n+j | Pn+j | X(n+j,A) | Y(M−n−j,B) |
| n+j+1 | Pn+j+1 | X(n+j+1,A) | Y(M−n−j−1,B) |
| ⋮ | ⋮ | ⋮ | ⋮ |
| n+k | Pn+k | X(n+k,A) | Y(M−n−k,B) |
| ⋮ | ⋮ | ⋮ | ⋮ |

CURRENTLY USED: n−i ... n+j
NEW: n+k
TO BE UPDATED → UPDATE

FIG.4A

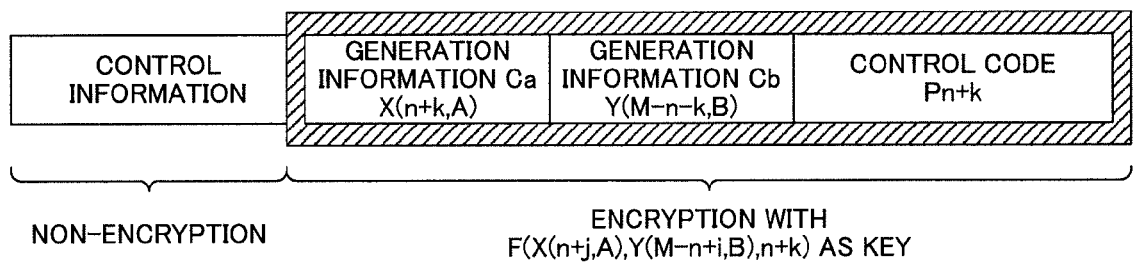

| CONTROL INFORMATION | GENERATION INFORMATION Ca X(n+k,A) | GENERATION INFORMATION Cb Y(M−n−k,B) | CONTROL CODE Pn+k |

NON-ENCRYPTION | ENCRYPTION WITH F(X(n+j,A),Y(M−n+i,B),n+k) AS KEY

FIG.4B

| APPARATUS SOFTWARE VERSION SERIAL NUMBER | CONTROL CODE | DATA INSTALLED IN APPARATUS | | | |
|---|---|---|---|---|---|
| | | Ca | Cb | Cc | Cd |
| 1 | P1 | X(1,A) | Y(M-1,B) | U(1,C) | V(M-1,D) |
| 2 | P2 | X(2,A) | Y(M-2,B) | U(2,C) | V(M-2,D) |
| ⋮ | ⋮ | ⋮ | ⋮ | ⋮ | ⋮ |
| n | Pn | X(n,A) | Y(M-n,B) | U(n,C) | V(M-n,D) |
| n+1 | Pn+1 | X(n+1,A) | Y(M-n-1,B) | U(n+1,C) | V(M-n-1,D) |
| ⋮ | ⋮ | ⋮ | ⋮ | ⋮ | ⋮ |
| M-2 | P$_{M-2}$ | X(M-2,A) | Y(2,B) | U(M-2,C) | V(2,D) |
| M-1 | P$_{M-1}$ | X(M-1,A) | Y(1,B) | U(M-1,C) | V(1,D) |

※ A: SECRET INFORMATION 1, B: SECRET INFORMATION 2,
   C: SECRET INFORMATION 3, D: SECRET INFORMATION 4
※※ X(p,a): VALUE WHEN IRREVERSIBLE CALCULATION X IS REPEATED p TIMES USING a AS A STARTING PARAMETER
    Y(q,b): VALUE WHEN IRREVERSIBLE CALCULATION Y IS REPEATED q TIMES USING b AS A STARTING PARAMETER
※※※ U(p,a): VALUE WHEN IRREVERSIBLE CALCULATION U IS REPEATED p TIMES USING a AS A STARTING PARAMETER
     V(q,b): VALUE WHEN IRREVERSIBLE CALCULATION V IS REPEATED q TIMES USING b AS A STARTING PARAMETER

FIG.17

| APPARATUS SOFTWARE VERSION SERIAL NUMBER | CONTROL CODE | DATA INSTALLED IN APPARATUS | | | |
|---|---|---|---|---|---|
| | | Ca | Cb | Cc | Cd |
| .. | .. | .. | .. | .. | .. |
| n−i−1 | Pn−i−1 | X(n−i−1,A) | Y(M−n+i+1,B) | U(n−i−1,C) | V(M−n+i+1,D) |
| n−i | Pn−i | X(n−i,A) | Y(M−n+i,B) | U(n−i,C) | V(M−n+i,D) |
| .. | .. | .. | .. | .. | .. |
| n | Pn | X(n,A) | Y(M−n,B) | U(n,C) | V(M−n,D) |
| .. | .. | .. | .. | .. | .. |
| n+j | Pn+j | X(n+j,A) | Y(M−n−j,B) | U(n+j,C) | V(M−n−j,D) |
| n+j+1 | Pn+j+1 | X(n+j+1,A) | Y(M−n−j−1,B) | U(n+j+1,C) | V(M−n−j−1,D) |
| .. | .. | .. | .. | .. | .. |
| N−p−1 | PN−p−1 | X(N−p−1,A) | Y(M−N+p+1,B) | U(N−p−1,C) | V(M−N+p+1,D) |
| N−p | PN−p | X(N−p,A) | Y(M−N+p,B) | U(N−p,C) | V(M−N+p,D) |
| .. | .. | .. | .. | .. | .. |
| N | PN | X(N,A) | Y(M−N,B) | U(N,C) | V(M−N,D) |
| .. | .. | .. | .. | .. | .. |
| N+q | PN+q | X(N+q,A) | Y(M−N−q,B) | U(N+q,C) | V(M−N−q,D) |
| N+q+1 | PN+q+1 | X(N+q+1,A) | Y(M−N−q−1,B) | U(N+q+1,C) | V(M−N−q−1,D) |
| .. | .. | .. | .. | .. | .. |
| n+k | Pn+k | X(n+k,A) | Y(M−n−k,B) | U(n+k,C) | V(M−n−k,D) |
| .. | .. | .. | .. | .. | .. |

FIG.18A

| CONTROL MODULE P VERSION SERIAL NUMBER | DATA INSTALLED IN APPARATUS | | | | | | CONTROL MODULE Q VERSION SERIAL NUMBER |
|---|---|---|---|---|---|---|---|
| | CONTROL CODE | Ca | Cb | Cc | Cd | CONTROL MODULE | |
| 1 | P1 | X(1,A) | Y(M−1,B) | U(1,C) | V(M−1,D) | Q1 | 1 |
| 2 | P2 | X(2,A) | Y(M−2,B) | U(2,C) | V(M−2,D) | Q2 | 2 |
| ⋮ | ⋮ | ⋮ | ⋮ | ⋮ | ⋮ | ⋮ | ⋮ |
| n | Pn | X(n,A) | Y(M−n,B) | | | | |
| n+1 | Pn+1 | X(n+1,A) | Y(M−n−1,B) | | | | |
| ⋮ | ⋮ | ⋮ | ⋮ | U(s,C) | V(M−s,D) | Qs | s |
| | | | | U(s+1,C) | V(M−s−1,D) | Qs+1 | s+1 |
| ⋮ | ⋮ | ⋮ | ⋮ | ⋮ | ⋮ | ⋮ | ⋮ |
| M−2 | $P_{M-2}$ | X(M−2,A) | Y(2,B) | U(M−2,C) | V(2,D) | $Q_{M-2}$ | M−2 |
| M−1 | $P_{M-1}$ | X(M−1,A) | Y(1,B) | U(M−1,C) | V(1,D) | $Q_{M-1}$ | M−1 |

※ A: SECRET INFORMATION 1, B: SECRET INFORMATION 2,
  C: SECRET INFORMATION 3, D: SECRET INFORMATION 4
※※ X(p,a): VALUE WHEN IRREVERSIBLE CALCULATION X IS REPEATED p TIMES USING a AS A STARTING PARAMETER
※※ Y(q,b): VALUE WHEN IRREVERSIBLE CALCULATION Y IS REPEATED q TIMES USING b AS A STARTING PARAMETER
※※ U(p,a): VALUE WHEN IRREVERSIBLE CALCULATION U IS REPEATED p TIMES USING a AS A STARTING PARAMETER
※※ V(q,b): VALUE WHEN IRREVERSIBLE CALCULATION V IS REPEATED q TIMES USING b AS A STARTING PARAMETER

FIG.21

| Control Module P Version Serial Number | Data Installed in Apparatus | | | | Control Module | Control Module Q Version Serial Number |
|---|---|---|---|---|---|---|
| | Control Module | Ca | Cb | Cc | Cd | | |
| ... | ... | ... | ... | ... | ... | ... | ... |
| n−i−1 | Pn−i−1 | X(n−i−1,A) | Y(M−n+i+1,B) | | | | |
| n−i | Pn−i | X(n−i,A) | Y(M−n+i,B) | | | | |
| ... | ... | ... | ... | ... | ... | ... | ... |
| n | Pn | X(n,A) | Y(M−n,B) | | | | |
| ... | ... | ... | ... | ... | ... | ... | ... |
| n+j | Pn+j | X(n+j,A) | Y(M−n−j,B) | U(s−p−1,C) | V(M−s+p+1,D) | Qs−p−1 | s−p−1 |
| | | | | U(s−p,C) | V(M−s+p,D) | Qs−p | s−p |
| | | | | ... | ... | ... | ... |
| | | | | U(s,C) | V(M−s,D) | Qs | s |
| | | | | U(s+q,C) | V(M−s−q,D) | Qs+q | s+q |
| n+j+1 | Pn+j+1 | X(n+j+1,A) | Y(M−n−j−1,B) | U(s+q+1,C) | V(M−s−q−1,D) | Qs+q+1 | s+q+1 |
| ... | ... | ... | ... | ... | ... | ... | ... |
| n+k | Pn+k | X(n+k,A) | Y(M−n−k,B) | U(s+t,C) | V(M−s−t,D) | Qs+t | s+t |
| ... | ... | ... | | ... | ... | ... | ... |

TO BE UPDATED: rows n−i−1 through n+j (Control Module P side); rows s−p through s+q (Control Module Q side)

UPDATE: row n+k (Control Module P side); row s+t (Control Module Q side)

FIG.22A

DATA STORAGE DEVICE, MANAGEMENT SERVER, INTEGRATED CIRCUIT, DATA UPDATE SYSTEM, HOME ELECTRIC APPARATUSES, DATA UPDATE METHOD, ENCRYPTION METHOD, AND ENCRYPTION/DECRYPTION KEY GENERATION METHOD

TECHNICAL FIELD

The present invention relates to a data storage apparatus, management server, integrated circuit, data update system, a home electric apparatus, data update method, encryption method, and encryption/decryption key generation method.

BACKGROUND ART

In recent years, software installed in home electric apparatuses such as air conditioners, refrigerators, portable music players, and the like, has become of higher functionality. As a result, software bugs are sometimes found after product shipment, and in some cases a software update or a recall of the home electric apparatus itself is necessary.

In the case of a personal computer, a large-capacity storage apparatus such as a hard disk, and a LAN (Local Area Network) card, Internet modem, or suchlike Internet connection function are installed as standard, making it possible for automatic software updates to be performed comparatively easily. For example, a software module for automatic software updating is installed in the large-capacity storage apparatus, the personal computer is periodically connected to a server via the Internet using this module, and the latest software version is received from the server and stored in the large-capacity storage apparatus.

On the other hand, in the case of a home electric apparatus, a large-capacity storage apparatus and Internet connection function are rarely installed as standard, and therefore it is difficult to update software in the same way as with a personal computer.

Even if an Internet connection function were installed as standard in a home electric apparatus, it would still be difficult to set up facilities for software updates. This is because home electric apparatuses are used in great numbers by an unspecified number of consumers, home electric apparatus software differs from model to model, and software versions may differ even between home electric apparatuses of the same model depending on their date of shipment.

Furthermore, when performing a home electric apparatus software update, security of the distributed software is also important. For example, it is essential to dependably prevent such actions by a malicious third party as tampering with distributed software through the insertion of invalid code, or deciphering of secret information such as know-how or algorithms related to a home electric apparatus within distributed information. It is therefore necessary for software and accompanying information to be encrypted when distributed.

A method of handling these issues is described in Patent Document 1, for example. In this apparatus, an execution program is stored rewritably in a first storage section, and a download module containing a new execution program and module identification information is stored in a second storage section. A download module encrypted using an encryption key created from the execution program and module identification information stored in the first storage section is received, and stored in the second storage section. Then the download module is decrypted using an encryption key created from the execution program in the first storage section and the download module in the second storage section. When an encrypted storage start address, data length, and check digit within the download module are decrypted to valid values, the execution program in the first storage section is replaced by the decrypted new execution program. That is to say, execution program tampering or deciphering are prevented by receiving a download module encrypted using the current execution program and download module identification information.

Patent Document 1: International Publication No. 2002/057904 Pamphlet

Patent Document 2: Japanese Patent Application Laid-Open No. 2002-290396

DISCLOSURE OF INVENTION

Problems to be Solved by the Invention

However, with the above conventional update method, since an encryption key is generated from a current execution program and download module identification information, it is necessary to encrypt a download module using a different key for each version before performing distribution. Therefore, an enormous cost is incurred when a program to be updated includes many versions.

Another possible method is application of a communication method using a bunch of keys described in Patent Document 2. In this method, a bunch of keys containing a plurality of keys is stored in advance in each home electric apparatus, one key is selected from that bunch of keys, information to be distributed is encrypted using the selected key, and the encrypted information is distributed to each home electric apparatus together with selected key identification information. Assume, for example, that there are home electric apparatuses with different versions of software installed, as shown in FIG. 1A. A bunch of keys comprising n keys—keys K1 through Kn—is stored in each home electric apparatus. As shown in FIG. 1B, when the latest version of software is distributed to these home electric apparatuses, the server selects a key Ka from a bunch of keys, encrypts the software using key Ka, and distributes the encrypted software together with key Ka identification information a. Each home electric apparatus selects key Ka in accordance with identification information a, decrypts the software, and executes software replacement.

According to this method, information distributed to a plurality of home electric apparatuses need only be encrypted using a single common key, enabling costs to be kept down on the distribution server side. However, with this method, it is necessary to include numerous keys in a bunch of keys in order to maintain a certain security level. Thus, each home electric apparatus requires the provision of sufficient storage capacity to store a bunch of keys, which may increase the cost of home electric apparatuses themselves.

It is an object of the present invention to provide a data storage apparatus, management server, integrated circuit, data update system, home electric apparatuses, data update method, encryption method, and encryption/decryption key generation method enabling updating of software of an apparatus such as a home electric apparatus to be performed safely and efficiently.

Means for Solving the Problems

A data storage apparatus connected to a management server of the present invention comprises a data storage section that stores data Pn as data of n'th (where n≧1), a key generation information storage section that stores first generation information and second generation information for generating key information, a key generation section that generates key information from the first generation information and second generation information, and an update section that updates the data and the first generation information and second generation information; and employs a configuration wherein first generation information stored in the key generation information storage section is $X(n,A)$ resulting from performing irreversible calculation X n times using first secret information A as a starting parameter of the irreversible calculation X, and second generation information is $Y(M-n,B)$ resulting from performing irreversible calculation Y M−n times (where $M-n \geq 1$) on second secret information B, and when receiving update information for updating data Pn to updated data Pk (where $M \geq k \geq 1$), the update information being used for a plurality of data storage apparatuses, each of the plurality of the data storage apparatuses having one among data of (n−i)'th through data of (n+j)'th (where $M \geq n+j \geq n \geq n-i \geq 1$), the data Pn being among data of (n−i)'th through data of (n+j)'th (where $M \geq n+j \geq n \geq n-i \geq 1$), the key generation section generates $X(n+j,A)$ by performing irreversible calculation X j times using first generation information as a starting parameter of the irreversible calculation X, generates $Y(M-n+i,B)$ by performing irreversible calculation Y i times using second generation information as a starting parameter of the irreversible calculation Y, and furthermore generates key information G $(X(n+j,A), Y(M-n+i,B))$ (where G is an arbitrary function) from that $X(n+j,A)$ and $Y(M-n+i,B)$, and the update section decrypts encrypted form of the update information using the generated key information $G(X(n+j,A), Y(M-n+i,B))$ and acquires data Pk and first updated generation information $X(k,A)$ and second updated generation information $Y(M-k,B)$, updates data Pn stored in the data storage section to data Pk, and updates first generation information $X(n,A)$ and second generation information $Y(M-n,B)$ stored in the key generation information storage section to first updated generation information $X(k,A)$ and second updated generation information $Y(M-k,B)$ respectively.

A management server of the present invention comprises a secret information storing section that stores first secret information A and second secret information B for each type of a plurality of data storage apparatuses, and a generation information generation section that generates first generation information and second generation information for each of the plurality of data storage apparatuses; and employs a configuration wherein, vis-à-vis a predetermined data storage apparatus that stores data Pn as data of n'th (where $n \geq 1$), the generation information generation section reads first secret information A and second secret information B from the secret information storing section, generates first generation information X $(n,A)$ by performing irreversible calculation X n times using the first secret information A as a starting parameter of the irreversible calculation X, and generates second generation information $Y(M-n,B)$ by performing irreversible calculation Y M−n times (where $M-n \geq 1$) on the second secret information B.

A management server of the present invention comprises a secret information storing section that stores first secret information A and second secret information B for each type of a plurality of data storage apparatuses, a generation information generation section that generates first generation information and second generation information for each of the plurality of data storage apparatuses, an encryption key generation section that generates an encryption key from the first generation information and second generation information, and an update information generation section that generates update information transmitted to a data storage apparatus; and employs a configuration wherein, vis-à-vis a data storage apparatus that stores data Pn as one among data of (n−i)'th through (n+j)'th (where $M \geq n+j \geq n \geq n-i \geq 1$), when update information containing data Pk as data of k'th (where $M \geq k \geq 1$) is generated, the generation information generation section reads first secret information A and second secret information B from the secret information storing section, generates first generation information $X(k,A)$ by performing irreversible calculation X k times using the first secret information A as a starting parameter of the irreversible calculation X, and generates second generation information $Y(M-k,B)$ by performing irreversible calculation Y M−k times using the second secret information B as a starting parameter of the irreversible parameter Y, and the encryption key generation section generates $X(n+j,A)$ by performing irreversible calculation X n+j times using the first secret information A as a starting parameter of the irreversible calculation X, generates $Y(M-n+i,B)$ by performing irreversible calculation Y M−n+i times using the second secret information B as a starting parameter of the irreversible calculation Y, and furthermore generates key information G $(X(n+j,A), Y(M-n+i,B))$ (where G is an arbitrary function) from the generated $X(n+k,A)$ and $Y(M-n+i,B)$, and the update information generation section concatenates the data Pk and first generation information $X(k,A)$ and second generation information $Y(M-k,B)$, and furthermore performs encryption of the concatenated data using the key information $G(X(n+j,A), Y(M-n+i,B))$, and furthermore concatenates control information controlling update information processing in a data storage apparatus that received update information, and generates update information.

An integrated circuit of the present invention is installed in a data storage apparatus, connected to a management server, that stores data Pn as data of n'th (where $n \geq 1$), and employs a configuration provided with a key generation information storage section that stores first generation information and second generation information for generating key information, a key generation section that generates key information from the first generation information and second generation information, and an update section that updates data stored in the data storage apparatus and the first generation information and second generation information; wherein first generation information stored in the key generation information storage section is $X(n,A)$ resulting from performing irreversible calculation X n times using first secret information A as a starting parameter of the irreversible parameter X, and second generation information is $Y(M-n,B)$ resulting from performing irreversible calculation Y M−n times (where $M-n \geq 1$) on second secret information B, and when receiving from the management server update information for updating data Pn to updated data Pk (where $M \geq k \geq 1$), the update information being used for a plurality of data storage apparatuses, each of the plurality of the data storage apparatuses having one among data of (n−i)'th through data of (n+j)'th (where $M \geq n+j \geq n \geq n-i \geq 1$), the data Pn being among data of (n−i)'th through data of (n+j)'th (where $M \geq n+j \geq n \geq n-i \geq 1$), the key generation section generates $X(n+j,A)$ by performing irreversible calculation X j times using first generation information as a starting parameter of the irreversible calculation X, generates $Y(M-n+i,B)$ by performing irreversible calculation Y i times using second generation information as a starting parameter of the irreversible calculation Y, and furthermore generates key information G $(X(n+j,A), Y(M-n+i,B))$ (where G is an arbitrary function) from that $X(n+j,A)$ and $Y(M-n+i,B)$, and the update section decrypts encrypted form of the update information using the generated key information G(X (n+j,A), Y(M−n+i,B)) and acquires data Pk and first updated generation information X(k,A) and second updated generation information Y(M−k,B), updates data Pn stored in the data storage apparatus to data Pk, and updates first generation information X(n,A) and second generation information Y(M−n,B) stored in the key generation information storage section to first updated generation information X(k,A) and second updated generation information Y(M−k,B) respectively.

A data update system of the present invention comprises a data storage apparatus that stores data Pn as data of n'th (where n≧1), a management apparatus that stores apparatus information of the data storage apparatus, and a management server that updates data installed in the data storage apparatus; and employs a configuration in which the data storage apparatus has a data storage section that stores data Pn, a key generation information storage section that stores first generation information and second generation information for generating key information, a key generation section that generates key information from the first generation information and second generation information, and an update section that updates the data and the first generation information and second generation information, wherein first generation information stored in the key generation information storage section is X(n,A) resulting from performing irreversible calculation X n times using first secret information A as a starting parameter of the irreversible calculation X, and second generation information is Y(M−n,B) resulting from performing irreversible calculation Y M−n times (where M−n≧1) on second secret information B; the management apparatus has an apparatus information management section that stores apparatus information registered from the data storage apparatus, and a data update section that updates data stored by the data storage apparatus; and the management server has a secret information storing section that stores first secret information A and second secret information B for each type of a plurality of data storage apparatuses, a generation information generation section that generates first generation information and second generation information for each of the plurality of data storage apparatuses, an encryption key generation section that generates an encryption key from the first generation information and second generation information, and an update information generation section that generates update information transmitted to a data storage apparatus; and the data update section further has a verification section that verifies apparatus information contained in update information with apparatus information held by the apparatus information management section, a storing section that stores update information, and an update processing control section that controls processing that updates data stored by the data storage apparatus performed vis-à-vis the data storage apparatus; wherein, when data of a data storage apparatus installed with data as one among data of (n−i)'th through (n+j)'th (where M≧n+j≧n≧n−i≧1) is updated to data Pk as data of k'th (where M≧k≧1), in the management server the generation information generation section reads first secret information A and second secret information B from the secret information storing section, generates first updated generation information X(k,A) by performing irreversible calculation X k times using the first secret information A as a starting parameter of the irreversible calculation X, and generates second generation information Y(M−k,B) by performing irreversible calculation Y M−k times using the second secret information B as a starting parameter of the irreversible calculation Y, and the encryption key generation section generates X(n+j,A) by performing irreversible calculation X n+j times using the first secret information A as a starting parameter of the irreversible calculation X, generates Y(M−n+i,B) by performing irreversible calculation Y M−n+i times using the second secret information B as a starting parameter of the irreversible calculation Y, and furthermore generates key information G (X(n+j,A), Y(M−n+i,B)) (where G is an arbitrary function) from the generated X(n+j,A) and Y(M−n+i, B), and the update information generation section concatenates the data Pk and first updated generation information X(k,A) and second updated generation information Y(M−k, B), and furthermore performs encryption of the concatenated data using the key information G(X(n+j,A), Y(M−n+i,B)), and furthermore concatenates control information controlling update information processing in a data storage apparatus that received update information and generates update information, and distributes the generated update information to the management apparatus; and in a management apparatus that receives the update information the verification section verifies apparatus information contained in the control information of the received update information with apparatus information held by the apparatus information management section, and if apparatus information of a data storage apparatus for which apparatus information matches has been registered, the update processing control section stores the received update information in the storing section and furthermore transmits the update information to a data storage apparatus for which apparatus information matches; and in a data storage apparatus that receives the update information the key generation section generates X (n+j,A) by performing irreversible calculation X j times using first generation information as a starting parameter of the irreversible calculation X, generates Y(M−n+i,B) by performing irreversible calculation Y i times using second generation information as the irreversible calculation Y, and furthermore generates key information G (X(n+j,A), Y(M−n+i,B)) from that X(n+j,A) and Y(M−n+i,B) and the update section decrypts encrypted form of the update information using the generated key information G(X(n+j,A), Y(M−n+i,B)) and acquires data Pk and first updated generation information X(k,A) and second updated generation information Y(M−k,B), updates data Pn stored in the data storage section to data Pk, and updates first generation information X(n,A) and second generation information Y(M−n,B) stored in the key generation information storage section to first updated generation information X(k, A) and second updated generation information Y(M−k,B) respectively.

A home electric apparatus of the present invention employs, in a home electric apparatus in which currently used data is to be updated to new data, a configuration having a receiving section that receives encrypted new data and a serial number of data to be updated, a generation section that generates a key by executing a predetermined irreversible calculation on unique information associated with the currently used data a number of times based on the serial number of the data to be updated, and a decryption section that decrypts the new data using the key.

A data update method of the present invention has, in an update method used for updating from currently used data to new data, an acquiring step of acquiring encrypted new data and a serial number of data to be updated, a generating step of generating a key by executing a predetermined irreversible calculation on unique information associated with the currently used data a number of times based on the serial number of the data to be updated, and a decrypting step of decrypting the new data using the key.

An encryption/decryption key generation method of the present invention generates a key used for data encryption or decryption, and has an acquiring step of acquiring unique information associated with the data and a serial number of the data, and a generating step of generating a key by executing a predetermined irreversible calculation on the unique information a number of times based on the serial number of the data.

An encryption key generation method of the present invention generates a key used for data encryption, and has an acquiring step of acquiring first secret information A and second secret information B associated with the data, a step of generating $X(n+j,A)$ by performing irreversible calculation $X$ $n+j$ times (where $n \geq 0$, $j \geq 0$) on the first secret information A, a step of generating $Y(M-n+i,B)$ by performing irreversible calculation $Y$ $M-n+i$ times (where $M \geq 0$, $i \geq 0$) on the second secret information B, and a step of synthesizing a key from information containing that $X(n+j,A)$ and $Y(M-n+i,B)$.

A decryption key generation method of the present invention generates a key used for data decryption, and has an acquiring step of acquiring first generation information Ca and second generation information Cb associated with the data, a step of generating $X(j,Ca)$ by performing irreversible calculation $X$ $j$ times (where $j \geq 0$) on the first generation information Ca, a step of generating $Y(i,Cb)$ by performing irreversible calculation $Y$ $i$ times (where $i \geq 0$) on the second generation information Cb, and a step of synthesizing a key from information containing that $X(j,Ca)$ and $Y(i,Cb)$.

An encryption method of the present invention encrypts data, and has an acquiring step of acquiring first secret information A and second secret information B and third secret information C and fourth secret information D associated with the data, a step of generating $X(n+j,A)$ by performing irreversible calculation $X$ $n+j$ times (where $n \geq 0$, $j \geq 0$) on the first secret information A, a step of generating $Y(M-n+i,B)$ by performing irreversible calculation $Y$ $M-n+i$ times (where $M \geq 0$, $i \geq 0$) on the second secret information B, a step of generating $U(N+q,C)$ by performing irreversible calculation $U$ $N+q$ times (where $N \geq 0$, $q \geq 0$) on the third secret information C, a step of generating $V(M-N+p,D)$ by performing irreversible calculation $V$ $M-N+p$ times (where $p \geq 0$) on the fourth secret information D, a step of synthesizing a key from information containing that $X(n+j,A)$ and $Y(M-n+i,B)$, a step of synthesizing a key from information containing that $U$ $(N+q,C)$ and $V$ $(M-N+p,D)$, a step of generating encryption key K, a step of encrypting data using the encryption key K, a step of encrypting the encryption key K using a key synthesized from information containing that $X$ $(n+j,A)$ and $Y$ $(M-n+i,B)$, and a step of encrypting the encryption key K using a key synthesized from information containing that $U(N+q,C)$ and $V(M-N+p,D)$.

An encryption key generation method of the present invention generates a key used for data encryption, and has an acquiring step of acquiring first secret information A and second secret information B and third secret information C and fourth secret information D associated with the data, a step of generating $X$ $(n+j,A)$ by performing irreversible calculation $X$ $n+j$ times (where $n \geq 0$, $j \geq 0$) on the first secret information A, a step of generating $Y(M-n+i,B)$ by performing irreversible calculation $Y$ $M-n+i$ times (where $M \geq 0$, $i \geq 0$) on the second secret information B, a step of generating $U(s+q,C)$ by performing irreversible calculation $U$ $s+q$ times (where $s \geq 0$, $q \geq 0$) on the third secret information C, a step of generating $V(M-s+p,D)$ by performing irreversible calculation $V$ $M-s+p$ times (where $p \geq 0$) on the fourth secret information D, and a step of synthesizing a key from information containing that $X(n+j,A)$ and $Y(M-n+i,B)$ and $U(s+q,C)$ and $V(M-s+p,D)$.

A decryption key generation method of the present invention generates a key used for data decryption, and has an acquiring step of acquiring first generation information Ca and second generation information Cb and third generation information Cc and fourth generation information Cd associated with the data, a step of generating $X(j,Ca)$ by performing irreversible calculation $X$ $j$ times (where $j \geq 0$) on the first generation information Ca, a step of generating $Y(i,Cb)$ by performing irreversible calculation $Y$ $i$ times (where $i \geq 0$) on the second generation information Cb, a step of generating $U(q,Cc)$ by performing irreversible calculation $U$ $q$ times (where $q \geq 0$) on the third generation information Cc, a step of generating $V(p,Cd)$ by performing irreversible calculation $V$ $p$ times (where $p \geq 0$) on the fourth generation information Cd, and a step of synthesizing a key from information containing that $X(j,Ca)$ and $Y(i,Cb)$ and $U(q,Cc)$ and $V(p,Cd)$.

ADVANTAGEOUS EFFECT OF THE INVENTION

According to the present invention, updating of software of an apparatus such as a home electric apparatus can be performed safely and efficiently.

BRIEF DESCRIPTION OF DRAWINGS

FIG. 3 is a drawing showing the interrelationship of data stored in a home electric apparatus according to Embodiment 1 of the present invention;

FIG. 4A is a drawing showing currently used data, data to be updated, and new data according to Embodiment 1 of the present invention;

FIG. 4B is a drawing showing update information and control information according to Embodiment 1 of the present invention;

FIG. 17 is a drawing showing the interrelationship of data stored in a home electric apparatus according to Embodiment 8 of the present invention;

FIG. 18A is a drawing showing currently used data, data to be updated, and new data according to Embodiment 8 of the present invention;

FIG. 21 is a drawing showing the interrelationship of data stored in a home electric apparatus according to Embodiment 9 of the present invention;

FIG. 22A is a drawing showing currently used data, data to be updated, and new data according to Embodiment 9 of the present invention;

BEST MODE FOR CARRYING OUT THE INVENTION

Embodiments of the present invention will now be described in detail with reference to the accompanying drawings.

(Embodiment 1)

Figure 1A:
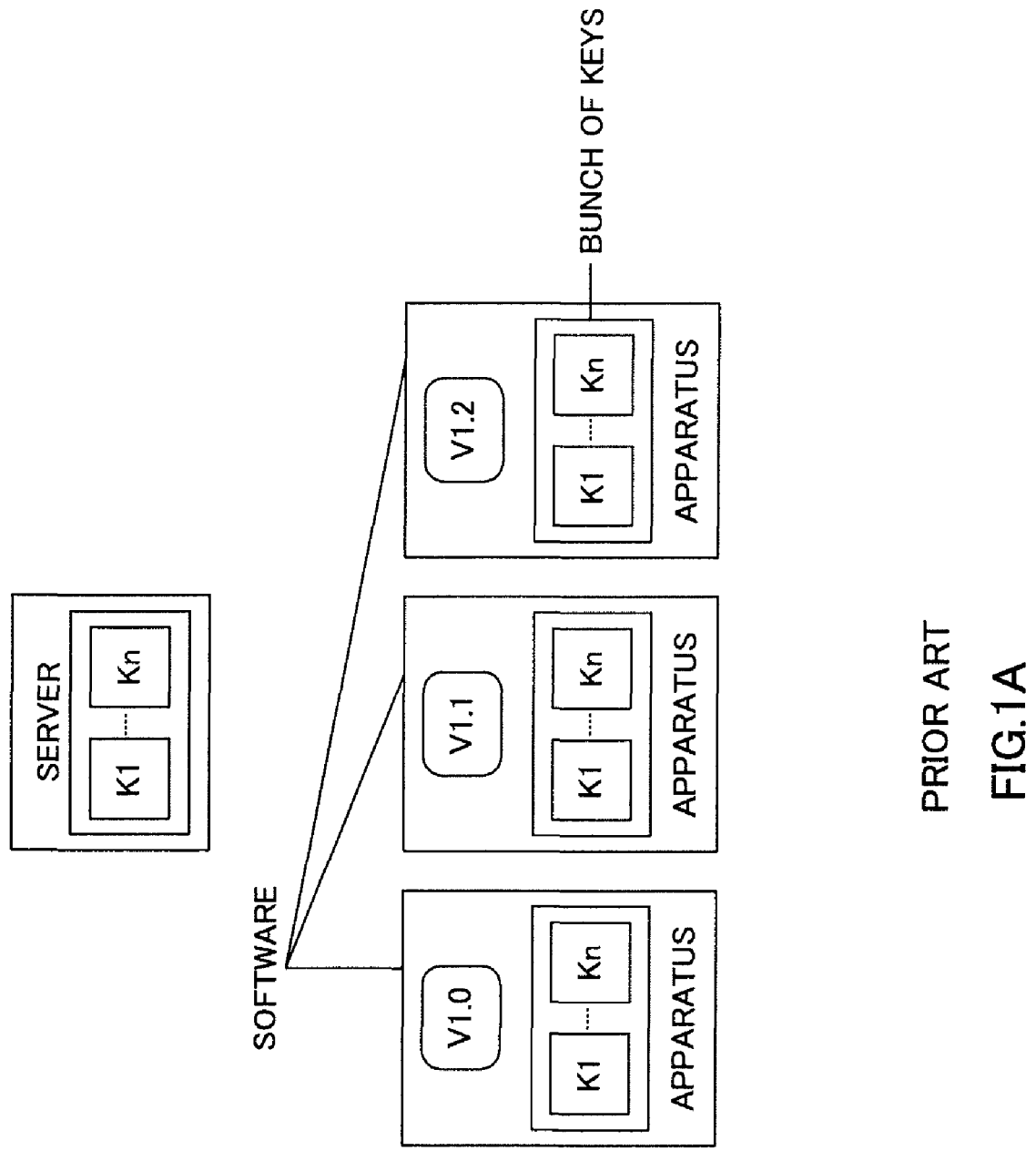
FIG. 1A is a drawing showing an example of a conventional software update method.
Figure 1B:
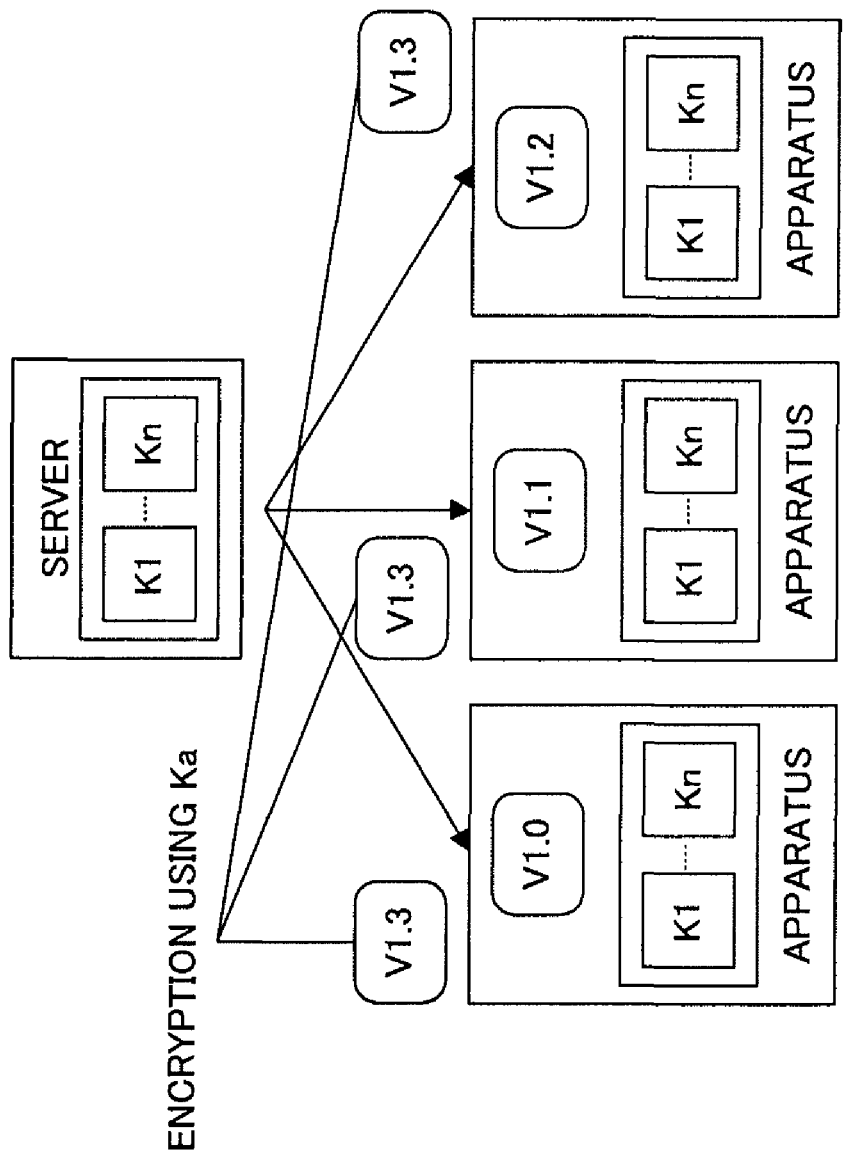
FIG. 1B is a drawing showing another example of a conventional software update method.
Figure 2:
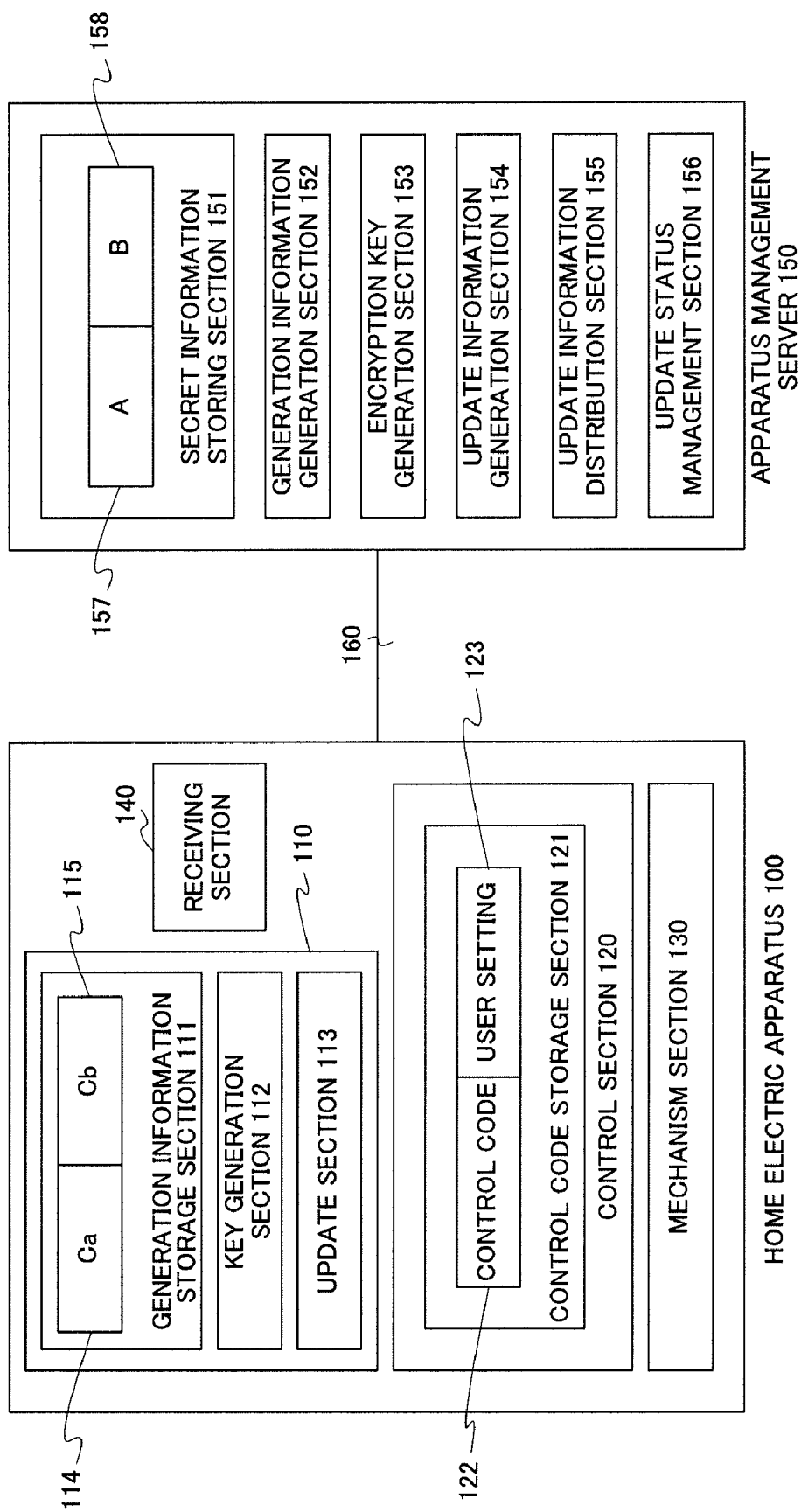
FIG. 2 is a block diagram showing the configuration of a software update system according to Embodiment 1 of the present invention.

FIG. 2 shows a data communication system serving as a software update system according to Embodiment 1 of the present invention. This software update system is composed of home electric apparatus 100 provided with a software update function, apparatus management server 150 that distributes update information containing encrypted new software to home electric apparatus 100, and communication channel 160 enabling data communication between home electric apparatus 100 and apparatus ZS management server 150. Apparatus management server 150 is installed and managed by a manufacturing company, sales company, or the like, that manages software of home electric apparatus 100.

Home electric apparatus 100 is composed of receiving section 140 that receives distributed update information, mechanism section 130 configured by means of hardware that performs actual physical operations relating to the intrinsic functions of home electric apparatus 100, control section 120 that controls the operation of mechanism section 130, and apparatus management module 110 that updates software stored in control section 120.

Control section 120 is provided with control code storage section 121 in which control code 122 as home electric apparatus 100 software, and a user setting 123 that is information set by a user, are stored. Control section 120 is composed of a CPU (Central Processing Unit) that controls mechanism section 130 by executing control code 122, and memory forming control code storage section 121.

Apparatus management module 110 is composed of generation information storage section 111 that stores generation information Ca 114 and generation information Cb 115 that are key components for generating a key used in encryption/decryption processing, key generation section 112 as an acquisition section, calculation section, synthesis (combining) section, and generation section, that generates a key from these generation information items, and update section 113 that has a function as a decryption section that decrypts update information using a generated key, and updates software by means of decrypted update information. It is assumed that apparatus management module 110 is configured by means of an integrated circuit, and this integrated circuit is composed of a CPU that executes a software module corresponding to key generation section 112 and update section 113, and memory forming generation information storage section 111, and is preferably a tamper-proof integrated circuit.

Apparatus management server 150 is composed of secret information storing section 151, generation information generation section 152, encryption key generation section 153, update information generation section 154, update information distribution section 155, and update status management section 156.

Secret information storing section 151 stores secret information A 157 and secret information B 158 comprising source information for generating generation information.

These secret information items normally differ for each model of home electric apparatus, are not disclosed externally, and are stringently managed by apparatus management server 150. When apparatus management server 150 distributes update information to a plurality of home electric apparatuses, it manages a secret information A and B pair on a model-by-model basis. If the same software is used by different home electric apparatus models, provision may be made for the same secret information to be assigned.

Generation information generation section 152 generates generation information from secret information A 157 and secret information B 158.

Encryption key generation section 153 generates a key by combining the generated generation information.

Update information generation section 154 encrypts new software using the generated key and generates update information.

Update information distribution section 155 distributes generated update information to home electric apparatus 100.

Update status management section 156 manages the software update status of home electric apparatus 100.

Communication channel 160 is, for example, a TV broadcast or suchlike broadcast network, a wired communication network such as the Internet, or a mobile telephony or suchlike wireless communication network. Data communication between home electric apparatus 100 and apparatus management server 150 may also be performed via a storage medium such as a memory card or an IC card instead of via communication channel 160.

FIG. 3 is a drawing showing the interrelationship of data stored in home electric apparatus 100—that is, control code and two generation information items Ca and Cb.

Generation information Ca and generation information Cb are generated by generation information generation section 152 of apparatus management server 150 from secret information A 157 and secret information B 158 respectively, and differ according to the serial number of the software version of home electric apparatus 100. Here, the serial number of a software version is a number indicating the software release order, and is incremented each time a new version is released. The serial number of an initial software version is "1", and the serial number is incremented by 1 for each release of a new version. For example, if the version number of an initial version of software is Version 1.0.0, the version number of software released next is Version 1.0.1, the version number of software released next is Version 1.0.2, and the version number of software released next Version 1.1.0, then the serial number of the Version 1.0.0 software version is 1, the serial number of the Version 1.0.1 software version is 2, the serial number of the Version 1.0.2 software version is 3, and the serial number of the Version 1.1.0 software version is 4. In FIG. 3, for example, when the software version serial number is 1, control code P1, and generation information $Ca=X(1,A)$ and generation information $Cb=Y(M-1,B)$ generated by generation information generation section 152 of apparatus management server 150, are stored in home electric apparatus 100. Similarly, when the software version serial number is n, control code Pn, and generation information $Ca=X(n,A)$ and generation information $Cb=Y(M-n,B)$ generated by generation information generation section 152 of apparatus management server 150, are stored in home electric apparatus 100. In other words, if the serial number of the currently used software version is n, the software itself (or part thereof) being used is control code Pn. Also, generation information $Ca=X(n,A)$ and generation information $Cb=Y(M-n,B)$ are held as information unique to control code Pn, and are used as key components in key generation.

Here, X and Y indicate mutually different predetermined irreversible calculations. $X(p,a)$ indicates the result of repeating irreversible calculation X p times using data a as a starting parameter of the irreversible calculation X, and $Y(q,b)$ indicates the result of repeating irreversible calculation Y q times using data b as a starting parameter of the irreversible calculation X. Therefore, generation information $X(1,A)$ is the result when irreversible calculation X is performed once on secret information A, and generation information $Y(M-1,B)$ is the result when irreversible calculation Y is repeated M−1 times using secret information B as a starting parameter of the irreversible calculation Y. M−1 indicates the maximum value of a software version serial number, and M (an integer such that $M-1 \geq 1$) is assumed to be a sufficiently large value.

Generation information $X(n,A)$ is the result when irreversible calculation X is repeated n times using secret information A as a starting parameter of the irreversible calculation X, and secret information A cannot be calculated from generation information $X(n,A)$. Generation information $Y(M-n,B)$ is the result when irreversible calculation Y is repeated M−n times using secret information B as a starting parameter of the irreversible calculation Y, and secret information B cannot be calculated from generation information $Y(M-n,B)$.

An operation that updates software of home electric apparatus 100 will now be described.

When a need arises for software of a home electric apparatus model managed by apparatus management server 150 to be updated to new software, apparatus management server 150 encrypts new software based on the version of software installed in the home electric apparatus to be updated, generates update information, and distributes this to each home electric apparatus via communication channel 160.

Here, a case will be described by way of example in which it is necessary, as shown in FIG. 4A, for software whose software version serial numbers are n−i through n+j (where i and j are integers satisfying the condition $1 \leq n-i \leq n+j \leq M-1$) (that is, software to be updated) to be updated to software whose software version serial number is n+k (where k is an integer satisfying the condition $1 \leq n+k \leq M-1$) (that is, new software). It is assumed that the serial number of the version of software currently being used in home electric apparatus 100 (that is, currently used software) is n (where n is an integer satisfying the condition $n-i \leq n \leq n+j$).

Figure 5A:
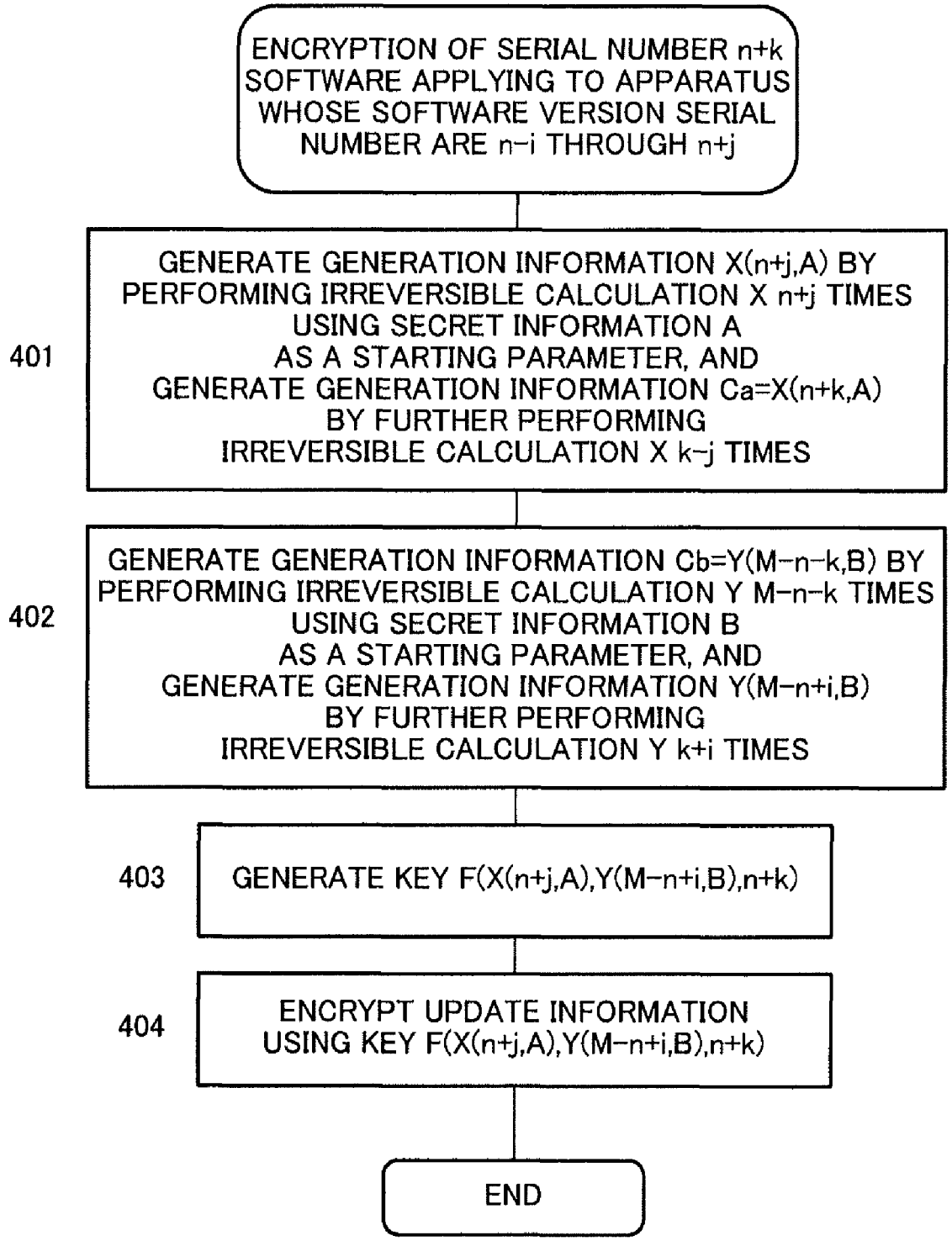
FIG. 5A is a flowchart of encryption processing by an apparatus management server according to Embodiment 1 of the present invention.

As shown in the flowchart in FIG. 5A, first, generation information generation section 152 of apparatus management server 150 reads secret information A 157 and secret information B 158 corresponding to home electric apparatus 100 from secret information storing section 151, generates generation information X (n+j,A) by performing irreversible calculation X n+j times using secret information A 157 as a starting parameter of the irreversible calculation X and also generates X (n+k,A), which is generation information Ca in the case of serial number n+k, by performing irreversible calculation X k−j times (step 401), then generates Y(M−n−k, B), which is generation information Cb in the case of serial number n+k, by performing irreversible calculation Y M−n−k times using secret information B 158 as a starting parameter of the irreversible calculation Y and also generates generation information Y(M−n+i,B) by performing irreversible calculation Y k+i times (step 402). Next, encryption key generation section 153 generates key F(X(n+j,A), Y(M−n+i,B), n+k) by combining generated generation information X(n+j,A) and generation information Y(M−n+i,B) and serial number n+k (step 403). Here, key F(x,y,z) is an arbitrary function that has x, y, and z as variables, and the function $F(x,y,z)=H(x\|y\|z)$ (in which a hashing operation is executed on the data concatenation of x and y and z) may be used, for example.

Next, update information generation section 154 encrypts generation information Ca (=X(n+k,A)) and generation information Cb (=Y(M−n−k,B)) and control code Pn+k for the case of serial number n+k using generated key F(X(n+j, A), Y(M−n+i,B), n+k) (step 404), and also adds control information, and generates update information with the kind of data structure shown in FIG. 4B.

Next, update information distribution section 155 distributes generated update information to home electric apparatuses including home electric apparatus 100 via communication channel 160.

Here, control information is information that controls update information processing in home electric apparatus 100 that receives update information. Control information includes information stipulating a home electric apparatus model to be updated. Specifically, for example, a maker code indicating the manufacturing company, a home electric apparatus model number, and a software version serial number are included, and information indicating a manufacture serial number range may also be included. Control information also includes a post-update software version serial number as information stipulating the post-update software version. Control information may also include program data actually executed in a home electric apparatus, and may additionally include an electronic signature or suchlike verification data for verifying the validity of this program data. In the case of this embodiment, it is assumed that program data that converts user setting 123 stored in control code storage section 121 to a valid data format for new software is also included.

Next, on receiving update information, home electric apparatus 100 generates a key for decrypting encrypted form of update information from generation information based on update information control information, decrypts update information encryption, and updates software to that contained in the update information. A case in which the software version serial number of software installed in home electric apparatus 100 is n (where $n-i \leq n \leq n+j$) will be described here as an example.

Figure 5B:
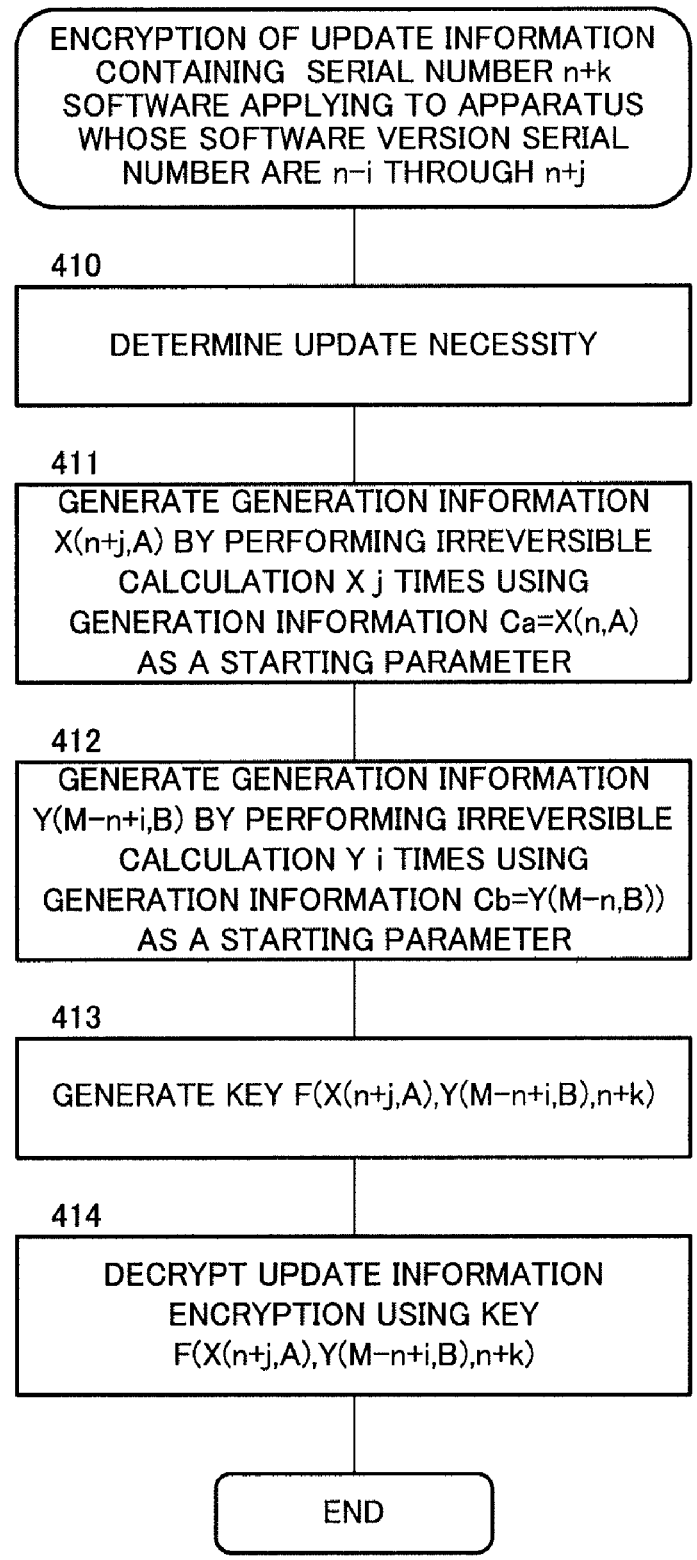
FIG. 5B is a flowchart of decryption processing by a home electric apparatus according to Embodiment 1 of the present invention.

As shown in the flowchart in FIG. 5B, first, receiving section 140 of home electric apparatus 100 receives update information distributed from apparatus management server 150 via communication channel 160. Update section 113 of apparatus management module 110 of home electric apparatus 100 determines whether or not it is necessary to update software based on update information control information (step 410). Specifically, update section 113 acquires control information, and if a maker code and model number stipulated in the acquired control information match the maker code and model number of home electric apparatus 100, and furthermore the software version serial number of home electric apparatus 100 is included in serial numbers of software versions to be updated stipulated in the control information, determines that an update is necessary. In the event of determining an update to be unnecessary in the update necessity determination in step 410, update section 113 discards the received update information without further action.

If an update is determined to be necessary, key generation section 112 reads generation information Ca (=X(n,A)) and generation information Cb (=Y(M−n,B)) from generation information storage section 111, generates generation information X(n+j,A) by performing irreversible calculation X j times using generation information Ca (=X(n,A)) as a starting parameter of the irreversible calculation X (step 411), generates generation information Y(M−n+i,B) by performing irreversible calculation Y i times using generation information Cb (=Y(M−n,B)) as a starting parameter of the irreversible calculation Y (step 412), and furthermore generates key F(X(n+j,A), Y(M−n+i,B), n+k) from generated generation information X(n+j,A) and Y(M−n+i,B) and serial number n+k (step 413).

Next, update section 113 decrypts an encrypted part of update information (step 414), extracts generation information Ca (=X(n+k,A)) and generation information Cb (=Y(M−n−k,B)) and control code Pn+k for the case in which the serial number is n+k, updates control code storage section 121 control code Pn to control code Pn+k, and updates generation information storage section 111 generation information Ca (=X(n,A)) and generation information Cb (=Y(M−n,B)) respectively to generation information Ca (=X(n+k,A)) and generation information Cb (=Y(M−n−k,B)).

Furthermore, update section 113 executes program data contained in the control information, updates user setting 123 stored in control code storage section 121 by converting user setting 123 to a data format that is also valid for new control code Pn+k, and thereby completes the software update. At this time, after decrypting an encrypted part of update information, update section 113 checks that the decryption processing has been performed normally by checking a parity bit of decrypted data or the like.

As described above, even if there is a mix of apparatuses having a plurality of software versions among a plurality of home electric apparatuses to be updated, as long as a home electric apparatus is one for which the software version of installed software is a software version to be updated stipulated by update information control information (having serial number n, where $n-i \leq n \leq n+j$), a key for decrypting an encrypted part of update information can be generated, and a software update can be performed. Also, on the home electric apparatus 100 side, only two items of generation information need be held, and only low-load hashing operation processing need be performed, using a small amount of data, while an encryption/decryption key for distributed update information can be changed for each update, thus improving the safety of update information distribution.

On the other hand, if the software version of software installed in a home electric apparatus is not a software version to be updated stipulated by update information control information, a key for decrypting an encrypted part of update information cannot be generated, and therefore software cannot be updated. For example, in the case of the above example, if the software version serial number of software installed in a home electric apparatus is n−i−1, generation information Cb stored in generation information storage section 111 is Y(M−n+i+1,B), and thus generation information Y(M−n+i,B) cannot be generated from this generation information Cb (=Y(M−n+i+1,B)). Therefore, in this case a key for decrypting an encrypted part of update information cannot be generated. Also, if the software version serial number of software installed in a home electric apparatus is n+j+1, generation information Ca stored in generation information storage section 111 is X(n+j+1,A), and thus generation information X (n+j,A) cannot be generated from this generation information Ca (=X(n+j+1,A)). Therefore, in this case also, a key for decrypting an encrypted part of update information cannot be generated. Thus, when the software version of software installed in a home electric apparatus is not a software version to be updated, a key for decrypting an encrypted part of update information cannot even be generated, enabling erroneous updating of software due to an operational error by a user to be prevented.

In the above description, a key that encrypts update information has been assumed to be F(X(n+j,A), Y(M−n+i,B), n+k), but G (X(n+j,A), Y(M−n+i,B)) having only X(n+j,A) and Y(M−n+i,B) as variables may also be used as a key that encrypts update information. Here, G(x,y) is an arbitrary function that has x and y as variables, and the function G(x, y)=H(x∥y) (in which a hashing operation is executed on the data concatenation of x and y) may be used, for example.

In this case, in the step 413 processing, key generation section 112 of home electric apparatus 100 generates key G (X(n+j,A), Y(M−n+i,B)) that decrypts an encrypted part of update information from generated generation information X(n+j,A) and Y(M−n+i,B) If the software version to be updated is the same, the key is also the same, but in this case also, software versions to be updated can be limited, and key generation processing on the home electric apparatus side can be simplified.

In the above description, apparatus management module 110 has been assumed to be an integrated circuit having a CPU separate from the CPU of control section 120, but the apparatus management module 110 function may also be configured using the CPU and memory of control section 120.

In the above description, it has been assumed that updating of control code stored in home electric apparatus 100 is performed, but not only control code but also specific data stored in home electric apparatus 100 may also be updated using the same kind of arrangement, with this specific data including multimedia content, license information, table information or a database referenced by control code, and so forth.

In the above description, it has been assumed that updating of control code stored in home electric apparatus 100 is performed, but some or all of the functions of home electric apparatus 100 may also be disabled by updating specific data stored in home electric apparatus 100 using the same kind of arrangement. This specific data may include control code, home electric apparatus 100 internal control flag information, key data used in encryption processing, multimedia content, license information, table information or a database referenced by control code, and so forth, with some or all of the functions of home electric apparatus 100 being disabled by updating these data to invalid data.

(Embodiment 2)

Figure 6:
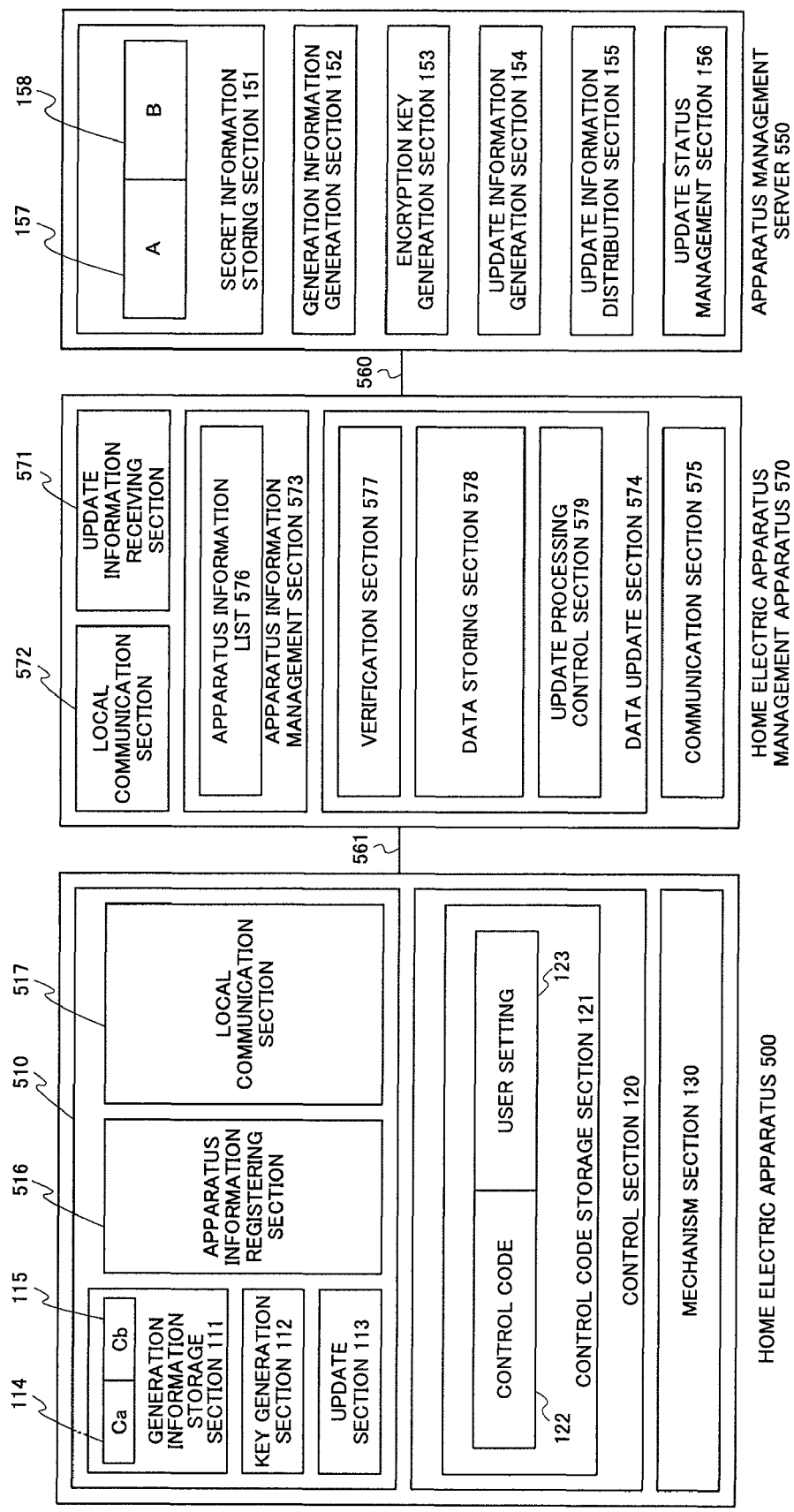
FIG. 6 is a block diagram showing the configuration of a software update system according to Embodiment 2 of the present invention.

FIG. 6 is a block diagram showing the configuration of a software update system according to Embodiment 2 of the present invention. A software update system described in this embodiment has basically the same kind of configuration as described in Embodiment 1. Therefore, in this embodiment, configuration elements identical to those described in Embodiment 1 are assigned the same reference codes as in Embodiment 1, and detailed descriptions thereof are omitted.

A software update system of this embodiment differs from a software update system of Embodiment 1 in that a home electric apparatus management apparatus is connected between a home electric apparatus and an apparatus management server. This is, in particular, to enable a software update of a home electric apparatus not having a function for connection to an external network to be performed dependably and efficiently.

Therefore, as shown in FIG. 6, a software update system of this embodiment is composed of home electric apparatus 500 provided with a function for updating software, apparatus management server 550 that distributes the same kind of update information as in Embodiment 1, including encrypted new software, to home electric apparatus 500, and home electric apparatus management apparatus 570 that manages a plurality of in-home home electric apparatuses, including home electric apparatus 500.

Home electric apparatus 500 is composed of control section 120 and mechanism section 130 described in Embodiment 1, and an apparatus management module that updates software stored in control section 120.

Apparatus management module 510 is composed of generation information storage section 111, key generation section 112, and update section 113 described in Embodiment 1, plus local communication section 517 as a receiving section and transfer section that performs communication with home electric apparatus management apparatus 570 via local network 561, and apparatus information registering section 516 as a reporting section that continually registers home electric apparatus 500 apparatus information into home electric apparatus management apparatus 570 via local network 561. Here, local network 561 may be a power line network that performs communication via a power line, a near field communication network using contactless IC card wireless communication, infrared, or suchlike near field communication, a LAN network, or a wireless LAN network.

Apparatus management module 510 is configured by means of an integrated circuit comprising a CPU that executes a software module corresponding to key generation section 112, update section 113, and apparatus information registering section 516, memory forming generation information storage section 111, and a modem circuit forming local communication section 517.

Apparatus information registering section 516 performs registration of apparatus information in advance by reporting its own apparatus information to home electric apparatus management apparatus 570 via local network 561 in a home in which home electric apparatus 500 is installed, by way of local communication section 517. Apparatus information registered in apparatus information management section 573 includes the maker code, model number, and manufacturing number of that home electric apparatus, together with the serial number of the software version of that home electric apparatus.

Apparatus management server 550 has the same internal configuration as apparatus management server 150 described in Embodiment 1. In the case of this embodiment, generated apparatus information is distributed to home electric apparatus management apparatus 570.

Home electric apparatus management apparatus 570 is composed of update information receiving section 571 that receives update information from apparatus management server 550 via communication channel 560, local communication section 572 that communicates with a home electric apparatus via local network 561, apparatus information management section 573 that manages apparatus information reported for registering from home electric apparatuses on an individual home electric apparatus basis and stores this apparatus information as apparatus information list 576, data update section 574 that updates software of each home electric apparatus in conjunction with an apparatus management module of each home electric apparatus, and communication section 575 that reports the software update results of each home electric apparatus together with apparatus information to apparatus management server 550.

In data update section 574, verification section 577 verifies information stipulating a home electric apparatus model to be updated in update information control information with apparatus information list 576 model information, and determines whether or not a home electric apparatus for which a software update is necessary has been registered. If a home electric apparatus for which apparatus information matches a home electric apparatus to be updated has been registered, update processing control section 579 communicates with the relevant home electric apparatus 500 via local network 561 and performs software update processing. In the course of this update processing, received update information is held in data storing section 578, and pre-update software is backed up in data storing section 578 from home electric apparatus 500.

Communication channel 560 may be a TV broadcast or suchlike broadcast network, a wired communication network such as the Internet, or a mobile telephony or suchlike wireless communication network, and may also be composed of a plurality of kinds of communication network. Apparatus information management section 573 is provided with nonvolatile memory that stores apparatus information list 576. Data update section 574 is composed of a CPU that executes a software module corresponding to verification section 577 and update processing control section 579, and memory forming data storing section 578. When update processing is executed, received update information and encrypted home electric apparatus pre-update software is held in data storing section 578.

Thus, according to this embodiment, apparatus information of a home electric apparatus is registered in advance into home electric apparatus management apparatus 570, home electric apparatus management apparatus 570 receives update information from apparatus management server 550, and when it is necessary to update software, individual home electric apparatuses receive update information via home electric apparatus management apparatus 570 and perform software updating. Consequently, it is no longer necessary for individual home electric apparatuses to have a function that receives update information directly from apparatus management server 550 or a function that connects to an external network, such as a TV tuner, Internet modem, or suchlike function, for example, enabling a home electric apparatus provided with a software update function to be configured at low cost.

According to this embodiment, home electric apparatus management apparatus 570 receives update information distributed from apparatus management server 550. This enables updating of software of each home electric apparatus to be performed dependably. It is not absolutely essential for each home electric apparatus to be in a powered-on state when update information is distributed from apparatus management server 550, and when power is turned on, software updating can be carried out dependably by performing update processing via home electric apparatus management apparatus 570.

In this embodiment, data storing section 578 of data update section 574 of home electric apparatus management apparatus 570 can be used as an update information buffer area and pre-update software backup area, enabling memory necessary for update processing to be kept to a minimum in individual home electric apparatuses. Also, even if update processing should fail, the original status can be restored by returning backed-up pre-update software to its original state, enabling the safety of update processing to be further improved. In actuality, processing in the event of an update processing failure may be performed based on program data contained in update information control information set by apparatus management server 550. Based on that program data, the original status may be restored by returning backed-up pre-update software to its original state, or, for safety, a home electric apparatus may be set to a function-stopped state without restoring the original status.

In the above description, apparatus management module 510 has been assumed to be an integrated circuit having a CPU separate from the CPU of control section 120, but the apparatus management module 510 function may also be configured using the CPU and memory of control section 120.

In the above description, it has been assumed that local communication section 517 is incorporated in apparatus management module 510, but a local communication module may also be provided that performs local communication with home electric apparatus management apparatus 570 independently of apparatus management module 510.

Update status management section 156 of apparatus management server 550 may also be provided with a function that manages a home electric apparatus 500 user's user information and loyalty point information, with loyalty points being awarded to a user who updates home electric apparatus 500 software. In this case, identification information of a user managing home electric apparatus 500 is contained in information from home electric apparatus management apparatus 570 reporting that home electric apparatus 500 software has been updated to apparatus management server 550. When the fact that a home electric apparatus 500 software update has been performed is reported to apparatus management server 550 from home electric apparatus management apparatus 570, update status management section 156 updates the home electric apparatus 500 software update status and also adds predetermined points to the home electric apparatus 500 user's loyalty point information. If loyalty points are awarded to a user who updates home electric apparatus 500 software in this way, an increase in purchasers of home electric apparatus 500 and home electric apparatus management apparatus 570 corresponding to a software update system of the present invention can be expected, and an increase in software update system users can be expected.

In the above description, it has been assumed that loyalty points are awarded to a user when home electric apparatus 500 software is updated, but conversely, predetermined points may be subtracted from a user's loyalty point information when home electric apparatus 500 software is updated. This is a way of using loyalty points as a counter-value strategy when a software update is paid for, such as when upgrading to the latest software version with new functions added, rather than updating because of a software bug or the like.

In the above description, it has been assumed that updating of control code stored in home electric apparatus 500 is performed, but not only control code but also specific data stored in home electric apparatus 500 may also be updated using the same kind of arrangement, with this specific data including multimedia content, license information, table information or a database referenced by control code, and so forth.

In the above description, it has been assumed that updating of control code stored in home electric apparatus 500 is performed, but some or all of the functions of home electric apparatus 500 may also be disabled by updating specific data stored in home electric apparatus 500 using the same kind of arrangement. This specific data may include control code, home electric apparatus 500 internal control flag information, key data used in encryption processing, multimedia content, license information, table information or a database referenced by control code, and so forth, with some or all of the functions of home electric apparatus 500 being disabled by updating these data to invalid data.

(Embodiment 3)

Figure 7A:
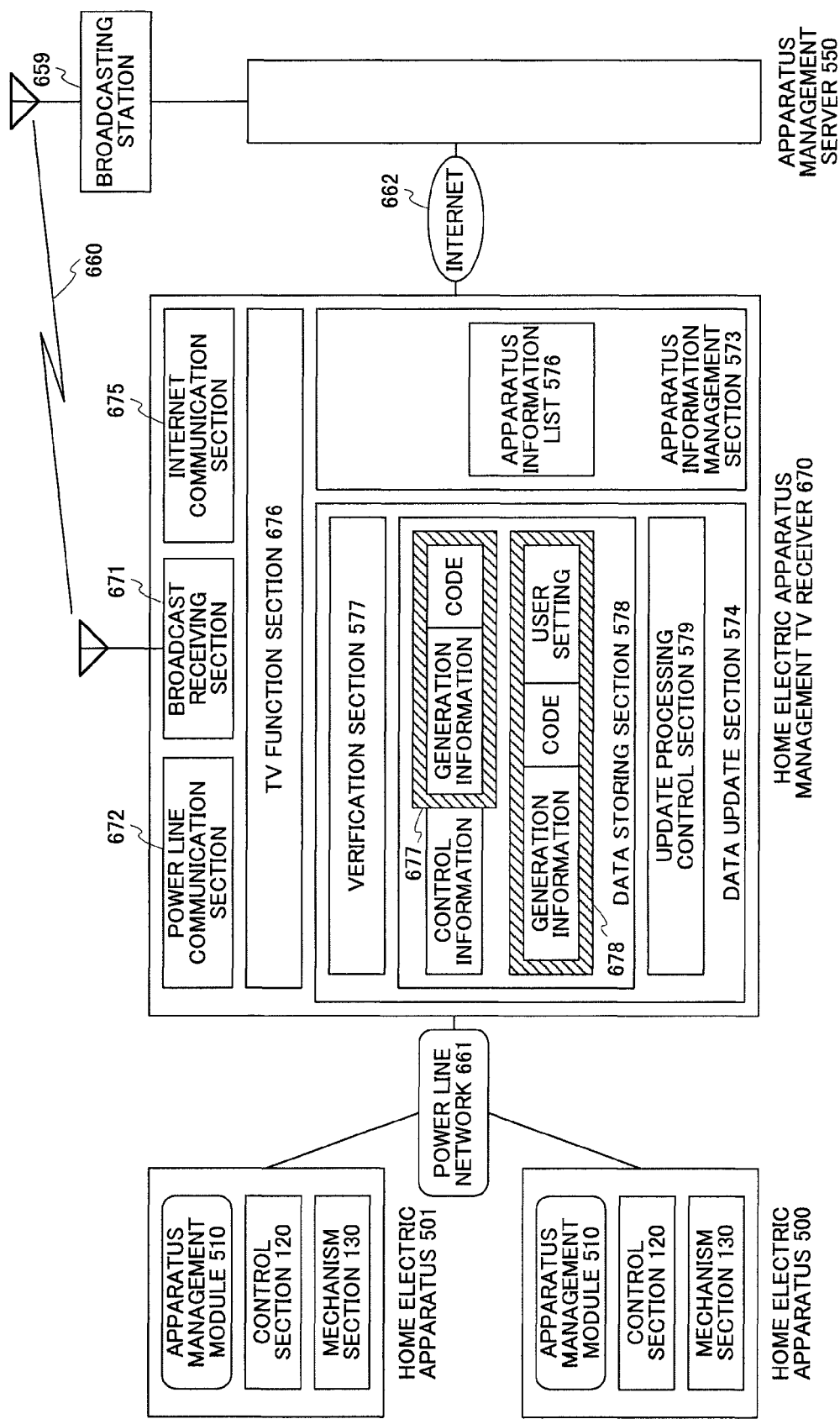
FIG. 7A is a block diagram showing the configuration of a software update system according to Embodiment 3 of the present invention.
Figure 7B:
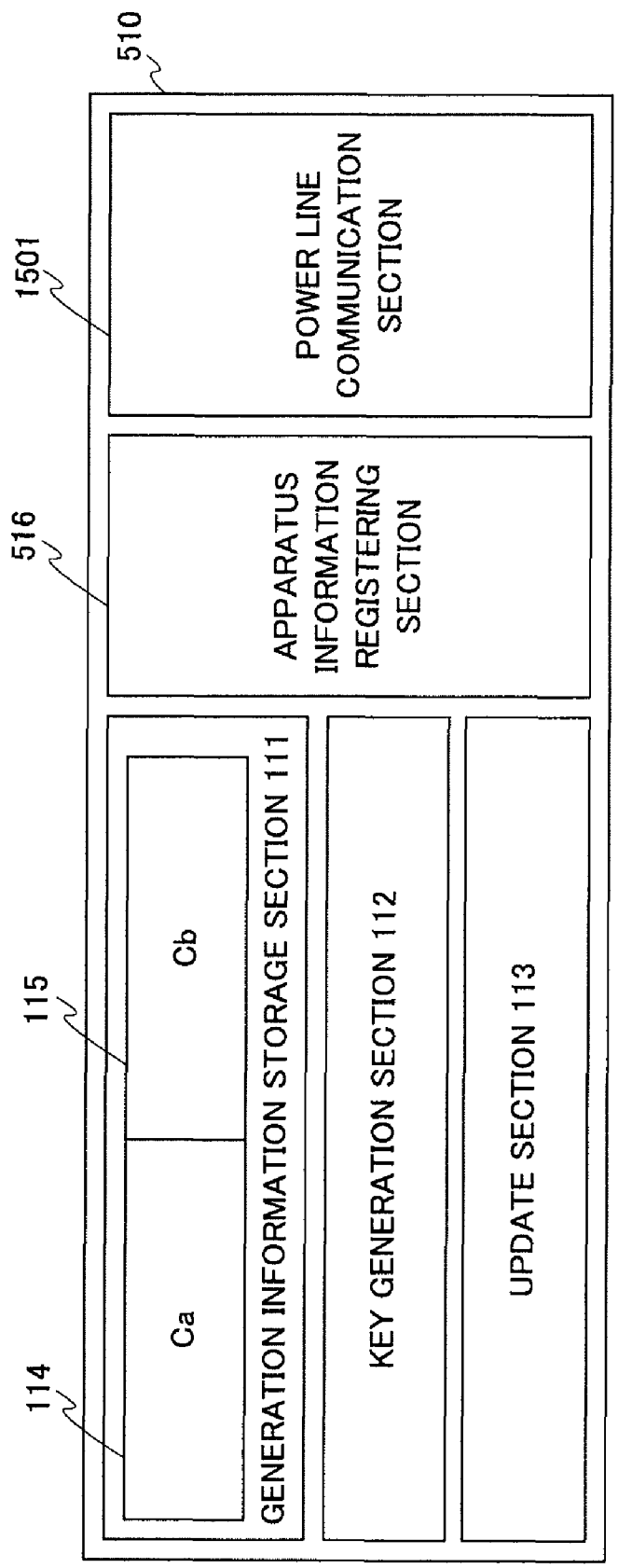
FIG. 7B is a block diagram showing the configuration of an apparatus management module according to Embodiment 3 of the present invention.

FIG. 7A is a block diagram showing the configuration of a software update system according to Embodiment 3 of the present invention, and FIG. 7B is a block diagram showing the configuration of an apparatus management module according to Embodiment 3 of the present invention. A software update system described in this embodiment has basically the same kind of configuration as described in above embodiments. Therefore, in this embodiment, configuration elements identical to those described in above embodiments are assigned the same reference codes as in above embodiments, and detailed descriptions thereof are omitted.

In a software update system of this embodiment a home electric apparatus management apparatus is connected between a home electric apparatus and an apparatus management server, in the same way as in Embodiment 2. In a software update system of this embodiment the home electric apparatus management apparatus described in Embodiment 2 is applied to a non-portable type of apparatus, such as a TV receiver, for example.

Therefore, as shown in FIG. 7A, a software update system of this embodiment is composed of home electric apparatus 500 described in Embodiment 2, home electric apparatus 501 having the same internal configuration as home electric apparatus 500, home electric apparatus management TV receiver 670 as a home electric apparatus management apparatus, apparatus management server 550 described in Embodiment 2, and broadcasting station 659 that broadcasts TV programs and the like. Apparatus management server 550 and broadcasting station 659 are connected so as to allow communication by means of a predetermined communication line. Broadcasting station 659 and home electric apparatus management TV receiver 670 are connected so as to allow communication by means of broadcast network 660. Apparatus management server 550 and home electric apparatus management TV receiver 670 are connected so as to allow communication by means of Internet 662. Home electric apparatus management TV receiver 670 and home electric apparatuses 500 and 501 are connected by means of power line network 661.

Home electric apparatuses 500 and 501 are assumed to be non-portable-type apparatuses that are normally connected to a power line, such as a refrigerator or air conditioner. As shown in FIG. 7B, in addition to generation information storage section 111, key generation section 112, update section 113, and apparatus information registering section 516, apparatus management module 510 of each of home electric apparatuses 500 and 501 is also provided with power line communication section 1501 as a local communication section performing communication with home electric apparatus management TV receiver 670 via power line network 661.

Home electric apparatus management TV receiver 670 is composed of data update section 574 and apparatus information management section 573 described in Embodiment 2, broadcast receiving section 671, power line communication section 672, and Internet communication section 675 corresponding respectively to update information receiving section 571, local communication section 572, and communication section 575 described in Embodiment 2, and TV function section 676.

Broadcast receiving section 671 receives ordinary TV broadcasting and update information contained in broadcast data. Power line communication section 672 performs communication with a home electric apparatus via power line network 661. Internet communication section 675 reports the software update results of each home electric apparatus to apparatus management server 550 via Internet 662. TV function section 676 displays ordinary TV broadcasting.

Figure 8:
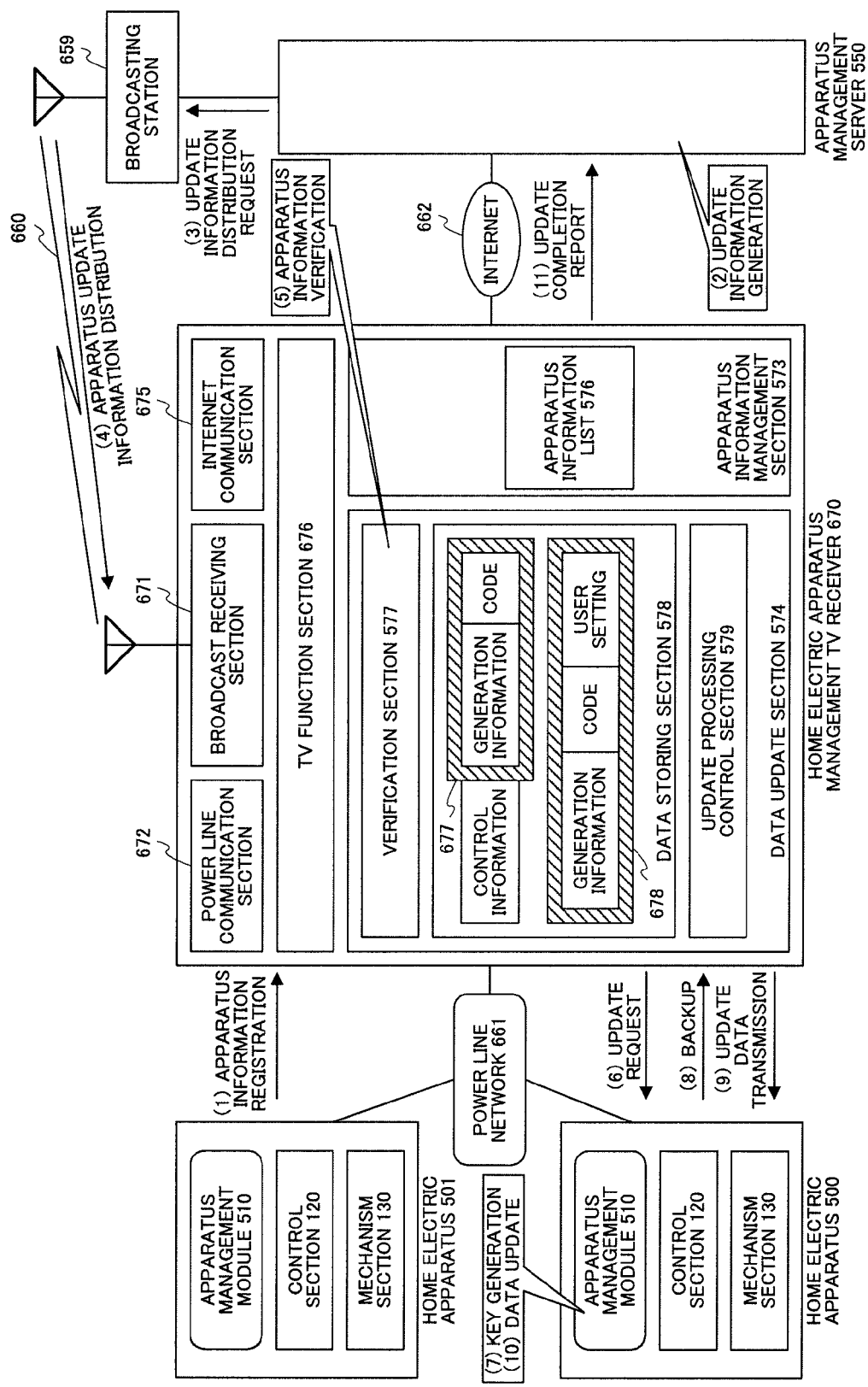
FIG. 8 is a drawing showing the flow of update processing in a software update system according to Embodiment 3 of the present invention.

FIG. 8 shows the flow of software update processing according to this embodiment.

First, home electric apparatuses 500 and 501 register apparatus information into home electric apparatus management TV receiver 670 via power line network 661 (step 1: apparatus information registration).

Next, when a need arises for home electric apparatus 500 software to be updated, apparatus management server 550 generates update information (step 2: update information generation). The procedure for generating update information is the same as that described in Embodiment 1.

Then apparatus management server 550 makes a request to broadcasting station 659 for update information distribution (step 3: update information distribution request), and broadcasting station 659 distributes update information to home electric apparatus management TV receiver 670 via broadcast network 660 (step 4: apparatus update information distribution).

In home electric apparatus management TV receiver 670 that has received update information via broadcast receiving section 671, verification section 577 verifies information stipulating a home electric apparatus model to be updated in update information control information with apparatus information list 576 model information, and determines whether or not a home electric apparatus for which a software update is necessary has been registered (step 5: apparatus information verification).

If a home electric apparatus for which the verified information matches has been registered, update processing control section 579 stores the update information in data storing section 578, and transmits an update request message containing the control information part in the update information to the relevant home electric apparatus 500 via power line communication section 672 (step 6: update request). If communication with home electric apparatus 500 cannot be performed for some reason and update request message transmission fails (such as when home electric apparatus 500 is not connected to power line network 661), update processing control section 579 displays the fact that a home electric apparatus 500 software update is necessary on the TV screen, and prompts the user to connect home electric apparatus 500 to power line network 661. When communication with home electric apparatus 500 becomes possible, update processing control section 579 transmits an update request message to home electric apparatus 500 once again.

In home electric apparatus 500 that has received an update request message from home electric apparatus management TV receiver 670, apparatus management module 510 generates a key for decrypting update information encryption based on update information control information contained in the update request message (step 7: key generation). The key generation procedure is the same as that described in Embodiment 1.

Next, apparatus management module 510 encrypts pre-update generation information Ca and Cb, control code, and a user setting using the generated key, and transfers these to data storing section 578 of home electric apparatus management TV receiver 670 for backup (step 8: backup).

Then update processing control section 579 of home electric apparatus management TV receiver 670 transmits the encrypted generation information Ca and Cb and control code parts in the update information to home electric apparatus 500 via power line communication section 672 (step 9: update data transmission).

Next, apparatus management module 510 of home electric apparatus 500 decrypts update information encryption, and updates the control code and generation information Ca and Cb (step 10: data update).

Then update processing control section 579 of home electric apparatus management TV receiver 670 reports apparatus information of home electric apparatus 500 for which a software update has been performed, together with the update processing result, to update status management section 156 of apparatus management server 550 via Internet communication section 675, completing the update processing (step 11: update completion report).

In the processing in steps 9 and 10, update processing is performed not by having encrypted update information transmitted collectively and decrypted on the home electric apparatus 500 side, but by having encrypted update information transmitted to home electric apparatus 500 in encryption block units and decrypted in block units.

The software update procedure for home electric apparatus 501 is the same as the software update procedure for home electric apparatus 500.

Thus, according to this embodiment, apparatus information of a home electric apparatus is registered in advance into home electric apparatus management TV receiver 670, home electric apparatus management TV receiver 670 receives update information via broadcast network 660, and when it is necessary to update software, individual home electric apparatuses receive update information via home electric apparatus management TV receiver 670 and perform software updating. Consequently, it is no longer necessary for individual home electric apparatuses to have a function that receives update information directly from apparatus management server 550 or a function that connects to an external network, and the capacity of memory required in individual home electric apparatuses in order to decrypt update information encryption can be kept down, enabling a home electric apparatus provided with a software update function to be configured at low cost.

Also, home electric apparatus management TV receiver 670 receives update information dependably via broadcast network 660, enabling a software update of each home electric apparatus to be performed dependably.

Furthermore, data storing section 578 of data update section 574 of home electric apparatus management TV receiver 670 can be used as a pre-update software backup area, enabling memory necessary for update processing to be kept to a minimum in individual home electric apparatuses. Also, even if update processing should fail, the original status can be restored by returning backed-up pre-update software to its original state, enabling the safety of update processing to be further improved.

In the above description, it has been assumed that home electric apparatus management TV receiver 670 receives update information via broadcast receiving section 671, but home electric apparatus management TV receiver 670 may also receive update information from apparatus management server 550 through Internet 662 via Internet communication section 675.

In this case, an apparatus management server 550 URL (Uniform Resource Locator) is also registered in advance into apparatus information list 576 as an item of apparatus information. Home electric apparatus management TV receiver 670 periodically transmits an update information request to apparatus management server 550 indicated by that URL from update processing control section 579 via Internet communication section 675. If there is update information for which distribution is necessary, apparatus management server 550 transmits the update information to home electric apparatus management TV receiver 670. Home electric apparatus management TV receiver 670 performs the same kind of processing for update information received via Internet communication section 675 as for update information received via broadcast receiving section 671.

An update information request transmitted to apparatus management server 550 by home electric apparatus management TV receiver 670 in the above description may be transmitted by home electric apparatus management TV receiver 670 based on an update processing request received from home electric apparatus 500 or 501. An update processing request is a message whereby home electric apparatus 500 or 501 makes a request for software update processing to home electric apparatus management TV receiver 670. On receiving an update processing request via power line communication section 672, home electric apparatus management TV receiver 670 transmits an update information request to apparatus management server 550. Subsequent processing is the same as in the procedure described above.

(Embodiment 4)

Figure 9A:
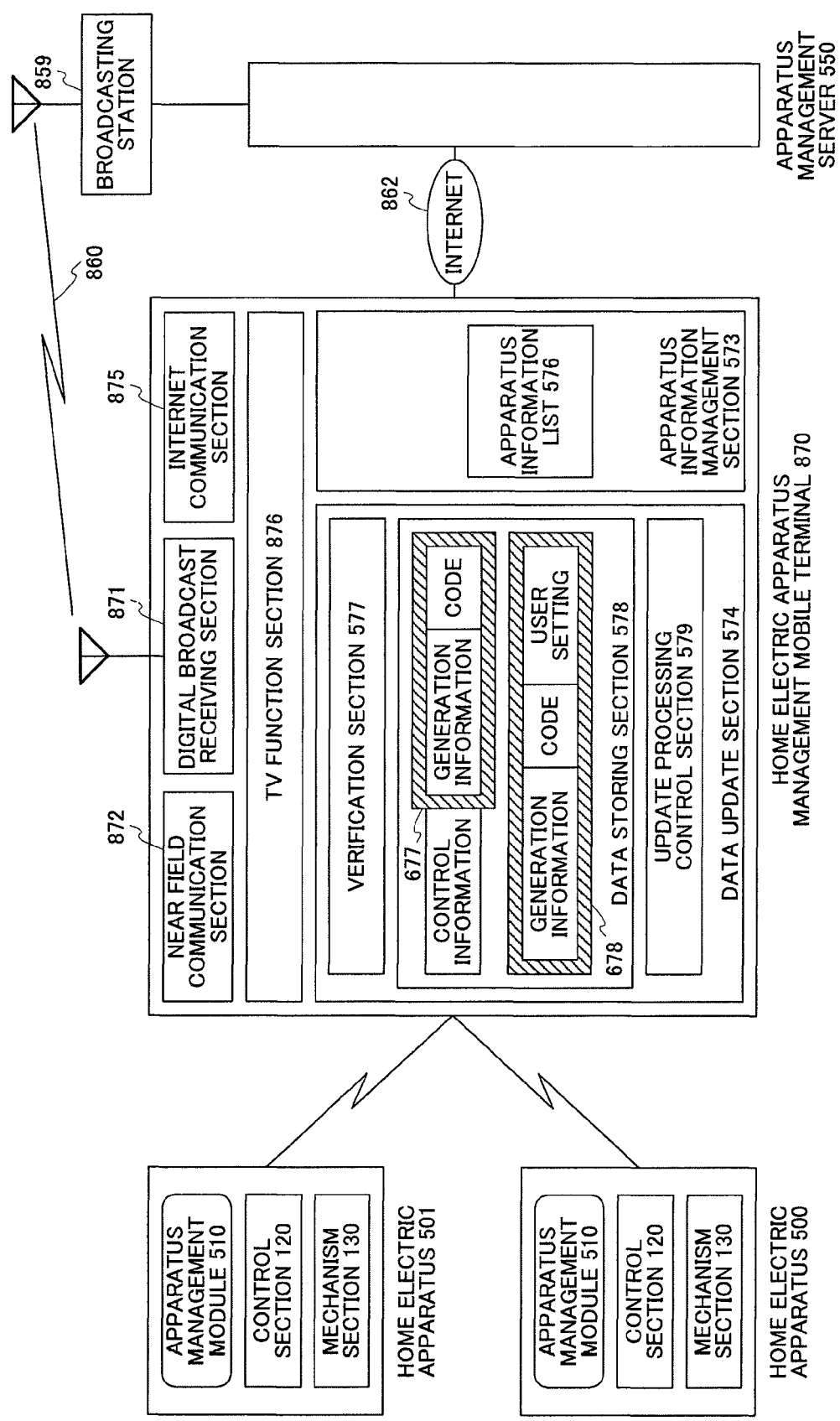
FIG. 9A is a drawing showing the configuration of a software update system according to Embodiment 4 of the present invention.
Figure 9B:
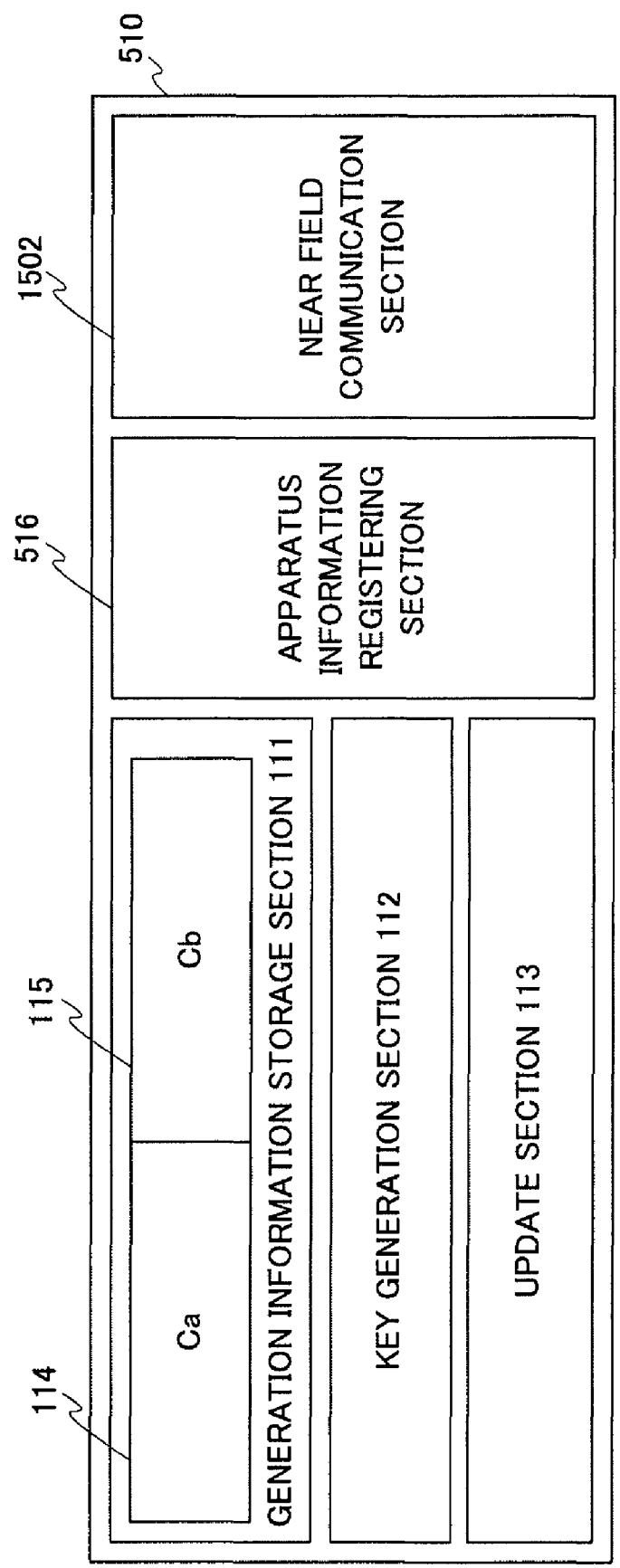
FIG. 9B is a block diagram showing the configuration of an apparatus management module according to Embodiment 4 of the present invention.

FIG. 9A is a block diagram showing the configuration of a software update system according to Embodiment 4 of the present invention, and FIG. 9B is a block diagram showing the configuration of an apparatus management module according to this embodiment. A software update system described in this embodiment has basically the same kind of configuration as described in above embodiments. Therefore, in this embodiment, configuration elements identical to those described in above embodiments are assigned the same reference codes as in above embodiments, and detailed descriptions thereof are omitted.

In a software update system of this embodiment a home electric apparatus management apparatus is connected between a home electric apparatus and an apparatus management server, in the same way as in Embodiment 2. In a software update system of this embodiment the home electric apparatus management apparatus described in Embodiment 2 is applied to a portable type of apparatus provided with a digital broadcast reception function, such as a mobile phone or suchlike mobile terminal, for example.

Therefore, as shown in FIG. 9A, a software update system of this embodiment is composed of home electric apparatus 500 described in Embodiment 2, home electric apparatus 501 described in Embodiment 3, home electric apparatus management mobile terminal 870 as a home electric apparatus management apparatus, apparatus management server 550 described in Embodiment 2, and broadcasting station 859 that provides a One-Seg broadcast service for TV programs and the like. Apparatus management server 550 and broadcasting station 859 are connected so as to allow communication by means of a predetermined communication line. Broadcasting station 859 and home electric apparatus management mobile terminal 870 are connected so as to allow communication by means of broadcast network 860. Apparatus management server 550 and home electric apparatus management mobile terminal 870 are connected so as to allow communication by means of Internet 862. Home electric apparatus management mobile terminal 870 and home electric apparatuses 500 and 501 are connected wirelessly.

Home electric apparatuses 500 and 501 are assumed to be battery-operated portable-type apparatuses, such as portable music players, for example. As shown in FIG. 9B, in addition to generation information storage section 111, key generation section 112, update section 113, and apparatus information registering section 516, apparatus management module 510 of each of home electric apparatuses 500 and 501 is also provided with near field communication section 1502 as a local communication section performing communication with home electric apparatus management mobile terminal 870 via near field wireless communication.

Home electric apparatus management mobile terminal 870 is composed of data update section 574 and apparatus information management section 573 described in Embodiment 2, digital broadcast receiving section 871, near field communication section 872, and Internet communication section 875 corresponding respectively to update information receiving section 571, local communication section 572, and communication section 575 described in Embodiment 2, and TV function section 876.

Digital broadcast receiving section 871 receives update information contained in One-Seg (1-segment) broadcast and suchlike digital broadcast data. Near field communication section 872 performs communication with a home electric apparatus via NFC (Near Field Communication) or suchlike near field wireless communication. Internet communication section 875 reports the software update results of each home electric apparatus to apparatus management server 550 via Internet 862. TV function section 876 displays ordinary digital TV broadcasting.

Figure 10:
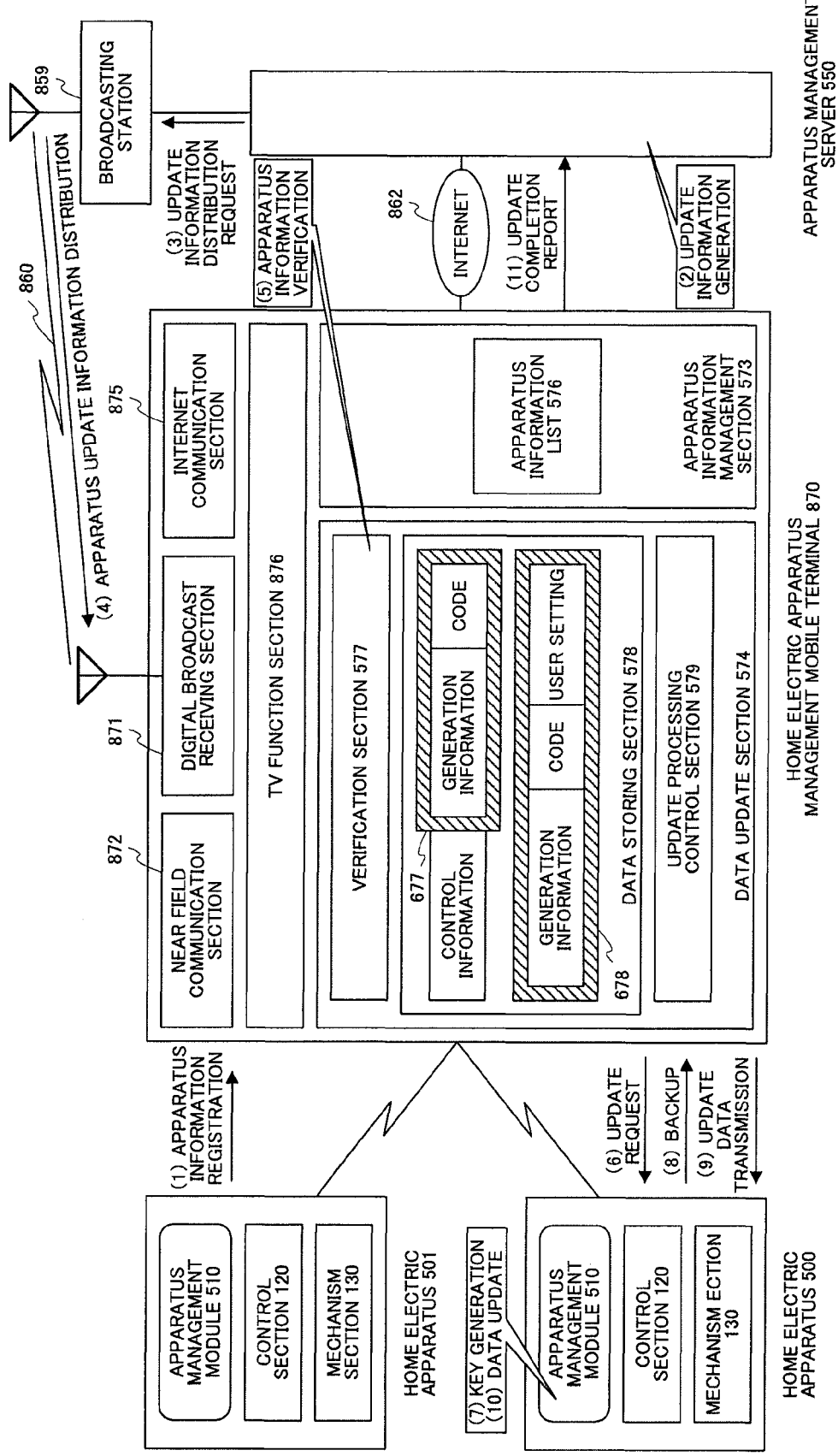
FIG. 10 is a drawing showing the flow of update processing in a software update system according to Embodiment 4 of the present invention.

FIG. 10 shows the flow of software update processing according to this embodiment.

First, home electric apparatuses 500 and 501 register apparatus information into home electric apparatus management mobile terminal 870 via near field wireless communication (step 1: apparatus information registration). For example, provision is made for home electric apparatuses 500 and 501 to register apparatus information in home electric apparatus management mobile terminal 870 automatically each time they are powered on.

Next, when a need arises for home electric apparatus 500 software to be updated, apparatus management server 550 generates update information (step 2: update information generation). The procedure for generating update information is the same as that described in Embodiment 1.

Then apparatus management server 550 makes a request to broadcasting station 859 for update information distribution (step 3: update information distribution request), and broadcasting station 859 distributes update information to home electric apparatus management mobile terminal 870 via broadcast network 860 (step 4: apparatus update information distribution).

In home electric apparatus management mobile terminal 870 that has received update information via digital broadcast receiving section 871, verification section 577 verifies information stipulating a home electric apparatus model to be updated in update information control information with apparatus information list 576 model information, and determines whether or not a home electric apparatus for which a software update is necessary has been registered (step 5: apparatus information verification).

If a home electric apparatus for which the verified information matches has been registered, update processing control section 579 of data update section 574 stores the update information in data storing section 578, and transmits an update request message containing the control information part in the update information to the relevant home electric apparatus 500 via near field communication section 872 (step 6: update request). If communication with home electric apparatus 500 cannot be performed for some reason and update request message transmission fails (such as when home electric apparatus 500 power is off), update processing control section 579 displays the fact that a home electric apparatus 500 software update is necessary on the screen of home electric apparatus management mobile terminal 870, and prompts the user to power-on home electric apparatus 500 or move to a distance at which communication by means of near field communication is possible. When communication with home electric apparatus 500 becomes possible, update processing control section 579 transmits an update request message to home electric apparatus 500 once again.

In home electric apparatus 500 that has received an update request message from home electric apparatus management mobile terminal 870, apparatus management module 510 generates a key for decrypting update information encryption based on update information control information contained in the update request message (step 7: key generation). The key generation procedure is the same as that described in Embodiment 1.

Next, apparatus management module 510 of home electric apparatus 500 encrypts pre-update generation information Ca and Cb, control code, and a user setting using the generated key, and transfers these to data storing section 578 of home electric apparatus management mobile terminal 870 for backup (step 8: backup).

Then update processing control section 579 of home electric apparatus management mobile terminal 870 transmits the encrypted generation information Ca and Cb and control code parts in the update information to home electric apparatus 500 via near field communication section 872 (step 9: update data transmission), and apparatus management module 510 of home electric apparatus 500 decrypts update information encryption, and updates the control code and generation information Ca and Cb (step 10: data update).

Then update processing control section 579 of home electric apparatus management mobile terminal 870 reports apparatus information of home electric apparatus 500 for which a software update has been performed, together with the update processing result, to update status management section 156 of apparatus management server 550 via Internet communication section 875, completing the update processing (step 11: update completion report). In the processing in steps 9 and 10, update processing is performed not by having encrypted update information transmitted collectively and decrypted on the home electric apparatus 500 side, but by having encrypted update information transmitted to home electric apparatus 500 in encryption block units and decrypted in block units.

The software update procedure for home electric apparatus 501 is the same as the software update procedure for home electric apparatus 500.

Thus, according to this embodiment, apparatus information of a home electric apparatus is registered in advance into home electric apparatus management mobile terminal 870, home electric apparatus management mobile terminal 870 receives update information via broadcast network 860, and when it is necessary to update software, individual home electric apparatuses receive update information via home electric apparatus management mobile terminal 870 and perform software updating. Consequently, it is no longer necessary for individual home electric apparatuses to have a function that receives update information directly from apparatus management server 550 or a function that connects to an external network, and the capacity of memory required in individual home electric apparatuses in order to decrypt update information encryption can be kept down, enabling a home electric apparatus provided with a software update function to be configured at low cost.

Also, home electric apparatus management mobile terminal 870 receives update information dependably via broadcast network 860, enabling a software update of each home electric apparatus to be performed dependably.

Furthermore, data storing section 578 of data update section 574 of home electric apparatus management mobile terminal 870 can be used as a backup area for the software update, enabling memory necessary for update processing to be kept to a minimum in individual home electric apparatuses. Also, even if update processing should fail, the original status can be restored by returning backed-up pre-update software to its original state, enabling the safety of update processing to be further improved.

In the above description, it has been assumed that home electric apparatus management mobile terminal 870 receives update information via digital broadcast receiving section 871, but home electric apparatus management mobile terminal 870 may also receive update information from apparatus management server 550 through Internet 862 via Internet communication section 875.

In this case, an apparatus management server 550 URL is also registered in advance into apparatus information list 576 as an item of apparatus information. Home electric apparatus management mobile terminal 870 periodically transmits an update information request to apparatus management server 550 indicated by that URL from update processing control section 579 via Internet communication section 875. If there is update information for which distribution is necessary, apparatus management server 550 transmits the update information to home electric apparatus management mobile terminal 870. Home electric apparatus management mobile terminal 870 performs the same kind of processing for update information received via Internet communication section 875 as for update information received via digital broadcast receiving section 871.

An update information request transmitted to apparatus management server 550 by home electric apparatus management mobile terminal 870 in the above description may be transmitted by home electric apparatus management mobile terminal 870 based on an update processing request received from home electric apparatus 500 or 501. An update processing request is a message whereby home electric apparatus 500 or 501 makes a request for software update processing to home electric apparatus management mobile terminal 870. On receiving an update processing request via near field communication section 872, home electric apparatus management mobile terminal 870 transmits an update information request to apparatus management server 550. Subsequent processing is the same as in the procedure described above.

(Embodiment 5)

Figure 11A:
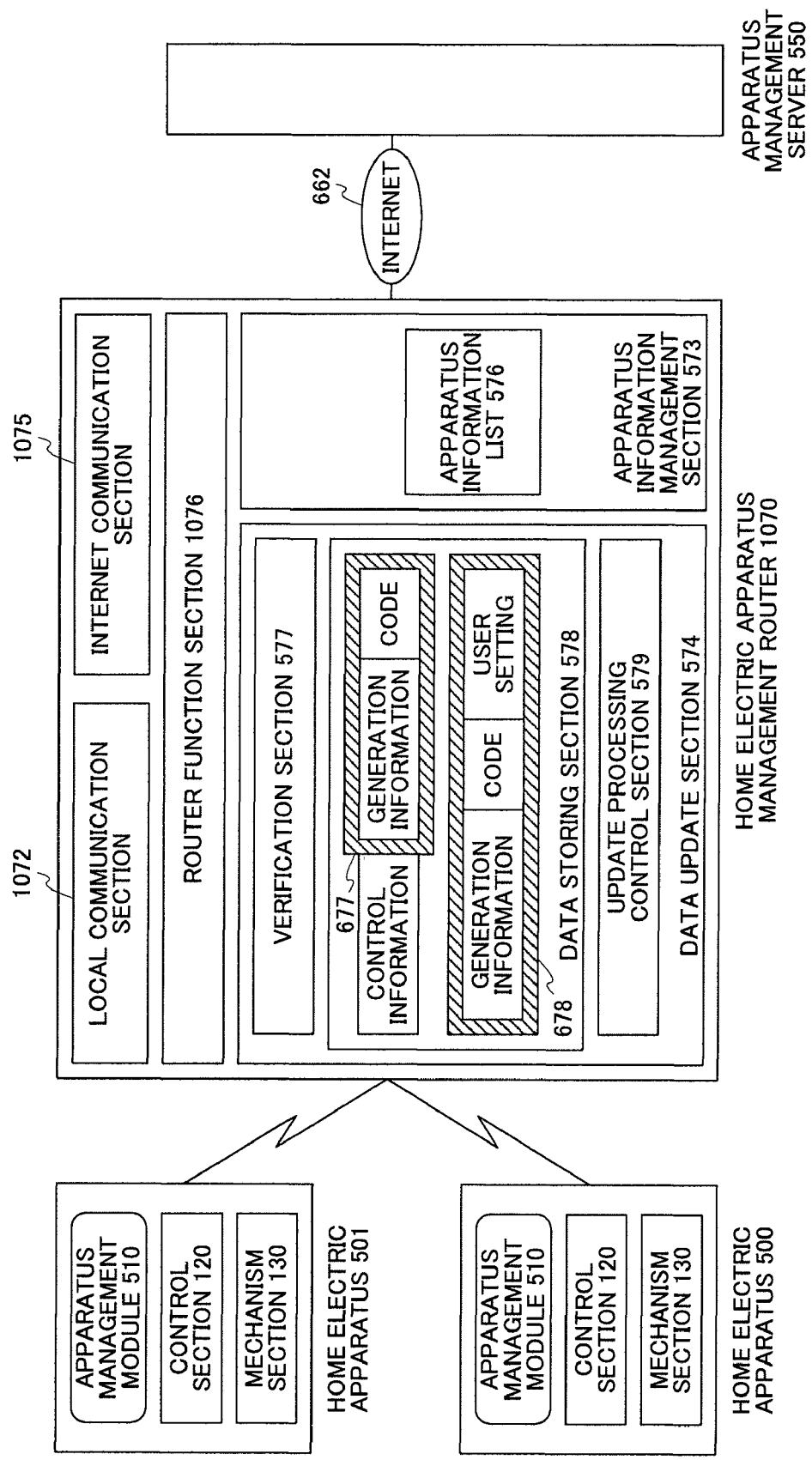
FIG. 11A is a drawing showing the configuration of a software update system according to Embodiment 5 of the present invention.
Figure 11B:
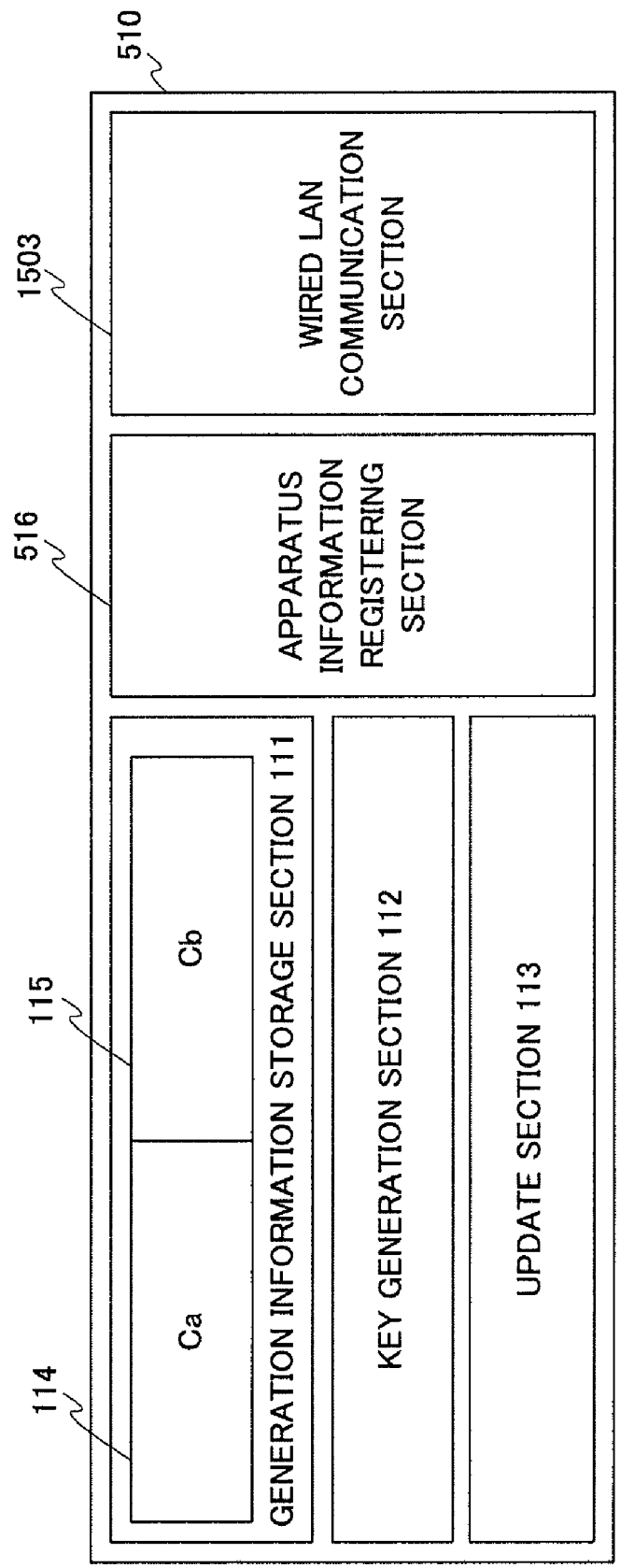
FIG. 11B is a drawing showing the configuration of an apparatus management module according to Embodiment 5 of the present invention.
Figure 11C:
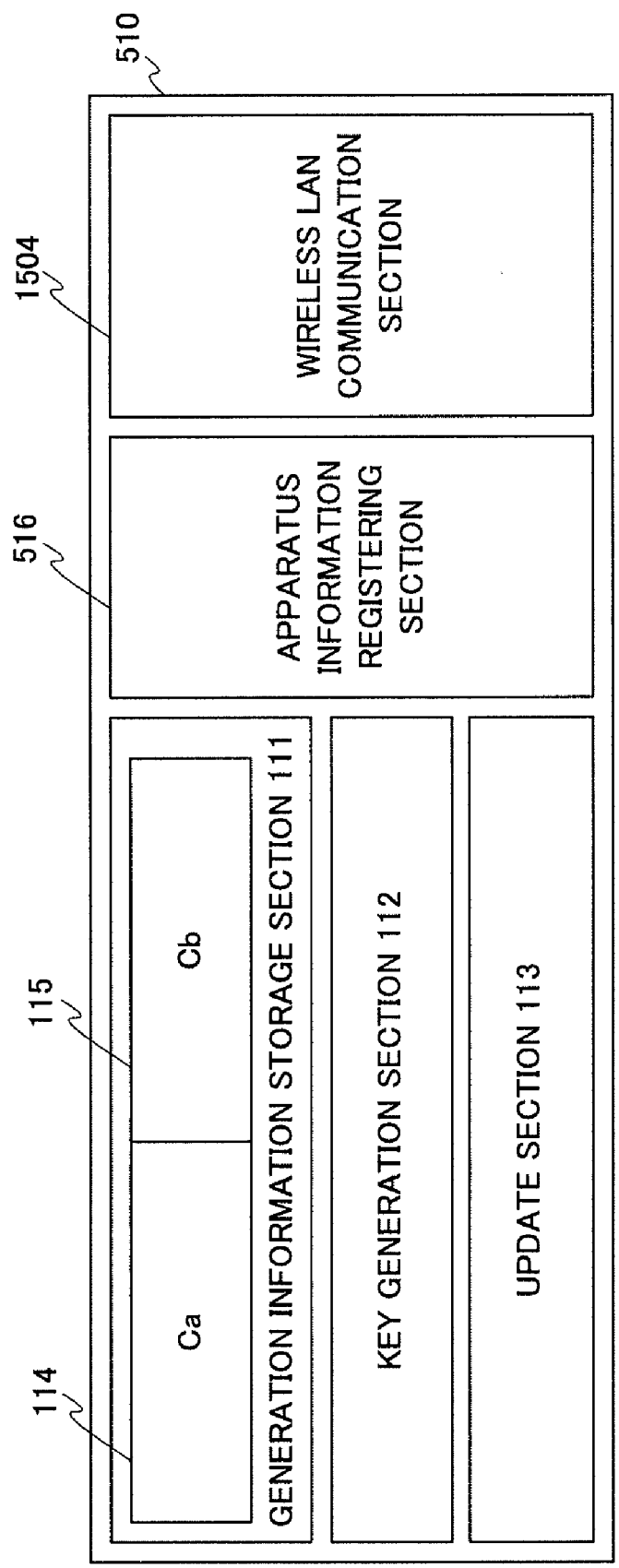
FIG. 11C is a drawing showing the configuration of another apparatus management module according to Embodiment 5 of the present invention.

FIG. 11A is a drawing showing the configuration of a software update system according to Embodiment 5 of the present invention, FIG. 11B is a drawing showing the configuration of an apparatus management module according to this embodiment, and FIG. 11C is a drawing showing the configuration of another apparatus management module according to this embodiment. A software update system described in this embodiment has basically the same kind of configuration as described in above embodiments. Therefore, in this embodiment, configuration elements identical to those described in above embodiments are assigned the same reference codes as in above embodiments, and detailed descriptions thereof are omitted.

In a software update system of this embodiment a home electric apparatus management apparatus is connected between a home electric apparatus and an apparatus management server, in the same way as in Embodiment 2. In a software update system of this embodiment the home electric apparatus management apparatus described in Embodiment 2 is applied to a broadband-compatible communication apparatus, such as a router, for example.

Therefore, as shown in FIG. 11A, a software update system of this embodiment is composed of home electric apparatus 500 described in Embodiment 2, home electric apparatus 501 described in Embodiment 3, home electric apparatus management router 1070 as a home electric apparatus management apparatus, and apparatus management server 550 described in Embodiment 2. Apparatus management server 550 and home electric apparatus management router 1070 are connected so as to allow communication by means of Internet 662. Home electric apparatus management router 1070 and home electric apparatuses 500 and 501 are connected via an in-home wired LAN, wireless LAN, or power line network.

Home electric apparatuses 500 and 501 are assumed to be apparatuses such as a DVD recorder or wireless LAN TV receiver, for example. As shown in FIG. 11B, in addition to generation information storage section 111, key generation section 112, update section 113, and apparatus information registering section 516, apparatus management module 510 of home electric apparatus 500 is also provided with wired LAN communication section 1503 as a local communication section performing communication with home electric apparatus management router 1070 via a wired LAN. Also, as shown in FIG. 11C, in addition to generation information storage section 111, key generation section 112, update section 113, and apparatus information registering section 516, apparatus management module 510 of home electric apparatus 501 is also provided with wireless LAN communication section 1504 as a local communication section performing communication with home electric apparatus management router 1070 via a wireless LAN. In addition to home electric apparatuses 500 and 501, there may also be a home electric apparatus that communicates with home electric apparatus management router 1070 via a power line network.

Home electric apparatus management router 1070 is composed of data update section 574 and apparatus information management section 573 described in Embodiment 2, local communication section 1072 corresponding to local communication section 572 described in Embodiment 2, Internet communication section 1075 corresponding to update information receiving section 571 and communication section 575 described in Embodiment 2, and router function section 1076. Home electric apparatus management router 1070 may be provided with an LED (not shown) that displays the internal status of home electric apparatus management router 1070.

Internet communication section 1075 receives update information from apparatus management server 550 via Internet 662. Internet communication section 1075 also reports home electric apparatus software update results to apparatus management server 550. Local communication section 1072 performs communication with a home electric apparatus via a wired LAN, wireless LAN, or power line network. Router function section 1076 functions as an in-home wired LAN, wireless LAN, or power line network router.

Figure 12:
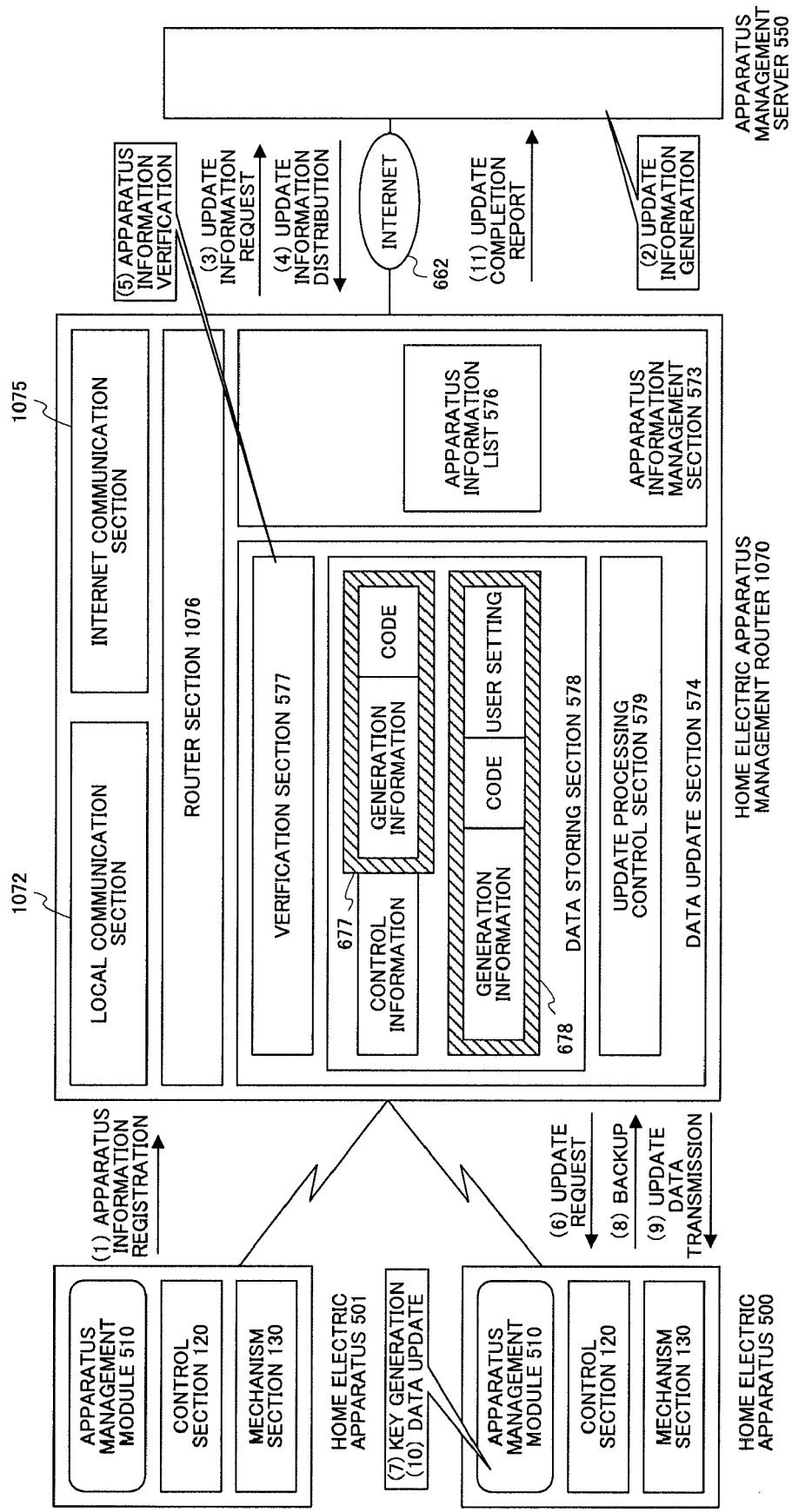
FIG. 12 is a drawing showing the flow of update processing in a software update system according to Embodiment 5 of the present invention.

FIG. 12 shows the flow of software update processing according to this embodiment.

First, home electric apparatuses 500 and 501 register apparatus information into home electric apparatus management router 1070 via a wired LAN and wireless LAN respectively (step 1: apparatus information registration).

Next, when a need arises for home electric apparatus 500 software to be updated, apparatus management server 550 generates update information (step 2: update information generation). The procedure for generating update information is the same as that described in Embodiment 1.

Then home electric apparatus management router 1070 transmits an update information request to apparatus management server 550 via Internet 662 (step 3: update information request). Apparatus management server 550 transmits update information to home electric apparatus management router 1070 via Internet 662 (step 4: apparatus update information distribution). In this case, an apparatus management server 550 URL has also been registered in advance into apparatus information list 576 as an item of apparatus information. Home electric apparatus management router 1070 periodically transmits an update information request to apparatus management server 550 indicated by that URL from update processing control section 579 via Internet communication section 1075. If there is update information for which distribution is necessary, apparatus management server 550 transmits the update information to home electric apparatus management router 1070.

In home electric apparatus management router 1070 that has received update information via Internet communication section 1075, verification section 577 verifies information stipulating a home electric apparatus model to be updated in update information control information with apparatus information list 576 model information, and determines whether or not a home electric apparatus for which a software update is necessary has been registered (step 5: apparatus information verification).

If a home electric apparatus for which the verified information matches has been registered, update processing control section 579 stores the update information in data storing section 578, and transmits an update request message containing the control information part in the update information to the relevant home electric apparatus 500 via local communication section 1072 (step 6: update request). If communication with home electric apparatus 500 cannot be performed for some reason and update request message transmission fails (such as when home electric apparatus 500 power is off), update processing control section 579 generates HTML (Hyper Text Markup Language) data indicating that a home electric apparatus 500 software update is necessary, enables display of that generated HTML data by an in-home apparatus connected to home electric apparatus management router 1070, and furthermore illuminates an LED indicating that there is a home electric apparatus for which a software update is necessary, and prompts the user to power-on home electric apparatus 500. When communication with home electric apparatus 500 becomes possible, update processing control section 579 transmits an update request message to home electric apparatus 500 once again.

In home electric apparatus 500 that has received an update request message from home electric apparatus management router 1070, apparatus management module 510 generates a key for decrypting update information encryption based on update information control information contained in the update request message (step 7: key generation). The key generation procedure is the same as that described in Embodiment 1.

Next, apparatus management module 510 of home electric apparatus 500 encrypts pre-update generation information Ca and Cb, control code, and a user setting using the generated key, and transfers these to data storing section 578 of home electric apparatus management router 1070 for backup (step 8: backup).

Then update processing control section 579 of home electric apparatus management router 1070 transmits the encrypted generation information Ca and Cb and control code parts in the update information to home electric apparatus 500 via local communication section 1072 (step 9: update data transmission), and apparatus management module 510 of home electric apparatus 500 decrypts update information encryption, and updates the control code and generation information Ca and Cb (step 10: data update).

Then update processing control section 579 of home electric apparatus management router 1070 reports apparatus information of home electric apparatus 500 for which a software update has been performed, together with the update processing result, to update status management section 156 of apparatus management server 550 via Internet communication section 1075, completing the update processing (step 11: update completion report). In the processing in steps 9 and 10, update processing is performed not by having encrypted update information transmitted collectively and decrypted on the home electric apparatus 500 side, but by having encrypted update information transmitted to home electric apparatus 500 in encryption block units and decrypted in block units.

The software update procedure for home electric apparatus 501 is the same as the software update procedure for home electric apparatus 500.

Thus, according to this embodiment, apparatus information of a home electric apparatus is registered in advance into home electric apparatus management router 1070, home electric apparatus management router 1070 receives update information via Internet 662, and when it is necessary to update software, individual home electric apparatuses receive update information via home electric apparatus management router 1070 and perform software updating. Consequently, it is no longer necessary for individual home electric apparatuses to have a function that receives update information directly from apparatus management server 550 or a function that connects to an external network, and the capacity of memory required in individual home electric apparatuses in order to decrypt update information encryption can be kept down, enabling a home electric apparatus provided with a software update function to be configured at low cost.

Also, home electric apparatus management router 1070 receives update information dependably via Internet 662, enabling a software update of each home electric apparatus to be performed dependably.

Furthermore, data storing section 578 of data update section 574 of home electric apparatus management router 1070 can be used as a pre-update software backup area, enabling memory necessary for update processing to be kept to a minimum in individual home electric apparatuses. Also, even if update processing should fail, the original status can be restored by returning backed-up pre-update software to its original state, enabling the safety of update processing to be further improved.

An update information request transmitted to apparatus management server 550 by home electric apparatus management router 1070 in the above description may be transmitted by home electric apparatus management router 1070 based on an update processing request received from home electric apparatus 500 or 501. An update processing request is a message whereby home electric apparatus 500 or 501 makes a request for software update processing to home electric apparatus management router 1070. On receiving an update processing request via local communication section 1072, home electric apparatus management router 1070 transmits an update information request to apparatus management server 550. Subsequent processing is the same as in the procedure described above.

(Embodiment 6)

Figure 13:
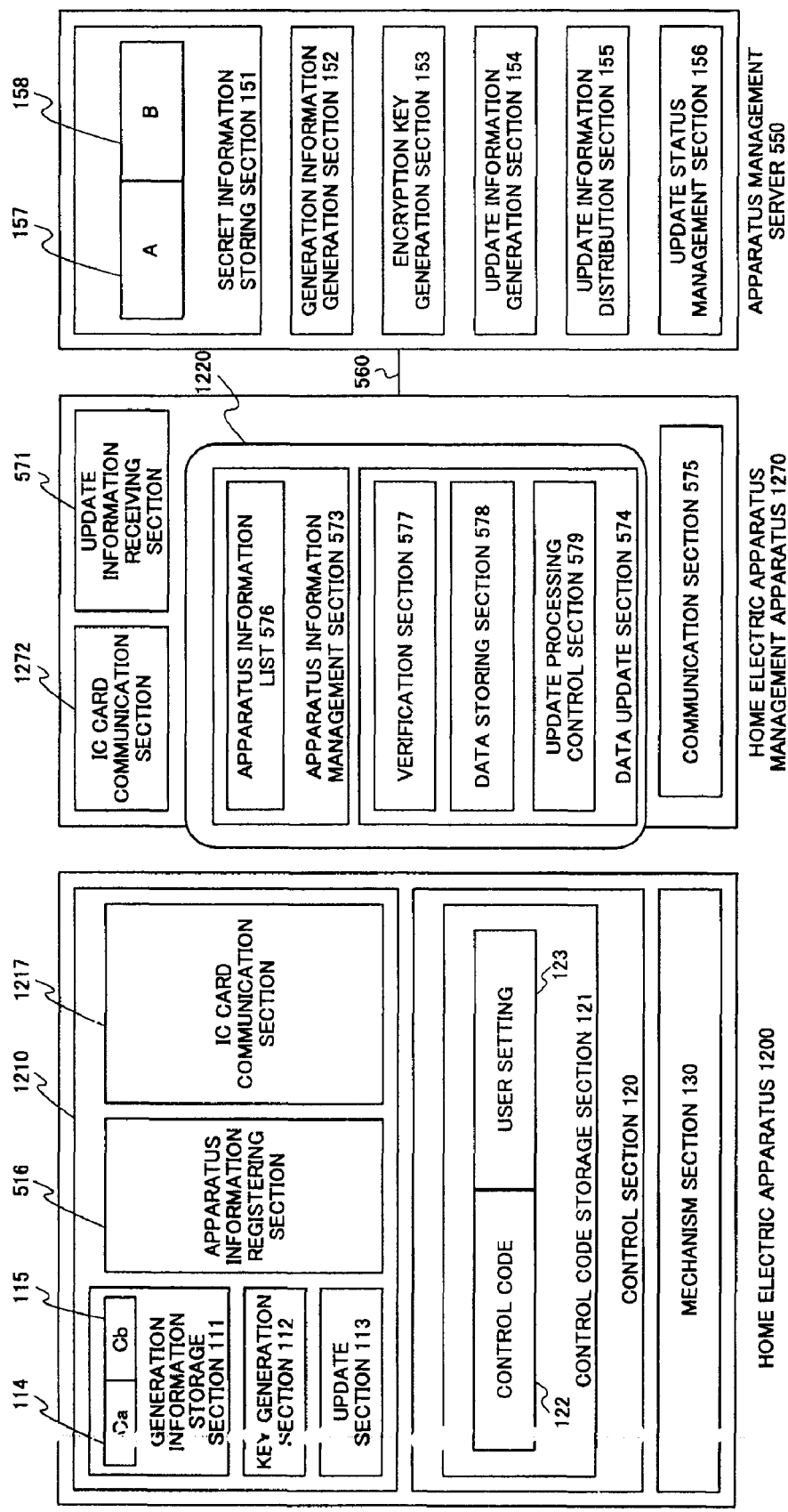
FIG. 13 is a block diagram showing the configuration of a software update system according to Embodiment 6 of the present invention.

FIG. 13 is a block diagram showing the configuration of a software update system according to Embodiment 6 of the present invention. A software update system described in this embodiment has basically the same kind of configuration as above software update systems. Therefore, in this embodiment, configuration elements identical to those described in above embodiments are assigned the same reference codes as in above embodiments, and detailed descriptions thereof are omitted.

A software update system of this embodiment is similar to Embodiments 2 through 5 in that a home electric apparatus management apparatus is connected between a home electric apparatus and an apparatus management server, but differs from Embodiments 2 through 5 in that a home electric apparatus not provided with a function for connection to an external network performs communication with a home electric apparatus management apparatus via an IC (Integrated circuit) card. This is to enable a software update of a home electric apparatus not provided with a function for connection to a network to be performed dependably and efficiently.

As shown in FIG. 13, a software update system of this embodiment is composed of home electric apparatus 1200 provided with a function for updating software, apparatus management server 550 described in Embodiment 2, home electric apparatus management IC card 1220, and home electric apparatus management apparatus 1270 that allows insertion of home electric apparatus management IC card 1220 and receives update information from apparatus management server 550. Apparatus management server 550 and home electric apparatus management apparatus 1270 are connected via communication channel 560 described in Embodiment 2.

Home electric apparatus management IC card 1220 is an IC card provided with both a contact-type and contactless-type external interface.

Home electric apparatus 1200 is composed of control section 120 and mechanism section 130 described in Embodiment 1, and apparatus management module 1210 that updates software stored in control section 120.

Apparatus management module 1210 has generation information storage section 111, key generation section 112, and update section 113 described in Embodiment 1, apparatus information registering section 516 described in Embodiment 2, and also IC card communication section 1217 that performs contactless communication with home electric apparatus management IC card 1220. Apparatus management module 1210 is configured by means of an integrated circuit comprising a CPU that executes a software module corresponding to key generation section 112, update section 113, and apparatus information registering section 516, memory forming generation information storage section 111, and an RF circuit and communication control circuit forming IC card communication section 1217. IC card communication section 1217 may also be of a type that performs contact communication with home electric apparatus management IC card 1220, in which case IC card communication section 1217 comprises a terminal that connects to home electric apparatus management IC card 1220 and a communication control circuit.

Home electric apparatus management apparatus 1270 is composed of update information receiving section 571 and the communication section described in Embodiment 2, and IC card communication section 1272 that performs contact communication with home electric apparatus management IC card 1220. In actuality, there may be a plurality of types of home electric apparatus management apparatus 1270, such as portable and non-portable types, with the user inserting home electric apparatus management IC card 1220 into one of home electric apparatus management apparatuses 1270 capable of receiving update information. IC card communication section 1272 may also be of a type that performs contactless communication with home electric apparatus management IC card 1220, in which case IC card communication section 1272 comprises an RF circuit and a communication control circuit.

Home electric apparatus management IC card 1220 is composed of apparatus information management section 573 and data update section 574 described in Embodiment 2, and a contact-type external interface and contactless-type external interface (not shown) used to perform communication with home electric apparatus management apparatus 1270 or home electric apparatuses. The shape of home electric apparatus management IC card 1220 may be that of a business-card-sized general IC card, a SIM card inserted in a mobile phone or the like, or a memory card.

In a software update system having the above configuration, apparatus information registering section 516 of home electric apparatus 1200 registers its own apparatus information in advance into apparatus information management section 573 of home electric apparatus management IC card 1220 via IC card communication section 1217 through home electric apparatus management IC card 1220 being brought close to IC card communication section 1217 of home electric apparatus 1200. Apparatus information registered in apparatus information management section 573 includes the maker code, model number, and manufacturing number of that home electric apparatus, together with the serial number of the software version of that home electric apparatus. Apparatus information management section 573 manages apparatus information registered from home electric apparatuses on an individual home electric apparatus basis and stores this apparatus information as apparatus information list 576.

Home electric apparatus management IC card 1220 is normally inserted in home electric apparatus management apparatus 1270. Update information is distributed to home electric apparatus management apparatus 1270 from apparatus management server 550 via communication channel 560.

Home electric apparatus management IC card 1220 receives update information via update information receiving section 571 of home electric apparatus management apparatus 1270, and verification section 577 verifies information stipulating a home electric apparatus model to be updated in update information control information with apparatus information list 576 model information, and determines whether or not a home electric apparatus for which a software update is necessary has been registered.

Then, if a home electric apparatus for which the verified information matches has been registered, the received update information is stored in data storing section 578 of data update section 574. Furthermore, based on response data from home electric apparatus management IC card 1220, an indication to the effect that a home electric apparatus 1200 software update is necessary is displayed on home electric apparatus management apparatus 1270, and the user is prompted to perform an operation to update home electric apparatus 1200 software using home electric apparatus management IC card 1220.

When the user brings home electric apparatus management IC card 1220 close to IC card communication section 1217 of the relevant home electric apparatus 1200, update processing control section 579 communicates with home electric apparatus 1200 and performs software update processing. In the course of this update processing, pre-update software is transferred from home electric apparatus 1200 to data storing section 578 of data update section 574 for backup.

Thus, according to this embodiment, apparatus information of a home electric apparatus is registered in advance into home electric apparatus management IC card 1220, home electric apparatus management IC card 1220 receives update information from apparatus management server 550 via home electric apparatus management apparatus 1270, and when it is necessary to update software, individual home electric apparatuses receive update information via home electric apparatus management IC card 1220 and perform software updating. Consequently, it is no longer necessary for individual home electric apparatuses to have a function that receives update information directly from apparatus management server 550 or a function that connects to an external network, such as a TV tuner, Internet modem, or suchlike function, for example, enabling a home electric apparatus provided with a software update function to be configured at low cost.

Also, updating of software of each home electric apparatus can be performed dependably by having home electric apparatus management IC card 1220 receive update information distributed from apparatus management server 550 via home electric apparatus management apparatus 1270 in a state allowing update information reception. It is not absolutely essential for each home electric apparatus to be in a powered-on state when update information is distributed from apparatus management server 550, and when power is turned on, software updating can be carried out dependably by performing update processing via home electric apparatus management IC card 1220.

Furthermore, data storing section 578 of data update section 574 of home electric apparatus management IC card 1220 can be used as an update information buffer area and pre-update software backup area, enabling memory necessary for update processing to be kept to a minimum in individual home electric apparatuses. Also, even if update processing should fail, the original status can be restored by returning backed-up pre-update software to its original state, enabling the safety of update processing to be further improved. In actuality, processing in the event of an update processing failure may be performed based on program data contained in update information control information set by apparatus management server 550. Based on that program data, the original status may be restored by returning backed-up pre-update software to its original state, or, for safety, a home electric apparatus may be set to a function-stopped state without restoring the original status.

In the above description, apparatus management module 1210 has been assumed to be an integrated circuit having a CPU separate from the CPU of control section 120, but the apparatus management module 1210 function may also be configured using the CPU and memory of control section 120.

In the above description, it has been assumed that IC card communication section 1217 is incorporated in apparatus management module 1210, but an IC card reader/writer, for example, may also be provided independently of apparatus management module 1210.

In the above description, it has been assumed that updating of control code stored in home electric apparatus 1200 is performed, but not only control code but also specific data stored in home electric apparatus 1200 may also be updated using the same kind of arrangement, with this specific data including multimedia content, license information, table information or a database referenced by control code, and so forth.

In the above description, it has been assumed that updating of control code stored in home electric apparatus 1200 is performed, but some or all of the functions of home electric apparatus 1200 may also be disabled by updating specific data stored in home electric apparatus 1200 using the same kind of arrangement. This specific data may include control code, home electric apparatus 1200 internal control flag information, key data used in encryption processing, multimedia content, license information, table information or a database referenced by control code, and so forth, with some or all of the functions of home electric apparatus 1200 being disabled by updating these data to invalid data.

In the above description, it has been assumed that home electric apparatus management IC card 1220 is provided with two kinds of external interface, a contact-type external interface and a contactless-type external interface, but a configuration may also be used in which only one kind of interface is provided. In this case, IC card communication section 1217 and IC card communication section 1272 will be of a type allowing communication with home electric apparatus management IC card 1220.

(Embodiment 7)

Figure 14:
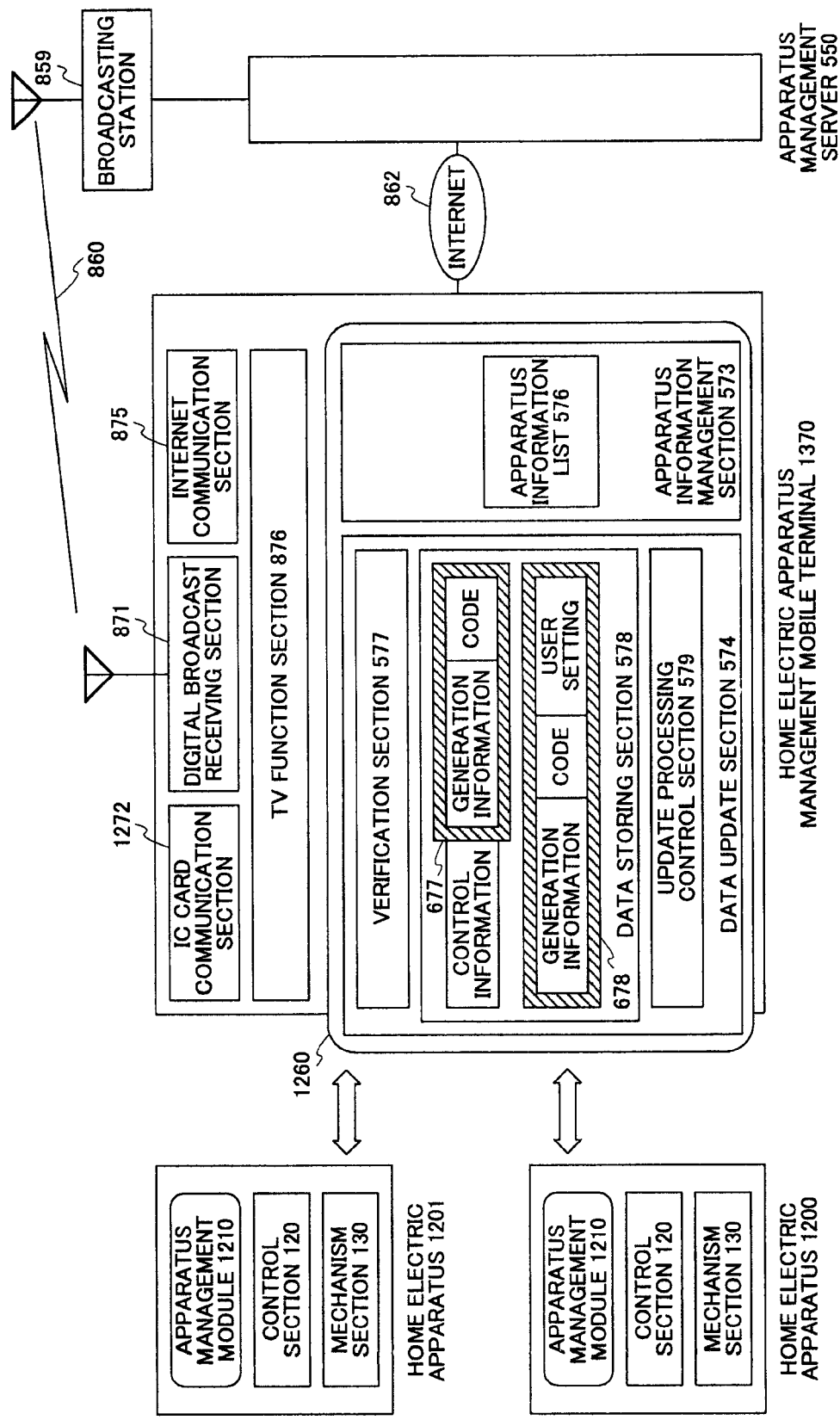
FIG. 14 is a block diagram showing the configuration of a software update system according to Embodiment 7 of the present invention.

FIG. 14 is a block diagram showing the configuration of a software update system according to Embodiment 7 of the present invention. A software update system described in this embodiment has basically the same kind of configuration as described in above embodiments. Therefore, in this embodiment, configuration elements identical to those described in above embodiments are assigned the same reference codes as in above embodiments, and detailed descriptions thereof are omitted.

In a software update system of this embodiment a home electric apparatus not provided with a network connection function performs communication with a home electric apparatus management apparatus via an IC card, in the same way as in Embodiment 6. In a software update system of this embodiment the home electric apparatus management apparatus described in Embodiment 6 is applied to a portable type of apparatus provided with a digital broadcast reception function, such as a mobile phone or suchlike mobile terminal, for example.

Therefore, as shown in FIG. 14, a software update system of this embodiment is composed of home electric apparatus 1200 described in Embodiment 6, home electric apparatus 1201 having the same internal configuration as home electric apparatus 1200, home electric apparatus management mobile terminal 1370 as a home electric apparatus management apparatus, apparatus management server 550 described in Embodiment 2, broadcasting station 859 described in Embodiment 4, and home electric apparatus management IC card 1260. Apparatus management server 550 and broadcasting station 859 are connected so as to allow communication by means of a predetermined communication line. Broadcasting station 859 and home electric apparatus management mobile terminal 1370 are connected so as to allow communication by means of broadcast network 860. Apparatus management server 550 and home electric apparatus management mobile terminal 1370 are connected so as to allow communication by means of Internet 862. Home electric apparatus management IC card 1260 is connected to home electric apparatuses 1200 and 1201 by means of contact communication or contactless communication, and is connected so as to allow communication to apparatus management server 550 via Internet 862.

Home electric apparatuses 1200 and 1201 are each provided with control section 120 and mechanism section 130 described in Embodiment 1, and apparatus management module 1210 described in Embodiment 6. Home electric apparatuses 1200 and 1201 are assumed to be battery-operated portable-type apparatuses, such as portable music players, for example.

Home electric apparatus management mobile terminal 1370 is composed of IC card communication section 1272 described in Embodiment 6, and digital broadcast receiving section 871, Internet communication section 875, and TV function section 876 described in Embodiment 4.

Home electric apparatus management IC card 1260 is composed of apparatus information management section 573 and data update section 574 described in Embodiment 2, and a contact-type external interface and contactless-type external interface (not shown) used to perform communication with home electric apparatus management mobile terminal 1370 or home electric apparatuses.

Figure 15:
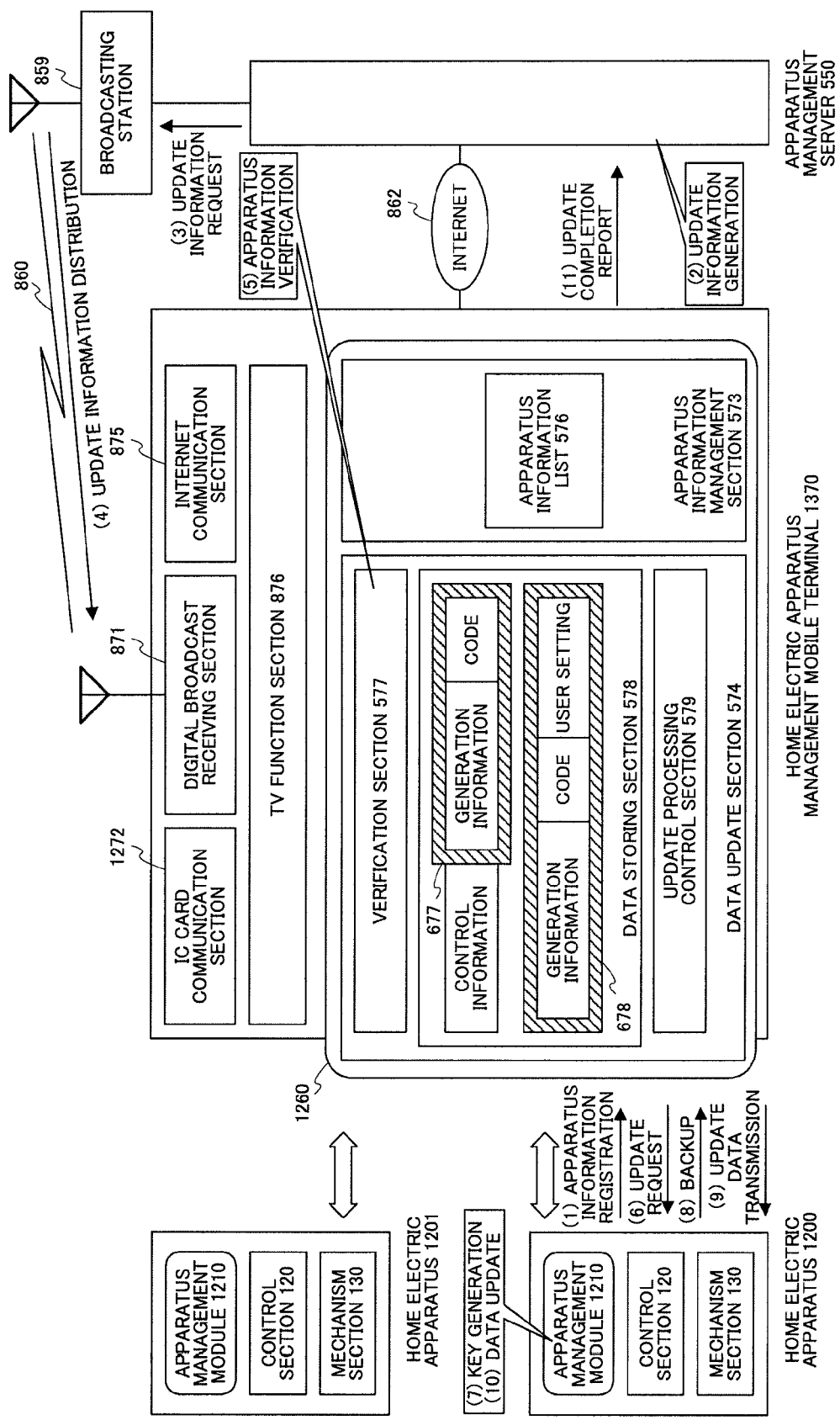
FIG. 15 is a drawing showing the flow of update processing in a software update system according to Embodiment 7 of the present invention.

FIG. 15 shows the flow of software update processing according to this embodiment.

First, home electric apparatuses 1200 and 1201 register apparatus information in home electric apparatus management IC card 1260 via IC card communication section 1217 through home electric apparatus management IC card 1260 being brought close to IC card communication section 1217 of home electric apparatuses 1200 and 1201 respectively (step 1: apparatus information registration). For example, provision is made for home electric apparatuses 1200 and 1201 to display a message or the like, prompting the user to perform an operation that registers apparatus information into home electric apparatus management IC card 1260.

Next, when a need arises for home electric apparatus 1200 software to be updated, apparatus management server 550 generates update information (step 2: update information generation). The procedure for generating update information is the same as that described in Embodiment 1.

Then apparatus management server 550 makes a request to broadcasting station 859 for update information distribution (step 3: update information distribution request), and broadcasting station 859 distributes update information to home electric apparatus management mobile terminal 1370 via broadcast network 860 (step 4: apparatus update information distribution).

In home electric apparatus management IC card 1260 that has received update information via digital broadcast receiving section 871 of home electric apparatus management mobile terminal 1370, verification section 577 verifies information stipulating a home electric apparatus model to be updated in update information control information with apparatus information list 576 model information, and determines whether or not a home electric apparatus for which a software update is necessary has been registered (step 5: apparatus information verification).

If a home electric apparatus for which the verified information matches has been registered, update processing control section 579 stores the update information in data storing section 578, and transmits response data to home electric apparatus management mobile terminal 1370. Based on the received response data, home electric apparatus management mobile terminal 1370 displays an indication to the effect that a home electric apparatus 1200 software update is necessary, and prompts the user to perform an operation to update home electric apparatus 1200 software using home electric apparatus management IC card 1260. When the user brings home electric apparatus management IC card 1260 close to IC card communication section 1217 of the relevant home electric apparatus 1200, update processing control section 579 of data update section 574 of home electric apparatus management IC card 1260 transmits an update request message containing the control information part in the update information to home electric apparatus 1200 (step 6: update request).

In home electric apparatus 1200 that has received an update request message from home electric apparatus management IC card 1260, apparatus management module 1210 generates a key for decrypting update information encryption based on update information control information contained in the update request message (step 7: key generation). The key generation procedure is the same as that described in Embodiment 1.

Next, apparatus management module 1210 of home electric apparatus 1200 encrypts pre-update generation information Ca and Cb, control code, and a user setting using the generated key, and transfers these to data storing section 578 of home electric apparatus management IC card 1260 for backup (step 8: backup).

Then update processing control section 579 of home electric apparatus management IC card 1260 transmits the encrypted generation information Ca and Cb and control code parts in the update information to home electric apparatus 1200 (step 9: update data transmission). Next, apparatus management module 1210 of home electric apparatus 1200 decrypts update information encryption, and updates the control code and generation information Ca and Cb (step 10: data update).

Then, when home electric apparatus management IC card 1260 is inserted into home electric apparatus management mobile terminal 1370, update processing control section 579 reports apparatus information of home electric apparatus 1200 for which a software update has been performed, together with the update processing result, to update status management section 156 of apparatus management server 550 via Internet communication section 875 of home electric apparatus management mobile terminal 1370, completing the update processing (step 11: update completion report). In the processing in steps 9 and 10, update processing is performed not by having encrypted update information transmitted collectively and decrypted on the home electric apparatus 1200 side, but by having encrypted update information transmitted to home electric apparatus 1200 in encryption block units and decrypted in block units.

The software update procedure for home electric apparatus 1201 is the same as the software update procedure for home electric apparatus 1200.

Thus, apparatus information of a home electric apparatus is registered in advance into home electric apparatus management IC card 1260, home electric apparatus management IC card 1260 inserted in home electric apparatus management mobile terminal 1370 receives update information via broadcast network 860, and when it is necessary to update software, individual home electric apparatuses receive update information via home electric apparatus management IC card 1260 and perform software updating. Consequently, it is no longer necessary for individual home electric apparatuses to have a function that receives update information directly from apparatus management server 550 or a function that connects to an external network, and the capacity of memory required in individual home electric apparatuses in order to decrypt update information encryption can be kept down, enabling a home electric apparatus provided with a software update function to be configured at low cost.

Also, home electric apparatus management IC card 1260 inserted in home electric apparatus management mobile terminal 1370 receives update information dependably via broadcast network 860, enabling a software update of each home electric apparatus to be performed dependably.

Furthermore, data storing section 578 of data update section 574 of home electric apparatus management IC card 1260 can be used as a pre-update software backup area, enabling memory necessary for update processing to be kept to a minimum in individual home electric apparatuses. Also, even if update processing should fail, the original status can be restored by returning backed-up pre-update software to its original state, enabling the safety of update processing to be further improved.

In the above description, it has been assumed that home electric apparatus management IC card 1260 receives update information via digital broadcast receiving section 871 of home electric apparatus management mobile terminal 1370, but home electric apparatus management IC card 1260 may also receive update information from apparatus management server 550 through Internet 862 via Internet communication section 875. In this case, an apparatus management server 550 URL is also registered in advance into apparatus information list 576 as an item of apparatus information. Home electric apparatus management IC card 1260 inserted in home electric apparatus management mobile terminal 1370 periodically transmits an update information request to apparatus management server 550 indicated by that URL from update processing control section 579 via Internet communication section 875, and if there is update information for which distribution is necessary, apparatus management server 550 transmits the update information to home electric apparatus management IC card 1260. Home electric apparatus management IC card 1260 performs the same kind of processing for update information received via Internet communication section 875 of home electric apparatus management mobile terminal 1370 as for update information received via digital broadcast receiving section 871.

An update information request transmitted to apparatus management server 550 by home electric apparatus management IC card 1260 inserted in home electric apparatus management mobile terminal 1370 in the above description may be transmitted by home electric apparatus management IC card 1260 based on an update processing request received from home electric apparatus 1200 or 1201. In this case, an update processing request is a message whereby home electric apparatus 1200 or 1201 makes a request for software update processing to home electric apparatus management IC card 1260. When home electric apparatus management IC card 1260 is brought close to IC card communication section 1217 of a home electric apparatus, home electric apparatus management IC card 1260 that has received an update processing request, when inserted into home electric apparatus management mobile terminal 1370, transmits an update information request to apparatus management server 550 via Internet communication section 875. Subsequent processing is the same as in the procedure described above.

(Embodiment 8)

Figure 16:
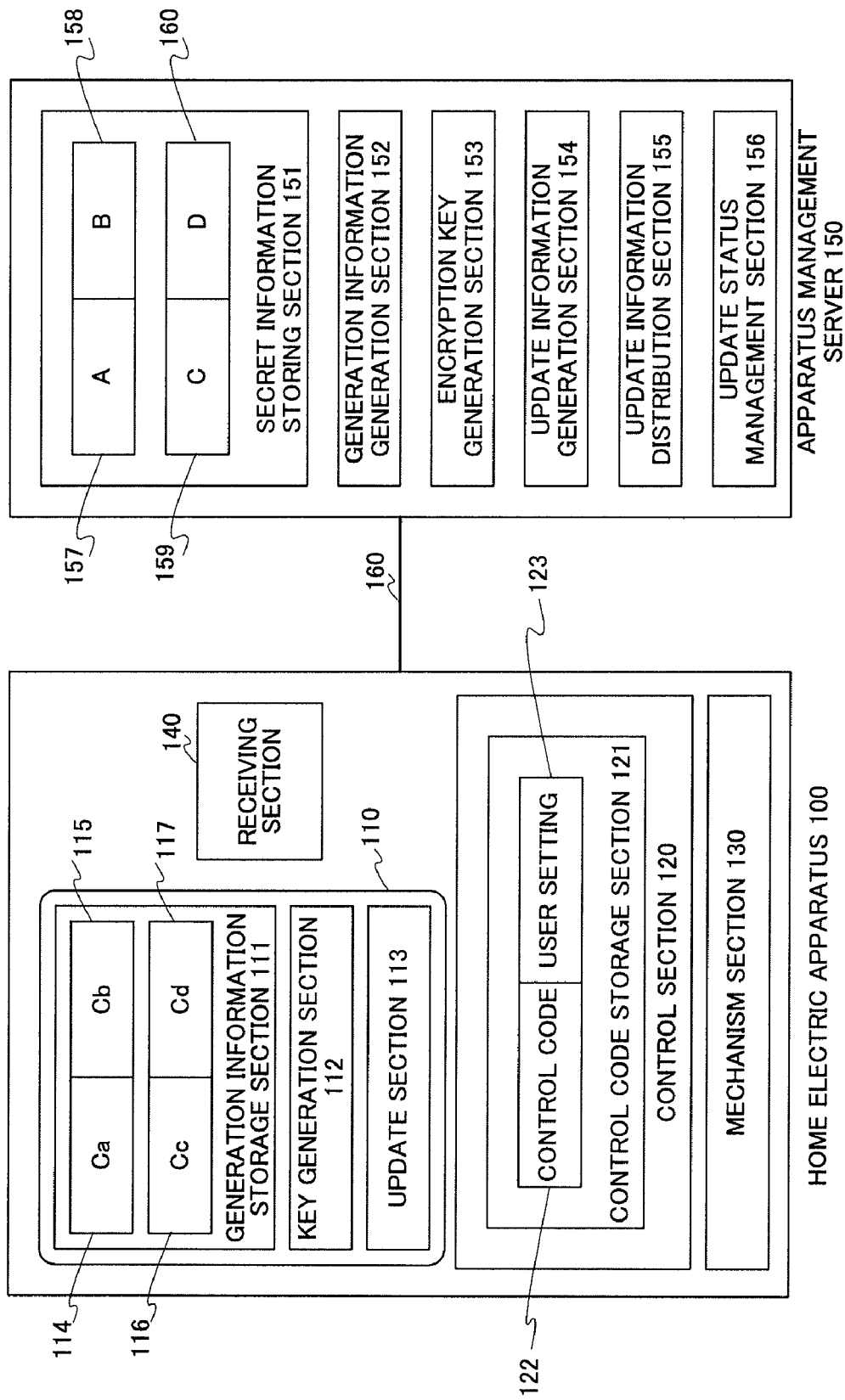
FIG. 16 is a block diagram showing the configuration of a software update system according to Embodiment 8 of the present invention.

FIG. 16 shows a data communication system as a software update system according to Embodiment 8 of the present invention.

This embodiment is configured so that a software update is possible even if software version serial numbers of an apparatus to be updated are not consecutive.

A software update system described in this embodiment has basically the same kind of configuration as described in Embodiment 1. Therefore, in this embodiment, configuration elements identical to those described in Embodiment 1 are assigned the same reference codes as in Embodiment 1, and detailed descriptions thereof are omitted.

In the case of this embodiment, in addition to generation information Ca 114 and generation information Cb 115, another pair of generation information items—generation information Cc 116 and generation information Cd 117—are also stored in generation information storage section 111 of apparatus management module 110 of home electric apparatus 100.

Also, in addition to secret information A 157 and secret information B 158, secret information storing section 151 of apparatus management server 150 also stores another pair of secret information items—secret information C 159 and secret information D 160—for one model of a home electric apparatus.

FIG. 17 is a drawing showing the interrelationship of data stored in home electric apparatus 100—that is, control code, and four generation information items Ca, Cb, Cc, and Cd.

Generation information Ca and generation information Cb are generated from secret information A 157 and secret information B 158 respectively, and generation information Cc and generation information Cd from secret information C 159 and secret information D 160 respectively, by generation information generation section 152 of apparatus management server 150, and differ according to the serial number of the software version of home electric apparatus 100.

In FIG. 17, for example, when the software version serial number is 1, control code P1, and generation information Ca=X(1,A), generation information Cb=Y(M−1,B), generation information Cc=U(1,C), and generation information Cd=V(M−1,D) generated by generation information generation section 152 of apparatus management server 150, are stored in home electric apparatus 100. Similarly, when the software version serial number is n, control code Pn, and generation information Ca=X(n,A), generation information Cb=Y(M−n,B), generation information Cc=U(n,C), and generation information Cd=V(M−n,D) generated by generation information generation section 152 of apparatus management server 150, are stored in home electric apparatus 100. In other words, if the serial number of the currently used software version is n, the software itself (or part thereof) being used is control code Pn. Also, generation information Ca=X(n,A), generation information Cb=Y(M−n,B), generation information Cc=U(n,C), and generation information Cd=V(M−n,D) are held as information unique to control code Pn, and are used as key components in key generation.

Here, U and V indicate mutually different predetermined irreversible calculations. U(p,a) indicates the result of repeating irreversible calculation U p times using data a as a starting parameter of the irreversible calculation U, and V(q,b) indicates the result of repeating irreversible calculation V q times using data b as a starting parameter of the irreversible calculation V. Therefore, generation information U(1,C) is the result when irreversible calculation U is performed once on secret information C, and generation information V(M−1,D) is the result when irreversible calculation V is repeated M−1 times using secret information D as a starting parameter of the irreversible calculation V.

Generation information U(n,C) is the result when irreversible calculation U is repeated n times using secret information C as a starting parameter of the irreversible calculation U, and secret information C cannot be calculated from generation information U (n, C). Generation information V(M−n,D) is the result when irreversible calculation V is repeated M−n times using secret information D as a starting parameter of the irreversible calculation V, and secret information D cannot be calculated from generation information V(M−n,D).

An operation that updates software of home electric apparatus 100 will now be described.

When a need arises for software of a home electric apparatus model managed by apparatus management server 150 to be updated to new software, apparatus management server 150 encrypts new software based on the version of software installed in the home electric apparatus to be updated, generates update information, and distributes this to each home electric apparatus via communication channel 160.

Here, a case will be described by way of example in which it is necessary,as shown in FIG. 18A, for software whose software version serial numbers are n−i through n+j and N−p through N+q (where n, N, i, j, p, and q are integers satisfying the condition 1≦n−i≦n+j<n+j+1≦N−p−1<N−p≦N+q≦M−1) (that is, software to be updated) to be updated to software whose software version serial number is n+k (where k is an integer satisfying the condition 1≦n+k≦M−1) (that is, new software).

It is assumed that software for which the software version serial number is n+j+1 through N−p−1 is not software to be updated, software version serial numbers of apparatuses to be updated are not necessarily consecutive, and the serial number of the version of software currently being used in home electric apparatus 100 (that is, currently used software) is n (where n is an integer satisfying the condition n−i≦n≦n+j) or N (where N is an integer satisfying the condition N−p≦N≦N+q).

Figure 19A:
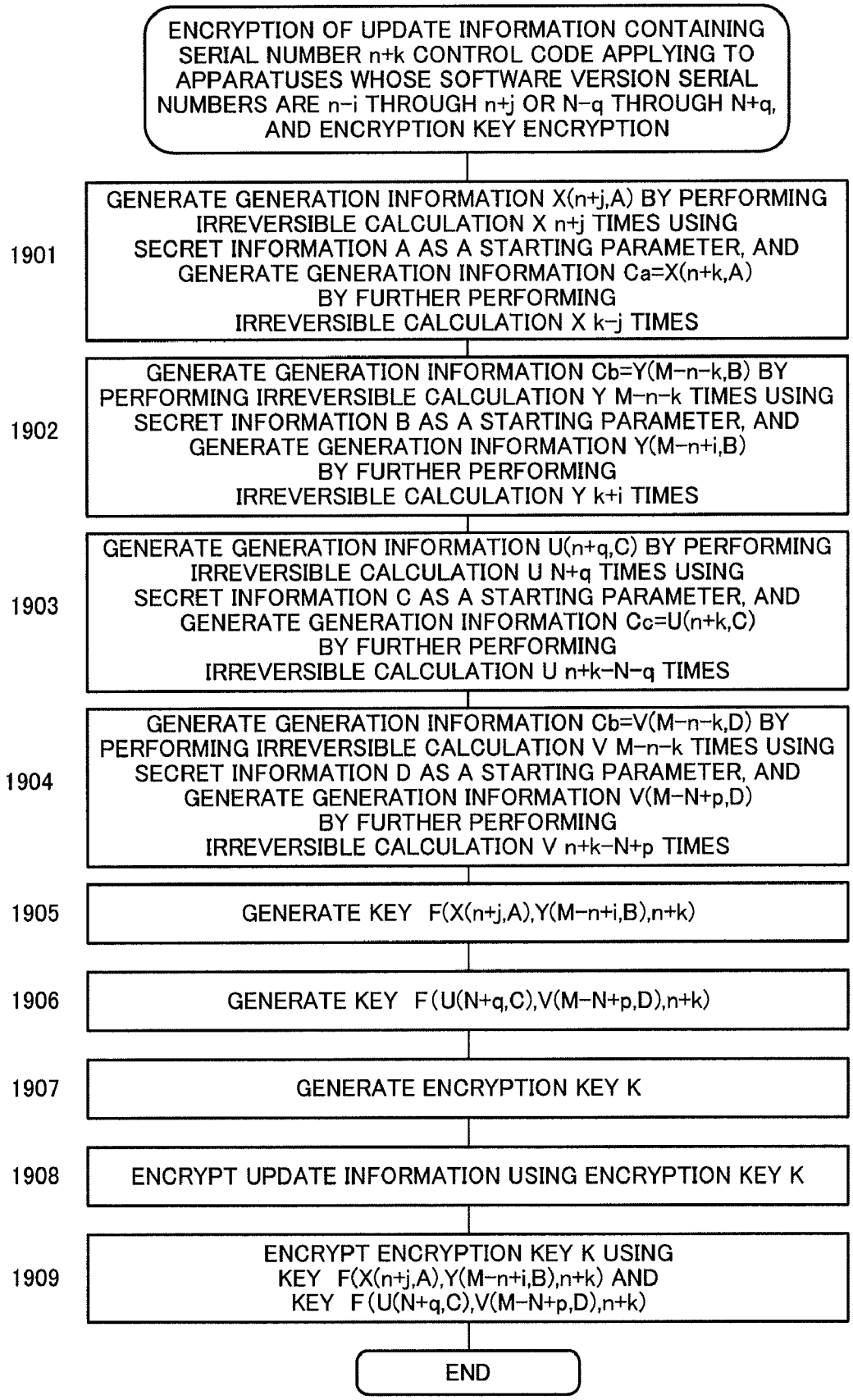
FIG. 19A is a flowchart of encryption processing by an apparatus management server according to Embodiment 8 of the present invention.

As shown in the flowchart in FIG. 19A, first, generation information generation section 152 of apparatus management server 150 reads secret information A 157, secret information B 158, secret information C 159, and secret information D 160 corresponding to home electric apparatus 100 from secret information storing section 151, generates generation information X(n+j,A) by performing irreversible calculation X n+j times using secret information A 157 as a starting parameter of the irreversible calculation X and also generates X (n+k, A), which is generation information Ca in the case of serial number n+k, by performing irreversible calculation X k−j times (step 1901); generates Y(M−n−k,B), which is generation information Cb in the case of serial number n+k, by performing irreversible calculation Y M−n−k times using secret information B 158 as a starting parameter of the irreversible calculation Y and also generates generation information Y(M−n+i,B) by performing irreversible calculation Y k+i times (step 1902); generates generation information U(N+q, C) by performing irreversible calculation U N+q times using secret information C 159 as a starting parameter of the irreversible calculation U and also generates U(n+k,C), which is generation information Cc in the case of serial number n+k, by performing irreversible calculation U n+k−N−q times (step 1903); and generates V(M−n−k,D) which is generation information Cd in the case of serial number n+k, by performing irreversible calculation V M−n−k times using secret information D 160 as a starting parameter of the irreversible calculation V and also generates generation information V(M−N+p,D) by performing irreversible calculation V n+k−N+p times (step 1904).

Next, encryption key generation section 153 generates key F(X(n+j,A), Y(M−n+i,B), n+k) by combining generated generation information X (n+j,A) and generation information Y(M−n+i,B) and serial number n+k (step 1905), generates key F(U(N+q,C), V(M−n+p,D), n+k) by combining generation information U(N+q,C) and generation information V(M−N+p,D) and serial number n+k (step 1906), and also generates encryption key K (step 1907). Here, encryption key K is an arbitrary common-key type key with a random number as a seed.

Figure 18B:
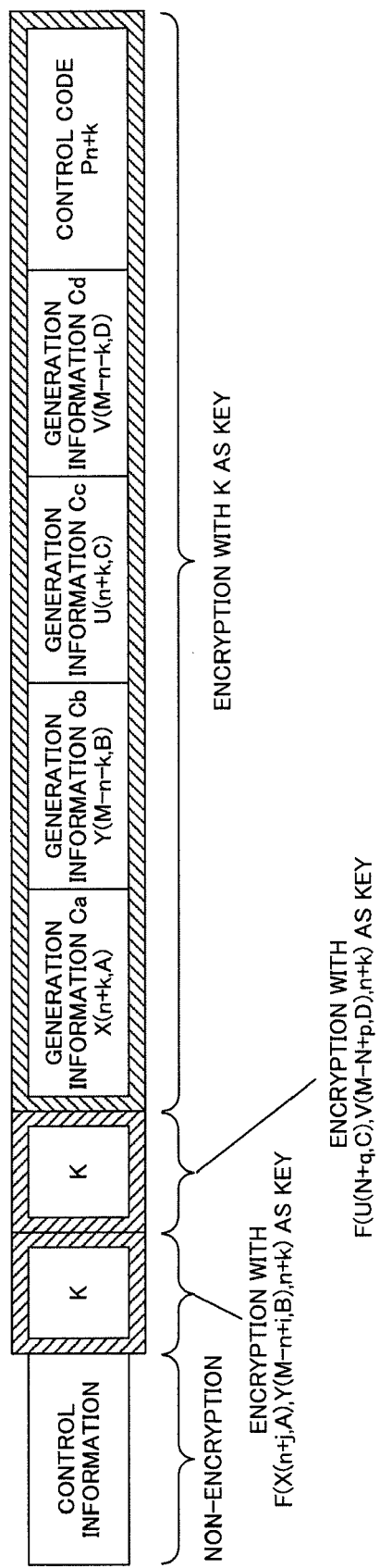
FIG. 18B is a drawing showing update information and control information according to Embodiment 8 of the present invention.

Next, update information generation section 154 encrypts generation information Ca (=X(n+k,A)) and generation information Cb (=Y(M−n−k,B)) and generation information Cc (=U(n+k,C)) and generation information Cd (=V(M−n−k,D)) and control code Pn+k for the case of serial number n+k using generated encryption key K (step 1908), encrypts encryption key K using generated key F(X(n+j,A), Y(M−n+i,B), n+k) and generated key F(U(N+q,C), V(M−N+p,D), n+k) respectively (step 1909), and also adds control information, and generates update information with the kind of data structure shown in FIG. 18B.

Next, update information distribution section 155 distributes generated update information to home electric apparatuses including home electric apparatus 100 via communication channel 160.

Here, control information is information that controls update information processing in home electric apparatus 100 that receives update information. Control information includes information stipulating a home electric apparatus model to be updated. Specifically, for example, a maker code indicating the manufacturing company, a home electric apparatus model number, and a software version serial number are included, and information indicating a manufacture serial number range may also be included. Control information also includes a post-update software version serial number as information stipulating the post-update software version. Control information may also include program data actually executed in a home electric apparatus, and may additionally include an electronic signature or suchlike verification data for verifying the validity of this program data. In the case of this embodiment, it is assumed that program data that converts user setting 123 stored in control code storage section 121 to a valid data format for new software is also included.

Next, on receiving update information, home electric apparatus 100 generates a key for decrypting encrypted form of update information from generation information based on update information control information, decrypts update information encryption, and updates software to that contained in the update information. A case in which the software version serial number of software installed in home electric apparatus 100 is n (where n−i≦n≦n+j),and a case in which the software version serial number is N (where N−q≦N≦N+p), will be described here as examples.

Figure 19B:
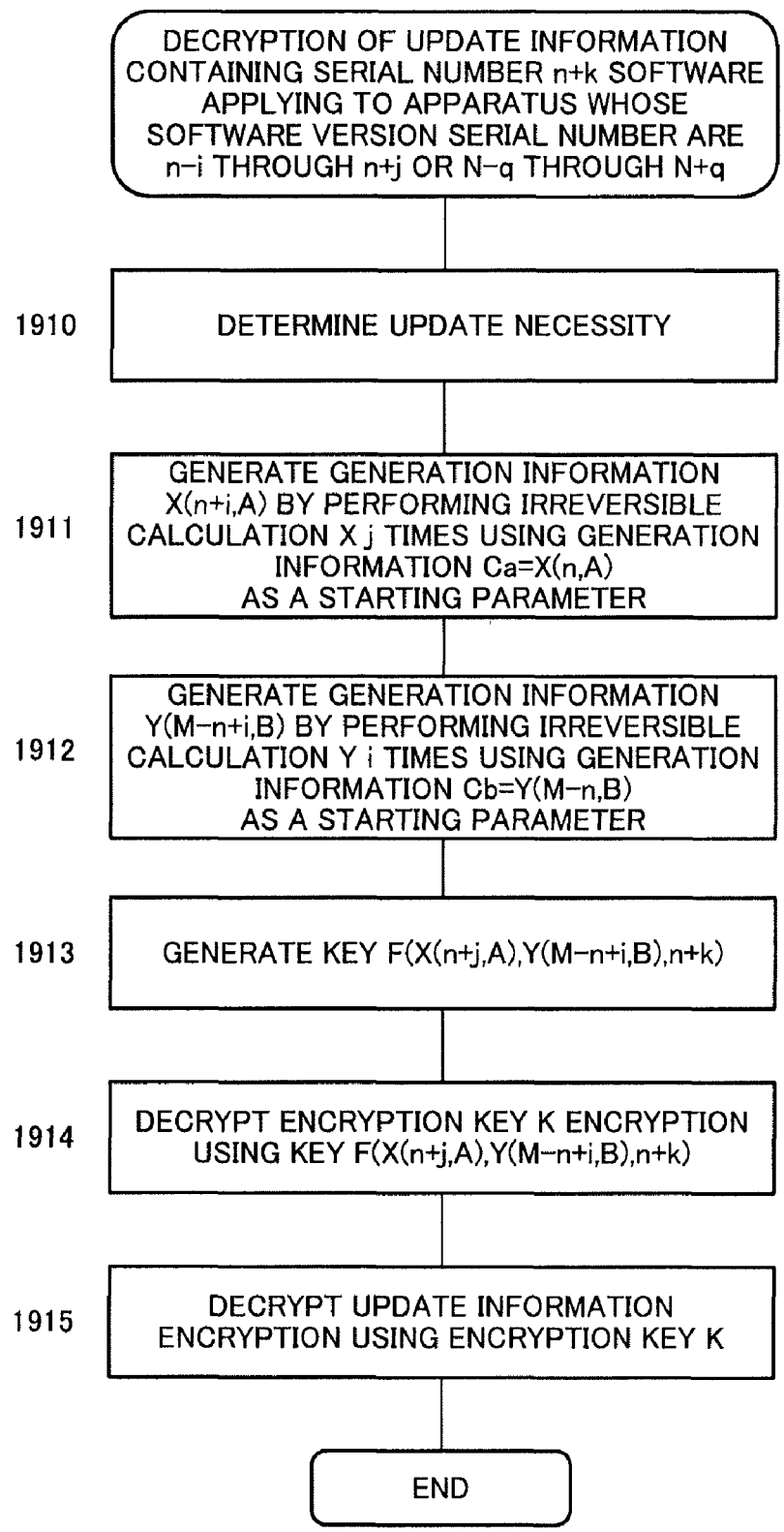
FIG. 19B is a flowchart of decryption processing by a home electric apparatus according to Embodiment 8 of the present invention (when the serial number of the software version of installed software is n (where $n-i \leq n \leq n+j$))

First, when the software version serial number of software installed in home electric apparatus 100 is n, as shown in the flowchart in FIG. 19B, receiving section 140 of home electric apparatus 100 first receives update information distributed from apparatus management server 150 via communication channel 160. Update section 113 of apparatus management module 110 of home electric apparatus 100 determines whether or not it is necessary to update software based on update information control information (step 1910). Specifically, update section 113 acquires control information, and if a maker code and model number stipulated in the acquired control information match the maker code and model number of home electric apparatus 100, and furthermore the software version serial number of home electric apparatus 100 is included in serial numbers of software versions to be updated stipulated in the control information, determines that an update is necessary. In the event of determining an update to be unnecessary in the update necessity determination in step 1910, update section 113 discards the received update information without further action.

If an update is determined to be necessary, key generation section 112 reads generation information Ca (=X(n,A)) and generation information Cb (=Y(M−n,B)) from generation information storage section 111, generates generation information X(n+j,A) by performing irreversible calculation X j times using generation information Ca (=X(n,A)) as a starting parameter of the irreversible calculation X (step 1911), generates generation information Y(M−n+i,B) by performing irreversible calculation Y i times using generation information Cb (=Y(M−n,B)) as a starting parameter of the irreversible calculation Y (step 1912), and furthermore generates key F(X(n+j,A), Y(M−n+i,B), n+k) from generated generation information X(n+j,A) and Y(M−n+i,B) and serial number n+k (step 1913).

Next, update section 113 decrypts encrypted form of encryption key K encrypted using key F(X(n+j,A), Y(M−n+i,B), n+k) (step 1914), and using decrypted encryption key K, decrypts an encrypted part of update information (step 1915), extracts generation information Ca (=X(n+k,A)) and generation information Cb (=Y(M−n−k,B)) and generation information Cc (=U(n+k,C)) and generation information Cd (=V(M−n−k,D)) and control code Pn+k for the case in which the serial number is n+k, updates control code storage section 121 control code Pn to control code Pn+k, and updates generation information storage section 111 generation information Ca (=X(n,A)), generation information Cb (=Y(M−n,B)), generation information Cc (=U(n,C)), and generation information Cd (=V(M−n,D)) respectively to generation information Ca (=X(n+k,A)), generation information Cb (=Y(M−n−k,B)), generation information Cc (=U(n+k,C)), and generation information Cd (=V(M−n−k,D)).

Furthermore, update section 113 executes program data contained in the control information, updates user setting 123 stored in control code storage section 121 by converting user setting 123 to a data format that is also valid for new control code Pn+k, and thereby completes the software update. At this time, after decrypting an encrypted part of update information, update section 113 checks that the decryption processing has been performed normally by checking a parity bit of decrypted data or the like.

Figure 19C:
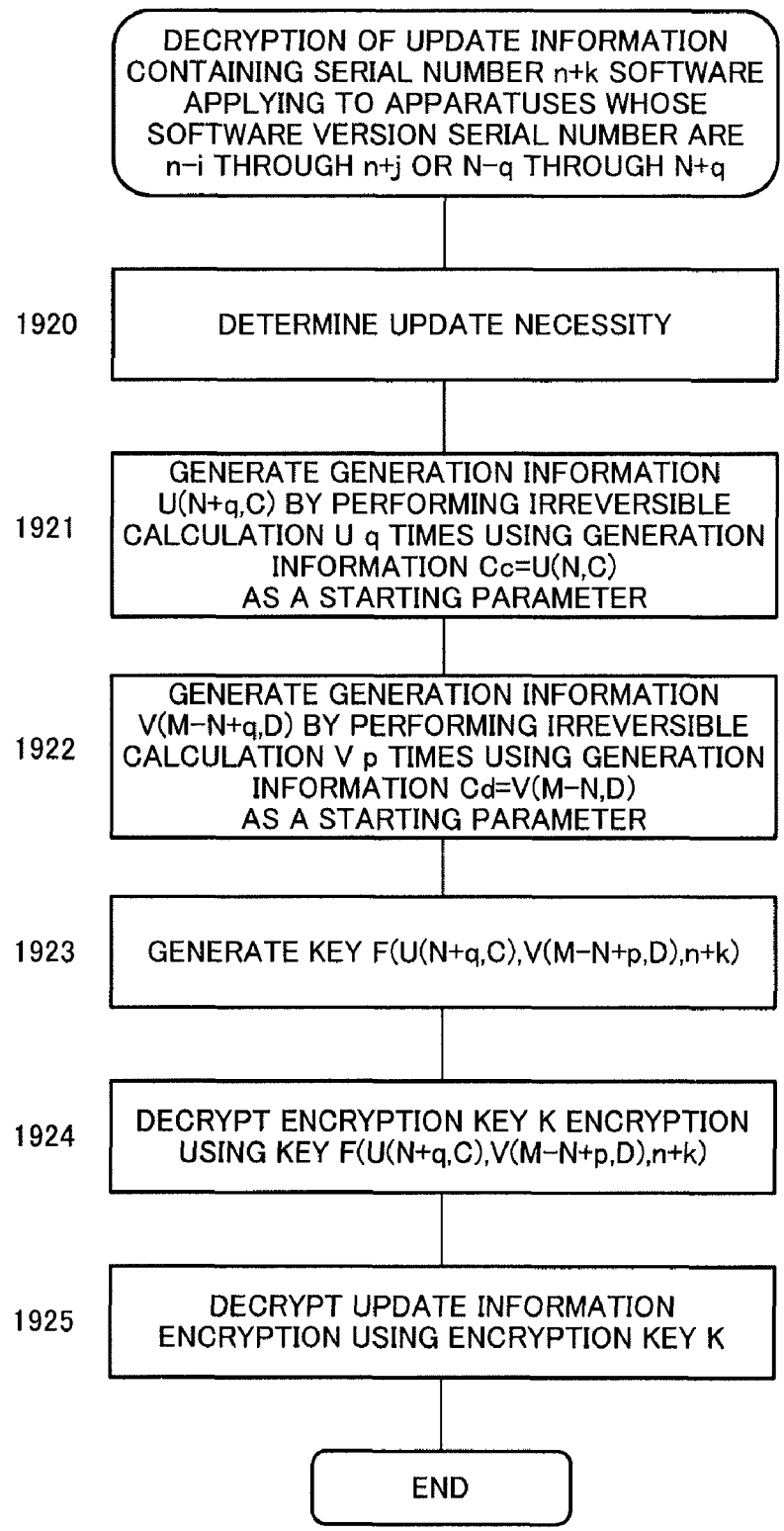
FIG. 19C is a flowchart of decryption processing by a home electric apparatus according to Embodiment 8 of the present invention (when the serial number of the software version of installed software is N (where $N-p \leq N \leq N+q$))

When the software version serial number of software installed in home electric apparatus 100 is N, as shown in the flowchart in FIG. 19C, receiving section 140 of home electric apparatus 100 first receives update information distributed from apparatus management server 150 via communication channel 160. Update section 113 of apparatus management module 110 of home electric apparatus 100 determines whether or not it is necessary to update software based on update information control information (step 1920). Specifically, update section 113 acquires control information, and if a maker code and model number stipulated in the acquired control information match the maker code and model number of home electric apparatus 100, and furthermore the software version serial number of home electric apparatus 100 is included in serial numbers of software versions to be updated stipulated in the control information, determines that an update is necessary. In the event of determining an update to be unnecessary in the update necessity determination in step 1920, update section 113 discards the received update information without further action.

If an update is determined to be necessary, key generation section 112 reads generation information generation information Cc (=U(N,C)) and generation information Cd (=V(M−N,D)) from generation information storage section 111, generates generation information U(N+q,C) by performing irreversible calculation U q times using Cc (=U(N,C)) as a starting parameter of the irreversible calculation U (step 1921), generates generation information V(M−N+p,D) by performing irreversible calculation V p times using generation information Cd (=V(M−N,D)) as a starting parameter of the irreversible calculation V (step 1922), and furthermore generates key F(U(N+q,C), V(M−N+p,D), n+k) from generated generation information U(N+q,C) and V(M−N+p,D) and serial number n+k (step 1923).

Next, update section 113 decrypts encrypted form of encryption key K encrypted using key F(U(N+q,C), V(M−N+p,D), n+k) (step 1924), and using decrypted encryption key K, decrypts an encrypted part of update information (step 1925), extracts generation information Ca (=X(n+k,A)) and generation information Cb (=Y(M−n−k,B)) and generation information Cc (=U(n+k,C)) and generation information Cd (=V(M−n−k,D)) and control code Pn+k for the case in which the serial number is n+k, updates control code storage section 121 control code PN to control code Pn+k, and updates generation information storage section 111 generation information Ca (=X(N,A)), generation information Cb (=Y(M−N, B)), generation information Cc (=U(N,C)), and generation information Cd (=V(M−N,D)) respectively to generation information Ca (=X(n+k,A)), generation information Cb (=Y (M−n−k,B)), generation information Cc (=U(n+k,C)), and generation information Cd (=V(M−n−k,D)).

Furthermore, update section 113 executes program data contained in the control information, updates user setting 123 stored in control code storage section 121 by converting user setting 123 to a data format that is also valid for new control code Pn+k, and thereby completes the software update. At this time, after decrypting an encrypted part of update information, update section 113 checks that the decryption processing has been performed normally by checking a parity bit of decrypted data or the like.

As described above, even if serial numbers of software versions of an apparatus to be updated are not necessarily consecutive, as long as a home electric apparatus is one for which the software version of installed software is a software version to be updated stipulated by update information control information, a key can be generated for decrypting encryption executed on encryption key K that decrypts an encrypted part of update information, and a software update can be performed. At this time, on the apparatus management server 150 side, it is not necessary to distribute a plurality of update information items for each home electric apparatus version, only one kind of update information need be distributed, and only a small processing load is imposed, enabling server equipment costs to be kept down. Also, on the home electric apparatus 100 side, only low-load hashing operation processing need be performed, while an encryption/decryption key for distributed update information can be changed for each update, thus improving the safety of update information distribution.

On the other hand, if the software version of software installed in a home electric apparatus is not a software version to be updated stipulated by update information control information, a key for decrypting encryption executed on encryption key K that decrypts an encrypted part of update information cannot be generated, and therefore software cannot be updated.

In the above description, apparatus management module 110 has been assumed to be an integrated circuit having a CPU separate from the CPU of control section 120, but the apparatus management module 110 function may also be configured using the CPU and memory of control section 120.

In the above description, it has been assumed that updating of control code stored in home electric apparatus 100 is performed, but not only control code but also specific data stored in home electric apparatus 100 may also be updated using the same kind of arrangement, with this specific data including multimedia content, license information, table information or a database referenced by control code, and so forth.

In the above description, it has been assumed that updating of control code stored in home electric apparatus 100 is performed, but some or all of the functions of home electric apparatus 100 may also be disabled by updating specific data stored in home electric apparatus 100 using the same kind of arrangement. This specific data may include control code, home electric apparatus 100 internal control flag information, key data used in encryption processing, multimedia content, license information, table information or a database referenced by control code, and so forth, with some or all of the functions of home electric apparatus 100 being disabled by updating these data to invalid data.

In the above description, a mode has been described by way of example in which there is one place at which software version serial numbers of an apparatus to be updated are not consecutive, but when there are two or more nonconsecutive places, also, a software update can be performed using the same kind of arrangement by increasing secret information and generation information items two at a time.

(Embodiment 9)

Figure 20:
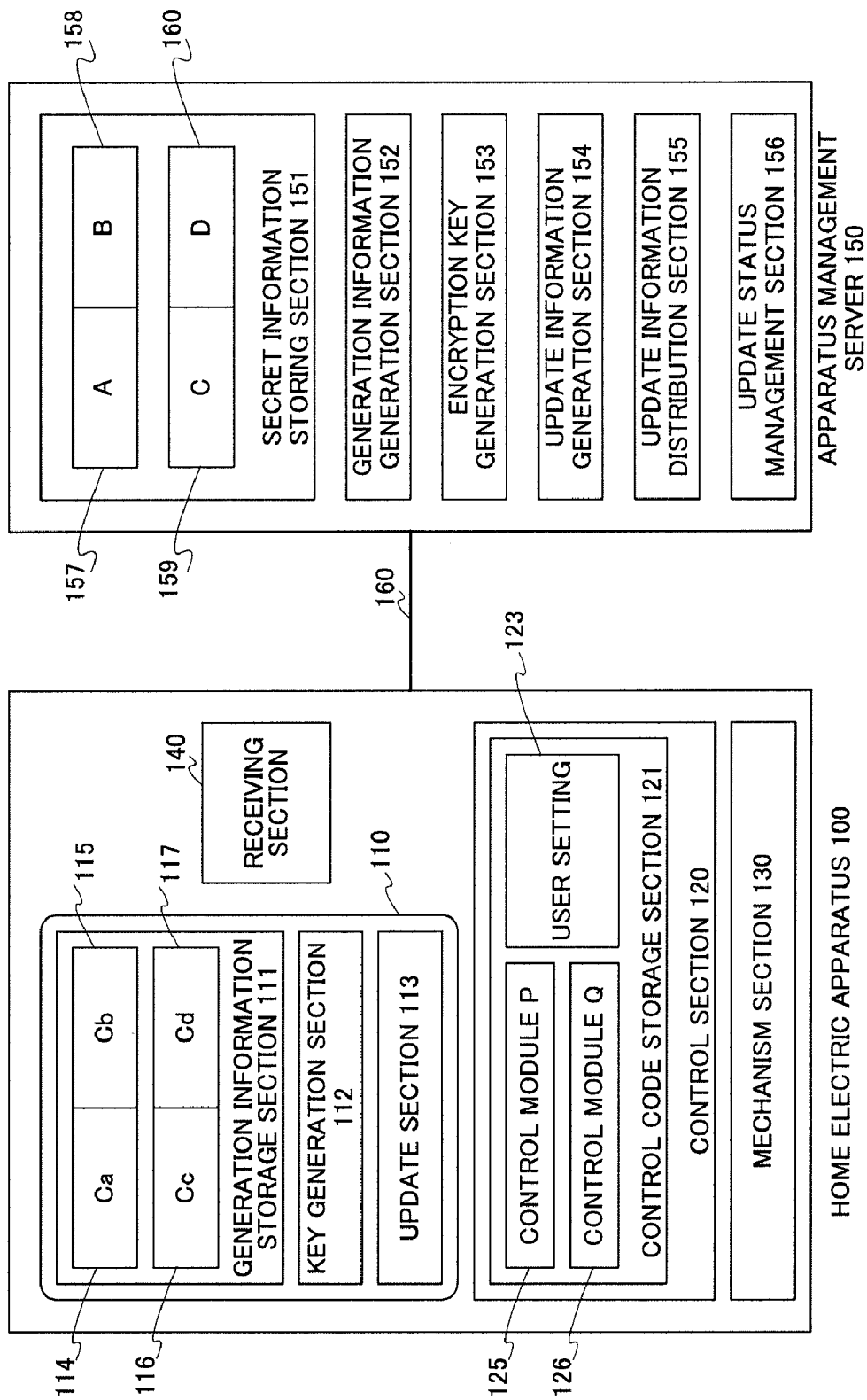
FIG. 20 is a block diagram showing the configuration of a software update system according to Embodiment 9 of the present invention.

FIG. 20 shows a data communication system as a software update system according to Embodiment 9 of the present invention.

This embodiment has apparatus software composed of a plurality of software items, and is configured so that updating of the respective software items is possible even if the respective software release timings are different. For example, if software installed in an apparatus is composed of a plurality of software items, such as an OS, middleware, and an application, and in particular when the various software items are provided by different vendors, the software version serial numbers will differ since the software release timings differ.

Also, there may be compatibility between software items on a version-by-version basis, and it may not necessarily be sufficient to update software items individually, but rather, updating of software items in specific combinations may be necessary.

A software update system described in this embodiment has basically the same kind of configuration as described in Embodiment 1. Therefore, in this embodiment, configuration elements identical to those described in Embodiment 1 are assigned the same reference codes as in Embodiment 1, and detailed descriptions thereof are omitted.

In the case of this embodiment, in order to simplify the description, it is assumed that a plurality of software items making up apparatus software comprises two software items, two software items—control module P 125 and control module Q 126—are stored in control code storage section 121 of control section 120 of home electric apparatus 100 instead of control code 122 according to Embodiment 1, and in addition to generation information Ca 114 and generation information Cb 115, another pair of generation information items—generation information Cc 116 and generation information Cd 117—are also stored in generation information storage section 111 of apparatus management module 110. Here, generation information Ca 114 and generation information Cb 115 are two generation information items corresponding to control module P 125, and generation information Cc 116 and generation information Cd 117 are two generation information items corresponding to control module Q 126.

Also, in addition to secret information A 157 and secret information B 158, secret information storing section 151 of apparatus management server 150 also stores another pair of secret information items—secret information C 159 and secret information D 160—for one model of a home electric apparatus. Here, secret information A 157 and secret information B 158 are two secret information items corresponding to control module P 125, and secret information C 159 and secret information D 160 are two secret information items corresponding to control module Q 126.

FIG. 21 is a drawing showing the interrelationship of data stored in home electric apparatus 100—that is, control module P 125 and control module Q 126, and four generation information items Ca, Cb, Cc, and Cd.

Generation information Ca and generation information Cb are generated from secret information A 157 and secret information B 158 respectively, and generation information Cc and generation information Cd from secret information C 159 and secret information D 160 respectively, by generation information generation section 152 of apparatus management server 150, with generation information Ca and generation information Cb differing according to the control module P 125 version serial number, and generation information Cc and generation information Cd differing according to the control module Q 126 version serial number.

In FIG. 21, for example, when the control module P 125 version serial number is 1, control module P1 is stored in home electric apparatus 100 as control module P, and generation information $Ca=X(1,A)$ and generation information $Cb=Y(M-1,B)$ generated by generation information generation section 152 of apparatus management server 150 are also stored. Similarly, when the control module P1 version serial number is n, control module Pn is stored in home electric apparatus 100 as control module P, and generation information $Ca=X(n,A)$ and generation information $Cb=Y(M-n,B)$ generated by generation information generation section 152 of apparatus management server 150, are also stored.

Also, when the control module Q 126 version serial number is 1, control module Q1 is stored in home electric apparatus 100 as control module Q, and generation information $Cc=U(1,A)$ and generation information $Cd=V(M-1,B)$ generated by generation information generation section 152 of apparatus management server 150 are also stored. Similarly, when the control module Q 126 version serial number is s, control module Qs is stored in home electric apparatus 100 as control module Q, and generation information $Cc=U(s,C)$ and generation information $Cd=V(M-s,D)$ generated by generation information generation section 152 of apparatus management server 150 are also stored.

In other words, if the version serial numbers of control module P 125 and control module Q 126 making up the currently used software version are n and s respectively, the software itself (or part thereof) being used is composed of control module Pn and control module Qs. Also, generation information $Ca=X(n,A)$ and generation information $Cb=Y(M-n,B)$ are held as information unique to control code Pn, and generation information $Cc=U(s,C)$ and generation information $Cd=V(M-s,D)$ are held as information unique to control code Qs, and are used as key components in key generation.

Here, U and V indicate mutually different predetermined irreversible calculations. $U(p,a)$ indicates the result of repeating irreversible calculation U p times using data a as a starting parameter of the irreversible calculation U, and $V(q,b)$ indicates the result of repeating irreversible calculation V q times using data b as a starting parameter of the irreversible calculation V. Therefore, generation information $U(1, C)$ is the result when irreversible calculation U is performed once on secret information C, and generation information $V(M-1,D)$ is the result when irreversible calculation V is repeated M−1 times using secret information D as a starting parameter of the irreversible calculation V.

Generation information $U(n,C)$ is the result when irreversible calculation U is repeated n times using secret information C as a starting parameter of the irreversible calculation U, and secret information C cannot be calculated from generation information $U(n,C)$. Generation information $V(M-n,D)$ is the result when irreversible calculation V is repeated M−n times using secret information D as a starting parameter of the irreversible calculation V, and secret information D cannot be calculated from generation information $V(M-n,D)$.

An operation that updates software of home electric apparatus 100 will now be described.

When a need arises for software of a home electric apparatus model managed by apparatus management server 150 to be updated to new software, apparatus management server 150 encrypts new software based on the version of software installed in the home electric apparatus to be updated, generates update information, and distributes this to each home electric apparatus via communication channel 160.

Here, a case will be described by way of example in which it is necessary, as shown in FIG. 22A, for software comprising software whose control module P version serial numbers are n−i through n+j (where n, i, and j are integers satisfying the condition $1 \leq n-i \leq n+j \leq M-1$) and software whose control module Q version serial numbers are s−1 through s+q (where s, p, and q are integers satisfying the condition $1 \leq s-p \leq s+q \leq M-1$) (that is, software to be updated) to be updated to software whose control module P version serial number is n+k (where k is an integer satisfying the condition $1 \leq n+k \leq M-1$) and whose control module Q version serial number is s+t (where t is an integer satisfying the condition $1 \leq n+t \leq M-1$) (that is, new software).

It is assumed that, for software currently being used in home electric apparatus 100 (that is, currently used software), the control module P version serial number is n, and the control module Q version serial number is S.

Figure 23A:
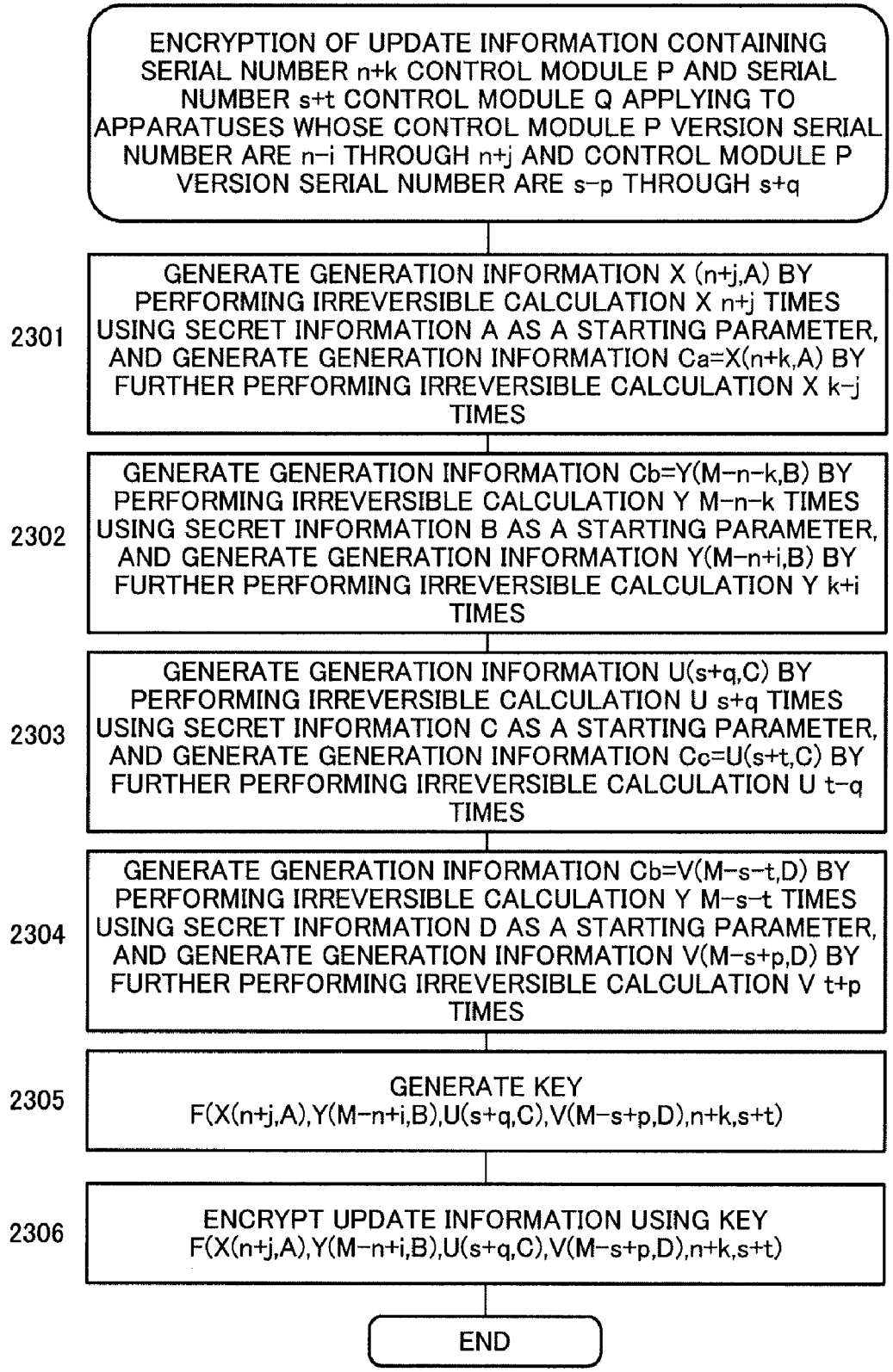
FIG. 23A is a flowchart of encryption processing by an apparatus management server according to Embodiment 9 of the present invention.

As shown in the flowchart in FIG. 23A, first, generation information generation section 152 of apparatus management server 150 reads secret information A 157, secret information B 158, secret information C 159, and secret information D 160 corresponding to home electric apparatus 100 from secret information storing section 151, generates generation information $X(n+j,A)$ by performing irreversible calculation X n+j times using secret information A 157 as a starting parameter of the irreversible calculation X and also generates $X(n+k,A)$, which is generation information Ca in the case of serial number n+k, by performing irreversible calculation X k−j times (step 2301); generates $Y(M−n−k,B)$, which is generation information Cb in the case of serial number n+k, by performing irreversible calculation Y M−n−k times using secret information B 158 as a starting parameter of the irreversible calculation Y and also generates generation information $Y(M−n+i,B)$ by performing irreversible calculation Y k+i times (step 2302); generates generation information $U(s+q,C)$ by performing irreversible calculation U s+q times using secret information C 159 as a starting parameter of the irreversible calculation U and also generates $U(s+t,C)$, which is generation information Cc in the case of serial number s+t, by performing irreversible calculation U t−q times (step 2303); and generates $V(M−s−t,D)$, which is generation information Cd in the case of serial number s+t, by performing irreversible calculation V M−s−t times using secret information D 160 as a starting parameter of the irreversible calculation V and also generates generation information $V(M−s+p,D)$ by performing irreversible calculation V t+p times (step 2304).

Figure 22B:
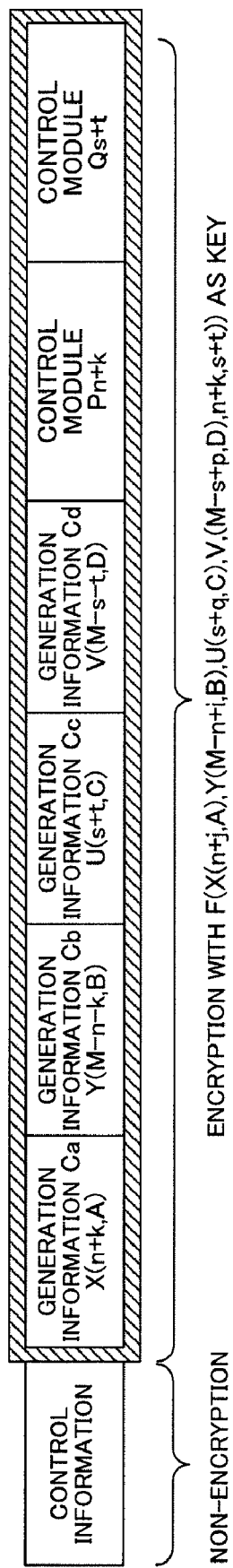
FIG. 22B is a drawing showing update information and control information according to Embodiment 9 of the present invention.

Next, encryption key generation section 153 generates key $F(X(n+j,A), Y(M−n+i,B), U(s+q,C), V(M−s+p,D), n+k, s+t)$ by combining generated generation information $X(n+j,A)$ and generation information $Y(M−n+i,B)$ and generation information $U(s+q,C)$ and generation information $V(M−s+p,D)$ and serial numbers n+k and s+t (step 2305); and then update information generation section 154 encrypts generation information Ca $(=X(n+k,A))$ and generation information Cb $(=Y(M−n−k,B))$ and generation information Cc $(=U(s+t,C))$ and generation information Cd $(=V(M−s−t,D))$ and control code Pn+k and control code Qs+t using generated key $F(X(n+j,A), Y(M−n+i,B), U(s+q,C), V(M−s+p,D), n+k, s+t)$ (step 2306), and also adds control information, and generates update information with the kind of data structure shown in FIG. 22B.

Here, key $F(a,b,c,d)$ is an arbitrary function that has a, b, c, and d as variables, and the function $F(a,b,c,d)=H(a\|b\|c\|d)$ (in which a hashing operation is executed on the data concatenation of a and b and c and d) may be used, for example.

Next, update information distribution section 155 distributes generated update information to home electric apparatuses including home electric apparatus 100 via communication channel 160.

Here, control information is information that controls update information processing in home electric apparatus 100 that receives update information. Control information includes information stipulating a home electric apparatus model to be updated. Specifically, for example, a maker code indicating the manufacturing company, a home electric apparatus model number, and a software version serial number are included, and information indicating a manufacture serial number range may also be included. Control information also includes a post-update software version serial number as information stipulating the post-update software version. Control information may also include program data actually executed in a home electric apparatus, and may additionally include an electronic signature or suchlike verification data for verifying the validity of this program data. In the case of this embodiment, it is assumed that program data that converts user setting 123 stored in control code storage section 121 to a valid data format for new software is also included.

Next, on receiving update information, home electric apparatus 100 generates a key for decrypting encrypted form of update information from generation information based on update information control information, decrypts update information encryption, and updates software to that contained in the update information. A case in which the version serial numbers of control module P and control module Q installed in home electric apparatus 100 are n and s respectively will be described here as an example.

Figure 23B:
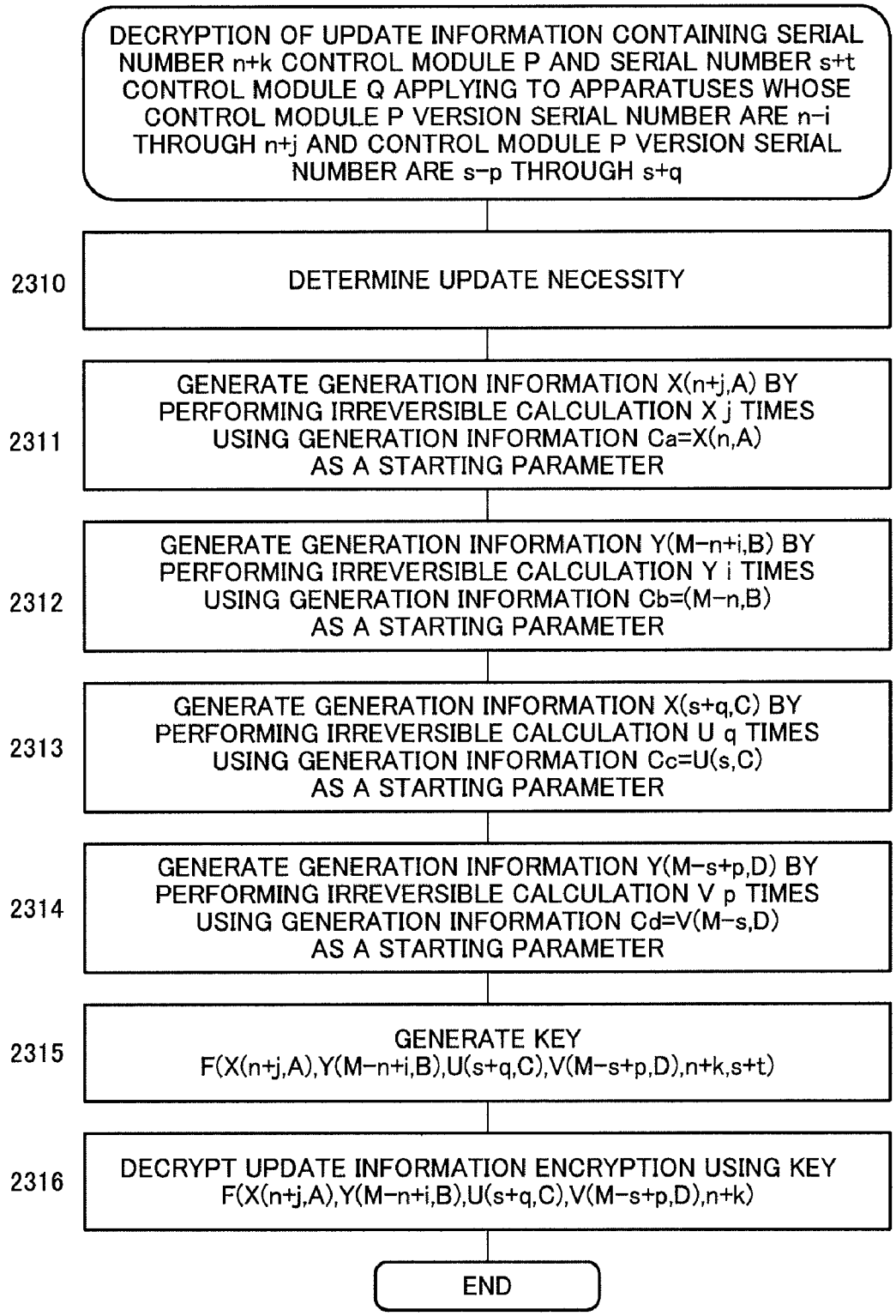
FIG. 23B is a flowchart of decryption processing by a home electric apparatus according to Embodiment 9 of the present invention.

As shown in the flowchart in FIG. 23B, first, receiving section 140 of home electric apparatus 100 receives update information distributed from apparatus management server 150 via communication channel 160. Update section 113 of apparatus management module 110 of home electric apparatus 100 determines whether or not it is necessary to update software based on update information control information (step 2310). Specifically, update section 113 acquires control information, and if a maker code and model number stipulated in the acquired control information match the maker code and model number of home electric apparatus 100, and furthermore the software version serial number of home electric apparatus 100 is included in serial numbers of software versions to be updated stipulated in the control information, determines that an update is necessary. In the event of determining an update to be unnecessary in the update necessity determination in step 2310, update section 113 discards the received update information without further action.

If an update is determined to be necessary, key generation section 112 reads generation information Ca $(=X(n,A))$, generation information Cb $(=Y(M−n,B))$, generation information Cc $(=U(s,C))$, and generation information Cd $(=V(M−s,D))$ from generation information storage section 111, generates generation information $X(n+j,A)$ by performing irreversible calculation X j times using generation information Ca $(=X(n,A))$ as a starting parameter of the irreversible calculation X (step 2311), generates generation information $Y(M−n+i,B)$ by performing irreversible calculation Y i times using generation information Cb $(=Y(M−n,B))$ as a starting parameter of the irreversible calculation Y (step 2312), generates generation information $U(s+q,C)$ by performing irreversible calculation U q times using generation information Cc $(=U(s,C))$ as a starting parameter of the irreversible calculation U (step 2313), and generates generation information $V(M−s+p,D)$ by performing irreversible calculation V p times using generation information Cd $(=V(M−s,D))$ as a starting parameter of the irreversible calculation V (step 2314), and furthermore generates key $F(X(n+j,A), Y(M−n+i,B), U(s+q,C), V(M−s+p,D), n+k, s+t)$ from generated generation information $X(n+j,A), Y(M−n+i,B), U(s+q,C),$ and $V(M−s+p,D)$, and serial numbers n+k and s+t (step 2315).

Next, update section 113 decrypts an encrypted part of update information using key $F(X(n+j,A), Y(M−n+i,B), U(s+q,C), V(M−s+p,D), n+k, s+t)$ (step 2316), extracts generation information Ca $(=X(n+k,A))$ and generation information Cb $(=Y(M−n−k, B))$ and generation information Cc $(=U(s+t, C))$ and generation information Cd $(=V(M−s−t,D))$ and control module Pn+k and control module Qs+t, updates control code storage section 121 control module Pn to control module Pn+k and control module Qs to control module Qs+t, and updates generation information storage section 111 generation information Ca $(=X(n,A))$, generation information Cb $(=Y(M−n,B))$, generation information Cc $(=U(s,C))$, and generation information Cd (=V(M−s,D)) respectively to generation information Ca (=X(n+k,A)), generation information Cb (=Y(M−n−k,B)), generation information Cc (=U(s+t,C)), and generation information Cd (=V(M−s−t,D)).

Furthermore, update section 113 executes program data contained in the control information, updates user setting 123 stored in control code storage section 121 by converting user setting 123 to a data format that is also valid for new control module Pn+k and control module Qs+t, and thereby completes the software update. At this time, after decrypting an encrypted part of update information, update section 113 checks that the decryption processing has been performed normally by checking a parity bit of decrypted data or the like.

As described above, even if software of an apparatus to be updated is composed of a plurality of software items, as long as a home electric apparatus is one for which the software version of installed software is a software version to be updated stipulated by update information control information, a key can be generated for decrypting encryption executed on encryption key K that decrypts an encrypted part of update information, and a software update can be performed. At this time, on the apparatus management server 150 side, it is not necessary to distribute a plurality of update information items for each home electric apparatus version, only one kind of update information need be distributed, and only a small processing load is imposed, enabling server equipment costs to be kept down. Also, on the home electric apparatus 100 side, only low-load hashing operation processing need be performed, while an encryption/decryption key for distributed update information can be changed for each update, thus improving the safety of update information distribution.

On the other hand, if the software version of software installed in a home electric apparatus is not a software version to be updated stipulated by update information control information, a key for decrypting encryption executed on encryption key K that decrypts an encrypted part of update information cannot be generated, and therefore software cannot be updated.

In the above description, apparatus management module 110 has been assumed to be an integrated circuit having a CPU separate from the CPU of control section 120, but the apparatus management module 110 function may also be configured using the CPU and memory of control section 120.

In the above description, it has been assumed that updating of control code stored in home electric apparatus 100 is performed, but not only control code but also specific data stored in home electric apparatus 100 may also be updated using the same kind of arrangement, with this specific data including multimedia content, license information, table information or a database referenced by control code, and so forth.

In the above description, it has been assumed that updating of control code stored in home electric apparatus 100 is performed, but some or all of the functions of home electric apparatus 100 may also be disabled by updating specific data stored in home electric apparatus 100 using the same kind of arrangement. This specific data may include control code, home electric apparatus 100 internal control flag information, key data used in encryption processing, multimedia content, license information, table information or a database referenced by control code, and so forth, with some or all of the functions of home electric apparatus 100 being disabled by updating these data to invalid data.

In the above description, to simplify the explanation, a mode has been described in which software of an apparatus is composed of two software items, but when software of an apparatus is composed of three or more software items, also, a software update can be performed using the same kind of arrangement by increasing secret information and generation information items two at a time.

This completes a description of embodiments of the present invention. The above description covers preferred embodiments of the present invention, and the scope of the present invention is not limited to these. For example, the present invention can be realized by combining a number of features described in Embodiments 1 through 9 in an appropriate fashion. Also, the communication method, number of apparatuses, and so forth, used in the above embodiments are not limited to those described. Furthermore, the configurations described in the embodiments are simply examples, and various variations and modifications of these configuration examples may be possible without departing from the scope of the present invention.

The disclosure of Japanese Patent Application No. 2006-160284, filed on Jun. 8, 2006, including the specification, drawings and abstract, is incorporated herein by reference in its entirety.

INDUSTRIAL APPLICABILITY

A home electric apparatus of the present invention is suitable for use as a home electric apparatus allowing version upgrading of used data. Also, a data storage apparatus, management server, integrated circuit, data update system, data update method, encryption method, and encryption/decryption key generation method of the present invention are suitable for use in version upgrading of data used in a home electric apparatus.

The invention claimed is:

1. A data storage apparatus connected to a management server, comprising:
   a data storage unit configured to store data wherein Pn is an n'th serial number for data P and n≧1;
   an integrated circuit coupled to said data storage unit, wherein said integrated circuit comprises:
   a key generation information storage unit configured to store first generation information and second generation information for generating key information;
   a key generation unit configured to generate key information from said first generation information and second generation information; and
   an update unit configured to update said data and said first generation information and second generation information, wherein:
   first generation information stored in said key generation information storage unit is X(n,A) resulting from performing irreversible calculation X n times using first secret information A as a starting parameter of the irreversible calculation X, and second generation information stored in said key generation information storage unit is Y(M−n,B) resulting from performing irreversible calculation Y M−n times (where M−n≧1) on second secret information B; and
   when receiving from the management server encrypted update information for updating data Pn to updated data Pk (where M≧k≧1), where the encrypted update information used by a plurality of data storage apparatuses and each of the plurality of the data storage apparatuses has installed data that is one of (n−i)'th serial number through data of (n+j)'th serial number (where M≧n+j≧n≧n−i≧1), the data Pn being among data of (n−i)'th serial number through data of (n+j)'th serial number (where M≧n+j≧n≧n−i≧1):
   said key generation unit configured to generate X(n+j,A) by performing irreversible calculation X j times using first generation information as a starting parameter of the irreversible calculation X, generates Y(M−n+i,B) by performing irreversible calculation Y i times using second generation information as a starting parameter of the irreversible calculation Y, and furthermore generates key information G (X(n+j,A),Y(M−n+i,B)) (where G is an arbitrary function) from said X(n+j,A) and Y(M−n+i,B); and said update unit configured to decrypt encryption of said encrypted update information using said generated key information G(X(n+j,A),Y(M−n+i,B)), acquires said data Pk, said first updated generation information X(k, A) and said second updated generation information Y(M−k,B) from said encrypted update information, updates data Pn stored in said data storage unit to said data Pk acquired from said encrypted update information, and updates said first generation information X(n, A) and said second generation information Y(M−n,B) stored in said key generation information storage unit to said first updated generation information X(k,A) acquired from said encrypted update information and said second updated generation information Y(M−k,B) acquired from said encrypted update information, respectively.

2. The data storage apparatus according to claim 1, wherein:

said key generation unit generates key information F(X(n+j,A),Y(M−n+i,B),k) (where F is an arbitrary function) from said generated X(n+j,A) and Y(M−n+i,B) and said k; and said update unit decrypts encrypted form of said update information using said generated key information F(X(n+j,A),Y(M−n+i,B),k), and acquires data Pk and first updated generation information X(k,A) and second updated generation information Y(M−k,B).

3. The data storage apparatus according to claim 1, further comprising:

a communication unit configured to perform data communication; and a registering unit configured to register identification information of said data storage apparatus into a management apparatus, the management apparatus being distinct from the data storage apparatus, wherein, when said communication unit becomes capable of communication, said registering unit registers its own identification information into said management apparatus via said communication unit, and receives said update information from said management apparatus via said communication unit.

4. A management server comprising:

a data storage unit that stores first secret information A and second secret information B for each type of a plurality of data storage apparatuses; and a central processing unit comprising a generation information generation section that generates first generation information and second generation information for each of the plurality of data storage apparatuses, wherein, vis-à-vis a predetermined data storage apparatus that stores data Pn, wherein Pn is an n'th serial number for data P and n≧1, said generation information generation section of said central processing unit reads first secret information A and second secret information B from said data storage unit of said central processing unit, generates first generation information X(n,A) by performing irreversible calculation X n times using said first secret information A as a starting parameter of the irreversible calculation X, and generates second generation information Y(M−n,B) by performing irreversible calculation Y M−n times (where M−n>1) on said second secret information B.

5. A management server comprising:

a data storage unit that stores first secret information A and second secret information B for each type of a plurality of data storage apparatuses;

a central processing unit comprising:

a generation information generation unit configured to generate first generation information and second generation information for each of the plurality of data storage apparatuses;

an encryption key generation unit configured to generate an encryption key from said first generation information and second generation information; and an update information generation unit configured to generate update information transmitted to a data storage apparatus, wherein when update information containing data Pk as data of k'th version of data Pk (where M≧k≧1) is generated, vis-à-vis a data storage apparatus that stores data Pn as one among data of (n−i)'th through data of (n+j)'th (where M≧n+j≧n≧n−i≧1):

said generation information generation unit reads first secret information A and second secret information B from said data storage unit, generates first generation information X(k,A) by performing irreversible calculation X k times using said first secret information A as a starting parameter of the irreversible calculation X, and generates second generation information Y(M−k,B) by performing irreversible calculation Y M−k times using said second secret information B as a starting parameter of the irreversible calculation Y;

said encryption key generation unit generates X(n+j,A) by performing irreversible calculation X n+j times using said first secret information A as a starting parameter of the irreversible calculation X, generates Y(M−n+i,B) by performing irreversible calculation Y M−n+i times using said second secret information B as a starting parameter of the irreversible calculation Y, and furthermore generates key information G (X(n+j,A),Y(M−n+i,B)) (where G is an arbitrary function) from said generated X(n+k,A) and Y(M−n+i,B); and said update information generation unit concatenates said data Pk and first generation information X(k,A) and second generation information Y(M−k,B) as concatenated data, and furthermore performs encryption of the concatenated data using said key information G(X(n+j,A),Y(M−n+i,B)), and furthermore concatenates control information controlling update information processing in a data storage apparatus that received update information, and generates update information.

6. The management server according to claim 5, wherein:

said encryption key generation unit generates key information F(X(n+j,A),Y(M−n+i,B),k) (where F is an arbitrary function) from said generated X(n+j,A) and Y(M−n+i, B) and said k; and said update information generation unit encrypts the concatenated data of said data Pk and first generation information X(k,A) and second generation information Y(M−k,B) using said key information F(X(n+j,A),Y(M−n+i,B),k).

7. An integrated circuit that is installed in a data storage apparatus, connected to a management server, that stores data Pn where Pn is an n'th serial number for data P and n≧1, said integrated circuit comprising:

a key generation information storage unit configured to store first generation information and second generation information for generating key information;

a key generation unit configured to generate key information from said first generation information and second generation information; and an update unit configured to update data stored in said data storage apparatus and said first generation information and second generation information, wherein:

first generation information stored in said key generation information storage unit is $X(n,A)$ resulting from performing irreversible calculation X n times using first secret information A as a starting parameter of the irreversible calculation X, and second generation information stored in said key generation information storage unit is $Y(M-n,B)$ resulting from performing irreversible calculation Y M−n times (where $M-n \geqq 1$) on second secret information B; and when receiving from the management server encrypted update information for updating data Pn to updated data Pk (where $M \geqq k \geqq 1$), the encrypted update information being used for a plurality of data storage apparatuses, each of the plurality of the data storage apparatuses having one among data of (n−i)'th serial number through data of (n+j)'th serial number (where $M \geqq n+j \geqq n \geqq n-i \geqq 1$), the data Pn being among data of (n−i)'th serial number through data of (n+j)'th serial number (where $M \geqq n+j \geqq n \geqq n-i \geqq 1$):

said key generation unit generates $X(n+j,A)$ by performing irreversible calculation X j times using first generation information as a starting parameter of the irreversible calculation X, generates $Y(M-n+i,B)$ by performing irreversible calculation Y i times using second generation information as a starting parameter of the irreversible calculation Y, and furthermore generates key information G $(X(n+j,A),Y(M-n+i,B))$ (where G is an arbitrary function) from said $X(n+j,A)$ and $Y(M-n+i,B)$; and said update unit decrypts encryption of said encrypted update information using said generated key information $G(X(n+j,A),Y(M-n+i,B))$ and acquires data Pk and first updated generation information $X(k,A)$ and second updated generation information $Y(M-k,B)$, updates data Pn stored in said data storage apparatus to data Pk, and updates first generation information $X(n,A)$ and second generation information $Y(M-n,B)$ stored in said key generation information storage unit to first updated generation information $X(k,A)$ and second updated generation information $Y(M-k,B)$ respectively.

8. The integrated circuit according to claim 7, wherein:

said key generation unit generates key information $F(X(n+j,A),Y(M-n+i,B),k)$ (where F is an arbitrary function) from said generated $X(n+j,A)$ and $Y(M-n+i,B)$ and said k; and said update unit decrypts encryption of said update information using said generated key information $F(X(n+j,A),Y(M-n+i,B),k)$, and acquires data Pk and first updated generation information $X(k,A)$ and second updated generation information $Y(M-k,B)$.

9. The integrated circuit according to claim 7, further comprising:

a communication unit configured to perform data communication; and a registering unit configured to register identification information of said data storage apparatus into a management apparatus, wherein, when said communication unit becomes capable of communication, said registering unit registers its own identification information into said management apparatus via said communication unit, and receives said update information from said management apparatus via said communication unit.

10. A data update system comprising:

a data storage apparatus that stores data Pn, wherein Pn is an n'th serial number for data P and $n \geqq 1$;

a management apparatus that stores apparatus information of said data storage apparatus; and a management server that updates data installed in said data storage apparatus, wherein:

said data storage apparatus comprising:

a data storage unit that stores data Pn;

a key generation information storage unit that stores first generation information and second generation information for generating key information;

a key generation unit that generates key information from said first generation information and second generation information; and an update unit that updates said data and said first generation information and second generation information, wherein said key generation information storage unit stores first generation information as $X(n,A)$, resulting from performing irreversible calculation X n times using first secret information A as a starting parameter of the irreversible calculation X, and said key generation information storage unit stores second generation information as $Y(M-n,B)$ resulting from perfauning irreversible calculation Y M−n times (where $M-n \geqq 1$) on second secret information B;

said management apparatus comprising:

an apparatus information management unit that stores apparatus information registered from said data storage apparatus; and a data update unit that updates data stored by said data storage apparatus; and said management server has:

a secret information storing unit that stores first secret infomiation A and second secret information B for each type of a plurality of data storage apparatuses;

a generation information generation section unit that generates first generation information and second generation information for each of the plurality of data storage apparatuses;

an encryption key generation unit that generates an encryption key from said first generation information and second generation information; and an update information generation unit that generates update information transmitted to a data storage apparatus; and said data update unit of said management apparatus further comprising:

a verification unit that verifies apparatus information contained in update information with apparatus information held by said apparatus information management unit;

a storing unit that stores update information; and an update processing control unit that controls processing that updates data stored by said data storage apparatus performed vis-à-vis said data storage apparatus, wherein, when data of a data storage apparatus installed with data as one among data of (n−i)'th through (n+j)'th (where $M \geqq n+j \geqq n \geqq n-i \geqq 1$) is updated to data Pk as data of k'th (where $M \geqq k \geqq 1$), in said management server:

said generation information generation unit reads first secret information A and second secret information B from said secret information storing unit, generates first updated generation information $X(k,A)$ by performing irreversible calculation X k times using said first secret information A as a starting parameter of the irreversible calculation X, and generates second generation information $Y(M-k,B)$ by performing irreversible calculation Y M−k times using said second secret information B as a starting parameter of the irreversible calculation Y;

said encryption key generation unit generates $X(n+j,A)$ by performing irreversible calculation X n+j times using said first secret information A as a starting parameter of the irreversible calculation X, generates $Y(M-n+i,B)$ by performing irreversible calculation Y M−n+i times using said second secret information B as a starting parameter of the irreversible calculation Y, and furthermore generates key information G $(X(n+j,A),Y(M-n+i,B))$ (where G is an arbitrary function) from said generated $X(n+j,A)$ and $Y(M-n+i,B)$; and said update information generation unit concatenates said data Pk and first updated generation infoi illation $X(k,A)$ and second updated generation information $Y(M-k,B)$ as encrypted update information, and furthermore performs encryption using said key information $G(X(n+j,A),Y(M-n+i,B))$, and furthermore concatenates control information controlling update information processing in a data storage apparatus that received update information and generates encrypted update information, and distributes said generated encrypted update information to said management apparatus;

in a management apparatus that receives said said encrypted update information:

said verification unit verifies apparatus information contained in said control information of said received encrypted update information with apparatus information held by said apparatus information management section unit, and if apparatus information of a data storage apparatus for which apparatus information matches has been registered, said update processing control unit stores said received encrypted update information in said storing unit and furthermore transmits said encrypted update information to a data storage apparatus for which apparatus information matches; and in a data storage apparatus that receives said update information:

said key generation unit generates $X(n+j,A)$ by performing irreversible calculation X j times using first generation information as a starting parameter of the irreversible calculation X, generates $Y(M-n+i,B)$ by performing irreversible calculation Y i times using second generation information as a starting parameter of the irreversible calculation Y, and furthermore generates key information G $(X(n+j,A),Y(M-n+i,B))$ from said $X(n+j,A)$ and $Y(M-n+i,B)$; and said update unit decrypts said encrypted update information using said generated key information $G(X(n+j,A),Y(M-n+i,B))$ and acquires data Pk and first updated generation information $X(k,A)$ and second updated generation information $Y(M-k,B)$, updates data Pn stored in said data storage unit to data Pk, and updates first generation information $X(n,A)$ and second generation infounation $Y(M-n,B)$ stored in said key generation information storage unit to first updated generation information $X(k,A)$ and second updated generation information $Y(M-k,B)$ respectively.

11. A home electric apparatus that updates currently used data to new data, said home electric apparatus comprising:

a reception unit that receives encrypted said new data and maximum and minimum values of a serial number of data to be updated;

a key generation unit that generates a key by executing a predetermined irreversible calculation on unique information associated with said currently used data a number of times based on said serial number of data to be updated; and a decryption unit that decrypts said new data using said key, wherein said key generation unit comprises:

a calculation unit configured to, by execution of first and second irreversible calculations, acquire a first key component resulting from repeatedly executing said first irreversible calculation on first secret information a number of times identical to said maximum value, and a second key component resulting from repeatedly executing said second irreversible calculation on second secret information a number of times identical to a value obtained by subtracting said minimum value from a predetermined value; and a synthesis unit configured to obtain said key by combining said first and second key components.

12. A data update method used for updating from currently used data to new data, said data update method comprising:

acquiring maximum and minimum values of a serial number of said new data to be updated and encrypting said new data;

calculating from first unique information associated with said currently used data a first key component generated by repeatedly executing a first irreversible calculation on first secret information a number of times identical to said maximum value;

calculating from second unique information associated with said currently used data a second key component generated by repeatedly executing said a second irreversible calculation on second secret information a number of times identical to said minimum value;

generating, utilizing a processor, a key by combining said first and second key components;

decrypting said new data using said key; and updating said currently used data to decrypted said new data.

13. An encryption key generation method that generates a key used for data encryption on data, said encryption key generation method comprising: acquiring, utilizing a processor, first secret information A and second secret information B associated with said data; generating, utilizing a processor, $X(n+j,A)$ by performing irreversible calculation X n+j times (where n is an n'th version of said data, and $n \geq 0, j \geq 0$) on said first secret information A; generating, utilizing a processor, $Y(M-n+i,B)$ by performing irreversible calculation Y M−n+i times (where $M \geq 0, i \geq 0$) on said second secret information B; and synthesizing a key from information containing said $X(n+j,A)$ and $Y(M-n+i,B)$.

14. A decryption key generation method that generates a key used for decryption of data encrypted using an encryption key generated by the encryption key generation method according to claim 13, said decryption key generation method comprising:

acquiring first generation information $Ca=X(n,A)$ and second generation information $Cb=Y(M-n,B)$;

generating, utilizing a processor, $X(j,Ca)$ by performing irreversible calculation X j times (where j is an j'th version of said data, and $j \geq 0$) on said first generation information Ca;

generating, utilizing a processor, $Y(i,Cb)$ by performing irreversible calculation $Y$ i times (where i is an i'th version of said data, and $i \geq 0$) on said second generation information Cb; and synthesizing a key from information containing said $X(j, Ca)$ and $Y(i,Cb)$.

15. An encryption method that encrypts data, said encryption method comprising:

acquiring first secret information A and second secret information B and third secret information C and fourth secret information D associated with said data;

generating, utilizing a processor, $X(n+j,A)$ by performing irreversible calculation $X$ n+j times (where n is an n'th version of said data, and $n \geq 0$, $j \geq 0$) on said first secret information A;

generating, utilizing a processor, $Y(M-n+i,B)$ by performing irreversible calculation $Y$ M−n+i times (where $M \geq 0$, $i \geq 0$) on said second secret information B;

generating, utilizing a processor, $U(N+q,C)$ by performing irreversible calculation $U$ N+q times (where $N \geq 0$, $q \geq 0$) on said third secret information C;

generating, utilizing a processor, $V(M-N+p,D)$ by performing irreversible calculation $V$ M−N+p times (where $p>0$) on said fourth secret information D;

synthesizing a key from information containing said $X(n+j,A)$ and $Y(M-n+i,B)$;

synthesizing a key from information containing said $U(N+q,C)$ and $V(M-N+p,D)$;

generating encryption key K;

encrypting data using said encryption key K;

encrypting said encryption key K using a key synthesized from information containing said $X(n+j,A)$ and $Y(M-n+i,B)$; and encrypting said encryption key K using a key synthesized from information containing said $U(N+q,C)$ and $V(M-N+p,D)$.

16. An encryption key generation method that generates a key used for data encryption, said encryption key generation method comprising:

an acquiring step of acquiring first secret information A and second secret information B and third secret information C and fourth secret information D associated with said data;

generating, utilizing a processor, $X(n+j,A)$ by performing irreversible calculation $X$ n+j times (where n is an n'th version of said data, and $n \geq 0$, $j \geq 0$) on said first secret information A;

generating, utilizing a processor, $Y(M-n+i,B)$ by performing irreversible calculation $Y$ M−n+i times (where $M \geq 0$, $i \geq 0$) on said second secret information B;

generating, utilizing a processor, $U(s+q,C)$ by performing irreversible calculation $U$ s+q times (where $s \geq 0$, $q \geq 0$) on said third secret information C;

generating, utilizing a processor, $V(M-s+p,D)$ by performing irreversible calculation $V$ M−s+p times (where $p>0$) on said fourth secret information D; and synthesizing a key from information containing said $X(n+j,A)$ and $Y(M-n+i,B)$ and $U(s+q,C)$ and $V(M-s+p,D)$.

17. A decryption key generation method that generates a key used for decryption of data encrypted using an encryption key generated by the encryption key generation method according to claim 16, said decryption key generation method comprising:

acquiring first generation information $Ca=X(n,A)$ and second generation information $Cb=Y(M-n,B)$ and third generation information $Cc=U(s,C)$ and fourth generation information $Cd=V(M-s,D)$;

generating, utilizing a processor, $X(j,Ca)$ by performing irreversible calculation $X$ j times (where $j>0$) on said first generation information Ca;

generating, utilizing a processor, $Y(i,Cb)$ by performing irreversible calculation $Y$ i times (where $i>0$) on said second generation information Cb;

generating, utilizing a processor, $U(q,Cc)$ by performing irreversible calculation $U$ q times (where $q>0$) on said third generation information Cc;

generating, utilizing a processor, $V(p,Cd)$ by performing irreversible calculation $V$ p times (where $p>0$) on said fourth generation information Cd; and synthesizing a key from information containing said $X(j,Ca)$ and $Y(i,Cb)$ and $U(q,Cc)$ and $V(p,Cd)$.

18. The home electric apparatus according to claim 11, further comprising a storage unit configured to store first unique information resulting from repeatedly executing said first irreversible calculation on said first secret information a number of times identical to a serial number of said currently used data, and second unique information resulting from repeatedly executing said second irreversible calculation on said second secret information a number of times identical to a value obtained by subtracting said serial number of currently used data from said predetermined value, wherein said calculation unit, when said maximum value and minimum value are received, acquires said first key component by repeatedly executing said first irreversible calculation on said first unique information a number of times identical to a value obtained by subtracting said serial number of currently used data from said maximum value, and acquires said second key component by repeatedly executing said second irreversible calculation on said second unique information a number of times identical to a value obtained by subtracting said minimum value from said serial number of currently used data.

19. A home electric apparatus that updates currently used data to new data, said home electric apparatus comprising:

a reception unit that receives encrypted said new data and maximum and minimum values of a serial number of data to be updated;

a key generation unit that generates a key by executing a predetermined irreversible calculation on unique information associated with said currently used data a number of times based on said serial number of data to be updated;

a storage section that stores first unique information resulting from repeatedly executing said first irreversible calculation on said first secret information a number of times identical to a serial number of said currently used data, and second unique information resulting from repeatedly executing said second irreversible calculation on said second secret information a number of times identical to a value obtained by subtracting said serial number of currently used data from said predetermined value; and a decryption unit that decrypts said new data using said key, wherein said key generation unit has:

a calculation unit configured to, by execution of first and second irreversible calculations, acquire a first key component resulting from repeatedly executing said first irreversible calculation on first secret information a number of times identical to said maximum value, and a second key component resulting from repeatedly executing said second irreversible calculation on second secret information a number of times identical to a value obtained by subtracting said minimum value from a predetermined value; and a synthesis unit configured to obtain said key by combining said first and second key components, wherein said calculation unit, when said maximum value and said minimum value are received, acquires said first key component by repeatedly executing said first irreversible calculation on said first unique information a number of times identical to a value obtained by subtracting said serial number of currently used data from said maximum value, and acquires said second key component by repeatedly executing said second irreversible calculation on said second unique information a number of times identical to a value obtained by subtracting said minimum value from said serial number of currently used data.

* * * * *

UNITED STATES PATENT AND TRADEMARK OFFICE
CERTIFICATE OF CORRECTION

| | | |
|---|---|---|
| PATENT NO. | : 8,155,320 B2 | Page 1 of 1 |
| APPLICATION NO. | : 12/303420 | |
| DATED | : April 10, 2012 | |
| INVENTOR(S) | : H. Takayama | |

It is certified that error appears in the above-identified patent and that said Letters Patent is hereby corrected as shown below:

At column 51, line 38 (claim 10, line 97) of the printed patent, please delete "section" after "management".

Signed and Sealed this
Thirty-first Day of July, 2012

David J. Kappos
*Director of the United States Patent and Trademark Office*